US006965442B1

(12) United States Patent
Taki et al.

(10) Patent No.: US 6,965,442 B1
(45) Date of Patent: Nov. 15, 2005

(54) DOCUMENT INFORMATION COMMUNICATING SYSTEM

(75) Inventors: Kazunari Taki, Nagoya (JP); Tsuyoshi Ohashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/139,023

(22) Filed: Aug. 24, 1998

(30) Foreign Application Priority Data

| Aug. 27, 1997 | (JP) | ................................ 9-230810 |
| Sep. 1, 1997 | (JP) | ................................ 9-236299 |
| Sep. 1, 1997 | (JP) | ................................ 9-236300 |
| Sep. 1, 1997 | (JP) | ................................ 9-236301 |
| Sep. 1, 1997 | (JP) | ................................ 9-236302 |
| Sep. 1, 1997 | (JP) | ................................ 9-236303 |

(51) Int. Cl.[7] ............................. H04N 1/00; G06F 15/00
(52) U.S. Cl. ..................... 358/1.15; 358/450; 358/453
(58) Field of Search ............................. 358/1.15, 442, 358/444, 400, 434, 468, 1.9, 1.13, 450, 453, 358/462; 455/403, 458, 463, 464, 465, 566, 455/572; 340/825.26, 825.28, 825.29; 714/748

(56) References Cited

U.S. PATENT DOCUMENTS

| 4,473,824 | A | * | 9/1984 | Claytor .................... 340/825.27 |
| 4,827,349 | A | * | 5/1989 | Ogata et al. ................. 358/434 |
| 5,127,013 | A | * | 6/1992 | Yoshida ........................ 714/748 |
| 5,274,794 | A | * | 12/1993 | Ewing et al. ................. 395/500 |
| 5,281,962 | A | * | 1/1994 | Vanden Heuvel et al. ....................... 340/825.44 |
| 5,400,243 | A | * | 3/1995 | Oheda et al. ........... 364/419.17 |
| 5,432,620 | A | * | 7/1995 | Watanabe et al. ........... 358/462 |
| 5,459,482 | A | * | 10/1995 | Orlen .......................... 345/98 |
| 5,737,599 | A | * | 4/1998 | Rowe et al. .................. 707/10 |
| 5,793,301 | A | * | 8/1998 | Patterson, Jr. et al. .. 340/825.26 |
| 5,825,508 | A | * | 10/1998 | Mukai ........................ 358/412 |
| 5,959,543 | A | * | 9/1999 | LaPorta et al. ......... 340/825.44 |
| 6,011,905 | A | * | 1/2000 | Huttenlocher et al. ....... 358/1.2 |
| 6,278,862 | B1 | * | 8/2001 | Henderson .................. 455/31.1 |
| 6,427,064 | B1 | * | 7/2002 | Henderson .................. 455/31.1 |

FOREIGN PATENT DOCUMENTS

| JP | A 59-057579 | 4/1984 |
| JP | A 01-204565 | 8/1989 |
| JP | A 04-026266 | 1/1992 |
| JP | A 05-022494 | 1/1993 |
| JP | A 05-199322 | 8/1993 |
| JP | A 08-116423 | 5/1996 |
| JP | A 02-207666 | 8/1997 |
| JP | A 09-224114 | 8/1997 |

* cited by examiner

Primary Examiner—Joseph R. Pokrzywa
(74) Attorney, Agent, or Firm—Oliff & Berridge, PLC

(57) ABSTRACT

A document information communicating system having: a sending apparatus for sending document information which is divided into a plurality of pages; and a receiving apparatus for receiving the document information and displaying the received document information. The sending apparatus has a sending device for repeatedly sending the plurality of pages of the document information. The receiving apparatus has: a selecting device for selecting at least one page from the plurality of pages of the document information; a receiving device for receiving the selected page of the document information; a display device having a display panel which allows a whole of one page of the document information to be displayed thereon at a time; and a display control device for displaying the document information received by the receiving device on the display panel.

17 Claims, 48 Drawing Sheets

FIG. 12

N1:
```
aaaaaaabbbbbb
ccccccdddddd
eeeeeeffffff
ggggghhhhhh
iiiiijjjjj
kkkkkllllll
mmmmmnnnnnn
ooooooppppp
qqqqqrrrrr
ssssssttttt
```

N2:
```
uuuuuuvvvvvv
wwwwwxxxxx
yyyyyzzzzzz
11111122222
33333344444
55555566666
77777788888
99999900000
AAAAAABBBBB
CCCCCCDDDDD
```

N3:
```
EEEEEEFFFFFF
GGGGGGHHHHHH
IIIIIIJJJJJ
KKKKKLLLLLL
MMMMMNNNNNN
OOOOOOPPPPP
QQQQQRRRRR
SSSSSSTTTTT
UUUUUVVVVVV
WWWWWXXXYYZZ
```

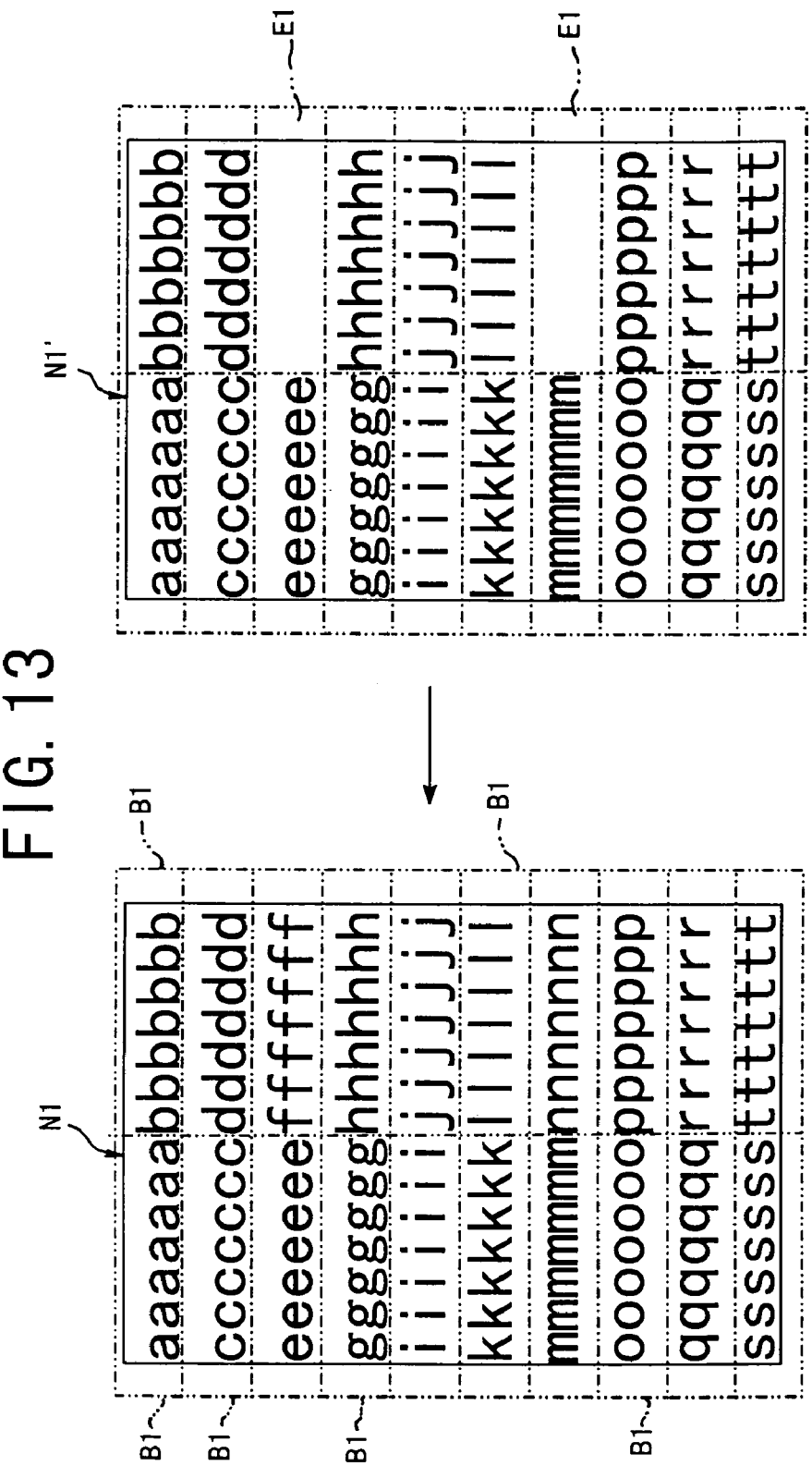

FIG. 21 aaaaaaabbbbbb
ccccccddddddd
eeeeeeeffffff
ggggggghhhhhh
iiiiiiijjjjjj
kkkkkkkllllll
mmmmmmmnnnnnn
ooooooopppppp
qqqqqqqrrrrrr
sssssssttttttt
uuuuuuuvvvvvv

```
tsrqponmlkjihgfedcba
tsrqponmlkjihgfedcba
tsrqponmlkjihgfedcba
tsrqponmlkjihgfedcba
tsrqponmlkjihgfedcba
tsrqponmlkjihgfedcba
```

```
aaaaaaaaabbbbbbb
ccccccccdddddddd
eeeeeeeeffffffff
gggggggggghhhhhhh
i i i i i i i ji j j j j j j j
kkkkkkkkl l l l l l l l
mmmmmmmmnnnnnnn
oooooooppppppp
qqqqqqqrrrrrrrr
ssssssstttttttt
uuuuuuuuvvvvvvv
```

FIG. 27

```
aaaaaaabbbbbb
ccccccddddddd
eeeeeeeffffff
ggggggghhhhhh
i i i i i i jjjjjj
kkkkkkk l l l l l l
mmmmmmmnnnnnnn
ooooooopppppp
qqqqqqqrrrrrr
ssssssstttttt
```

```
aaaaaaabbbbbbb      AAAAAAABBBBBBB
ccccccddddddd       CCCCCCCDDDDDDD
eeeeeefffffff       EEEEEEEFFFFFFF
ggggggghhhhhhh      GGGGGGGHHHHHHH
iiiiiiijjjjjjj      IIIIIIIJJJJJJJ
kkkkkkkllllll       KKKKKKKLLLLLLL
mmmmmmmnnnnnnn      MMMMMMMNNNNNNN
ooooooopppppp       OOOOOOOPPPPPPP
qqqqqqqrrrrrr       QQQQQQQRRRRRRR
sssssssttttttt      SSSSSSSTTTTTTT
```

```
11111112222222      I II III IV V VI VII
33333334444444      VIII IX X ◎◎◎◎
55555556666666      ◎◎◎◎◎◎◎
77777778888888      1SA2ED58DWFFAS
99999990000000      DF684SD8GSE8R4
¥¥¥¥¥¥¥#######      654GSD8G4D654R
$$$$$$$%%%%%%       8S68G6S846G*SD
&&&&&&&@@@@@@@      68G4E6RG4---*-
pPpPpppjjjjjjj      EG46D84FG6DGGS
UUUUUUUXXXXXXX      6DF4G68DGDG448
```

| aaaaaaa | AAAAAAA |
| bbbbbbb | BBBBBBB |
| ccccccc | CCCCCCC |
| ddddddd | DDDDDDD |
| eeeeeee | EEEEEEE |
| fffffff | FFFFFFF |
| ggggggg | GGGGGGG |
| hhhhhhh | HHHHHHH |
| iiiiiii | IIIIIII |
| jjjjjjj | JJJJJJJ |

DOCUMENT INFORMATION COMMUNICATING SYSTEM

BACKGROUND OF THE INVENTION

1. Field of the Invention

The present invention relates to system having a sending apparatus for sending document information and a receiving apparatus for receiving the document information and displaying the received document information.

2. Description of the Related Art

By using computer network communication systems, a user of a personal computer can send documents, letters, notes and the like as electronic document information to another user of a personal computer. However, a personal computer generally has a great number of functions, and therefore, it is complex and expensive.

If the computer network communication system is used for a meeting or a conference, documents can be conveniently delivered as the electronic document information to the participants. However, the computer network communication system causes complex operation, troublesome network management and increasing power consumption. Furthermore, building the computer network communication system causes great expense.

Further, if there are various differences in display forms of the document information, such as page size, a scale of characters and the like, it is difficult to fit the variously different display forms to a monitor of the personal computer. For instance, if the page size of the document information is too large compared with the size of the monitor, the only part of the document information is displayed on the monitor. Therefore, the user cannot see the whole of the document information at a time. In order to fit the variously different display forms to the monitor, it is necessary to adjust page size and a scale of characters for each display form. This causes complex operations.

Furthermore, if the computer network communication system is used, there is a problem of security. It is difficult to prevent the leakage of the electronic document information in the computer network communication.

SUMMARY OF THE INVENTION

It is therefore an object of the present invention to provide a document information communicating system which can allows the user to easily direct and manage document information and reduce power consumption and which can be built at small expense.

It is another object of the present invention to provide a document information communicating system which can improve security with respect to communication of document information.

According to one aspect of the present invention, the above mentioned object can be achieved by a document information communicating system having: a sending apparatus for sending document information which is divided into a plurality of pages; and a receiving apparatus for receiving the document information and displaying the received document information. The sending apparatus has a sending device for repeatedly sending the plurality of pages of the document information. The receiving apparatus has: a selecting device for selecting at least one page from the plurality of pages of the document information; a receiving device for receiving the selected page of the document information; a display device having a display panel which allows a whole of one page of the document information to be displayed thereon at a time; and a display control device for displaying the document information received by the receiving device on the display panel.

The sending apparatus sends a plurality of pages of the document information to the receiving apparatus over and over regardless of condition of the reception of the receiving apparatus. If it is necessary to send all of the pages of the document information, the sending apparatus sends all of the pages of the document information over and over. This means that the receiving apparatus can unconditionally receive the document information many times. Namely, if the necessity to receive again the document information has arisen due to, for example, a reception error or other accident, then the receiving apparatus can receive again the document information without special actions, for example, a special transmission request. Thus, the communicating operation is very simple, so that the document information can be easily delivered, received and displayed.

The receiving apparatus selects one page from the plurality of pages of the document information sent from the sending apparatus, and receives the selected page of the document information. The received document information is displayed by the display device. The display device has a display panel which allows the whole of one page of the document information to be displayed thereon at a time. Therefore, the whole of the selected page of the document information is displayed on the display panel. The user (i.e. receiver) can be easy to see the document information.

The receiving apparatus has the display control device, and this display control device may have a memory device having a minimum memory capacity enough to store one page of the document information and additional information necessary for displaying the document information on the display panel. Thus, it is possible to minimize the memory capacity, and reduce the manufacturing cost.

Furthermore, the receiving apparatus may have a power control device for powering down the receiving device after reception of the document information, and periodically powering up the receiving device to check whether or not the document information sent from the sending apparatus has been changed.

After the reception of the document information had been completed, the receiving device is powered down under the control of the power control device. However, while the receiving device is placed in the powered down state, the receiving device is periodically powered up, and checks the document information sent from the sending apparatus. If the document information has been changed, the receiving device receives this document information, and displays it on the display panel. On the other hand, if the document information has not been changed, the receiving device is placed into the powered down state again. Thus, it is possible to conserve energy while maintaining the receiving and displaying operations.

In order to allow the user to see the document information in good condition, it is necessary to improve the quality of the displayed document information. According to another aspect of the present invention, this can be accomplished by a sending apparatus having: a dividing device for dividing each page of the document information into a plurality of blocks; and a sending device for sending the plurality of blocks. If the document information is formed by a plurality of characters, the number of the characters included in each block is not more than the number of the characters included in one line of each page of the document information. Therefore, the number of the characters included in each block is small.

The sending apparatus sends the document information for each block, and the receiving apparatus receives this document information for each block. When the receiving apparatus receives the document information, the receiving apparatus performs an error detection for each block. The receiving apparatus can display characters included in the block that has no error. That is to say, the receiving apparatus cannot display characters included in the block that has an error or some errors. Therefore, if there is an error or some errors in the block, a blank space may be formed on the display panel at a place corresponding to the block. However, since the number of characters included in each block is small, the blank space is small. Consequently, the user can understand contents of the document information by seeing the whole of it, even if one or some blank spaces are formed due to occurrence of an error or some errors.

Similarly, if the document information is formed by bitmap data, the amount of the bitmap data included in each block is integral number times as much as the amount of the bitmap data included in one line element of each page of the document information. Therefore, the document information can be divided for each group of line elements. In this case, if an error or some errors have occurred, only one or some thin lines are formed in the displayed document information. Consequently, the user can understand contents of the document information by seeing the whole of it.

In order to allow the user to see the document information in good condition, it is necessary to improve the quality of the displayed document information. According to another aspect of the present invention, this can be accomplished by a sending apparatus having: a dividing device for dividing each page of the document information into a plurality of blocks; and a sending device for sending the plurality of blocks in discontinuous order.

When the sending apparatus sends the blocks in discontinuous order, for example, irregular order, the sending apparatus places the blocks on a communication signal (i.e. a carrier wave) in that order, and sends this communication signal to the receiving apparatus. The receiving apparatus receives this communication signal, and extracts these blocks from this communication signal in that order, and displays the extracted blocks on the display panel block by block in that order. During the communication, if the communication becomes unstable for a short time, some errors may occur in several blocks that is continuously arranged in the communication signal. As a result, several blank spaces corresponding to these several blocks are formed in the document information displayed on the display panel. However, since the blocks have been placed in discontinuous order by the sending apparatus, the blank spaces are sprinkled within the display panel. Consequently, the user can understand contents of the document information by seeing the whole of it.

According to another aspect of the present invention, the above mentioned object can be achieved by a document information communicating system having: a sending apparatus for sending document information which has a plurality of display forms; and a receiving apparatus for receiving the document information and displaying the received document information on a display panel. The sending apparatus has a sending device for repeatedly sending the document information in the plurality of display forms, changing the display form one after another. The receiving apparatus has: a selecting device for selecting one display form from the plurality of display forms; a receiving device for receiving the document information having the selected display form; and a display control device for displaying the received document information on the display panel in the selected display form.

The sending apparatus sends the document information in the plurality of display forms over and over. If, for example, several display forms are preinstalled in the sending apparatus, the sending apparatus sends the document information in all of those preinstalled display forms over and over, regardless of condition of the reception of the receiving apparatus. Therefore, the receiving apparatus can select one display form from the plurality of display forms sent from the sending apparatus, and display the document information having the selected display form. Thus, the receiving apparatus can display the document information in various display forms by the simple selection process. Other complex processes, such as a display form conversion process, a display form producing process, etc. are not required. Therefore, it is possible to make the operation and the construction of the receiving apparatus simple.

According to another aspect of the present invention, the aforementioned objet can be achieved by a sending apparatus having a document information removing device for sending insignificant data to the receiving apparatus in order to remove the document information that was previously sent to the receiving apparatus. If the sending apparatus sends the insignificant data to the receiving apparatus, the receiving apparatus receives the insignificant data and displayed it on the display panel. The display panel is filled with the insignificant data, and therefore, the document information that has been displayed on the display panel is replaced by the insignificant data. Thus, it is possible to restrict leakage of the document information, and improve security.

According to another aspect of the present invention, the aforementioned objet can be achieved by a receiving apparatus having: a communication determining device for determining whether or not maintaining the communication between the sending apparatus and the receiving apparatus is possible; and a removing device for removing the document information that was previously received from the sending apparatus, unless the communication determining device determines that maintaining the communication is possible. When the communication between the sending apparatus and the receiving apparatus becomes impossible, the document information displayed on the display panel is automatically removed. Thus, it is possible to restrict leakage of the document information, and improve security.

According to another aspect of the present invention, the aforementioned object can be achieved by a document information communicating system having a sending apparatus and a receiving apparatus. The sending apparatus has a sending device, and this sending apparatus has: a communication signal generating device for generating a communication signal including the document information; a spreading device for spreading the communication signal by using a spreading sequence; and a communication signal sending device for sending the spread communication signal to the receiving apparatus. The receiving apparatus has a receiving device, and this receiving device has: a communication signal receiving device for receiving the spread communication signal; an inputting device for inputting a password; a spreading sequence generating device for generating the spreading sequence by using the input password; a despreading device for despreading the received communication signal by using the spreading sequence generated by the spreading sequence generating device; and a extracting device for extracting the document information from the despread communication signal.

In the document information communicating system, the communication between the sending apparatus and the receiving apparatus is performed by using a spread spectrum communication method. In the spread spectrum communication method, a spread sequence used for the receiving process in the receiving apparatus has to be the same as that used for the transmitting process in the sending apparatus. In the receiving apparatus, the spreading sequence used for the receiving process is generated by using an input password. If the input password is correct, the generated spreading sequence is the same as the spread sequence used for the transmitting process. If the input password is incorrect, the generated spreading sequence is different from the spread sequence used for the transmitting process. Therefore, unless the input password is correct, it is impossible to restore and display the document information in the receiving apparatus. Consequently, it is possible to improve security.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 12 is a diagram showing document information of three pages according to an embodiment of the present invention;

FIGS. 13 and 14 are diagrams showing document information of a textual format according to an embodiment of the present invention;

FIGS. 21 to 28 are diagrams showing examples of display forms according to an embodiment of the present invention;

FIGS. 29 and 30 are diagrams showing examples of display layout patterns according to an embodiment of the present invention;

DETAILED DESCRIPTION OF THE PREFERRED EMBODIMENTS

Referring to the accompanying drawings, embodiments of the present invention will be described.

Viewer System

A viewer system will be described with reference to FIGS. 1 to 6.

Figure 1:
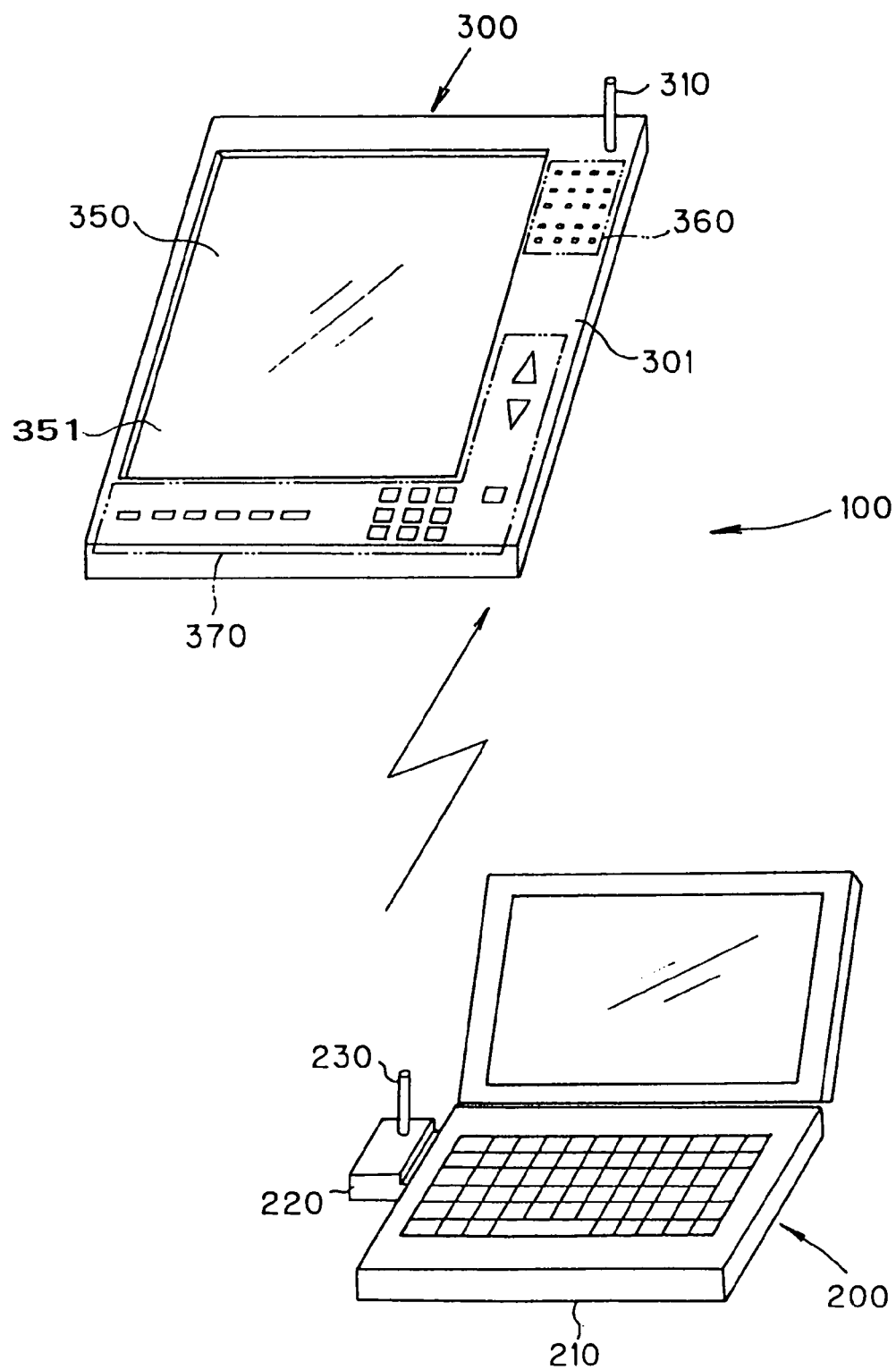
FIG. 1 is a diagram showing a viewer system of an embodiment of the present invention.

FIG. 1 shows a viewer system 100. The viewer system 100 is an embodiment of the document information communicating system of the present invention. As shown in FIG. 1, the viewer system 100 has a sending apparatus 200 and a viewer 300. The sending apparatus 200 transmits document information to the viewer 300 by using a frequency hopping method. The viewer 300 is an embodiment of a receiving apparatus, and receives the document information from the sending apparatus 200 and displays or reproduces the received document information. The document information includes characters, an image, a combination thereof and so on. In addition, if there are a plurality of viewers 300, the sending apparatus 200 can transmit the document information to all of the viewers 300 or one or more specific viewers 300.

Figure 2:
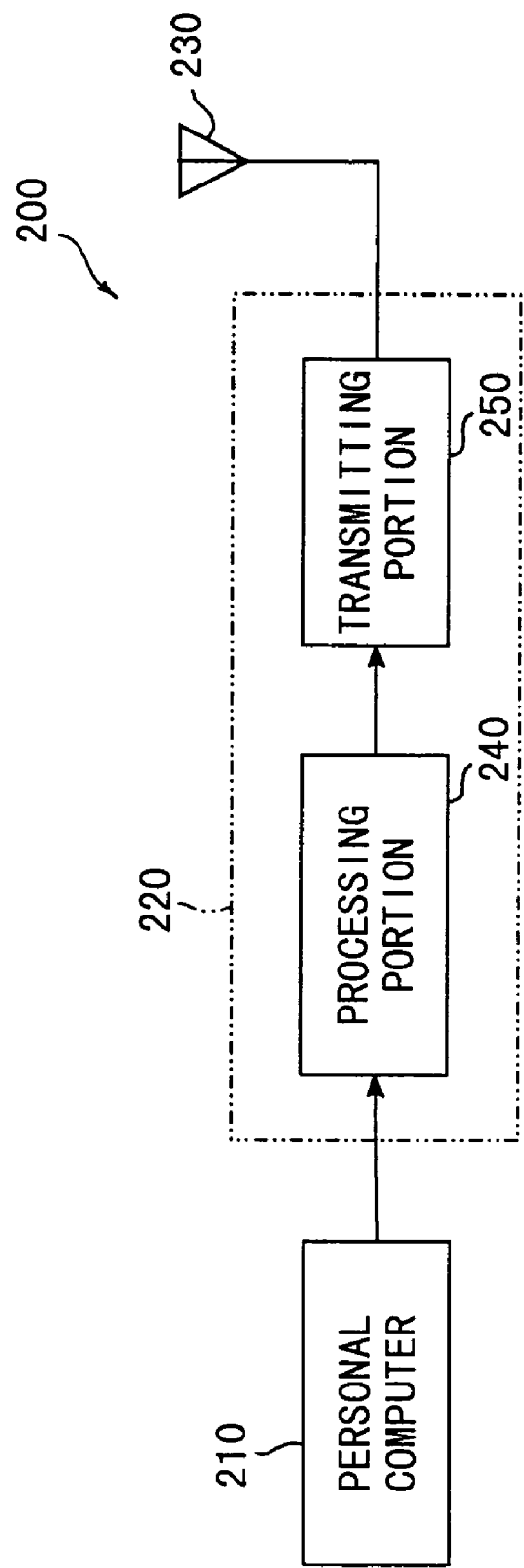
FIG. 2 is a block diagram showing a sending apparatus of the viewer system.
Figure 3:
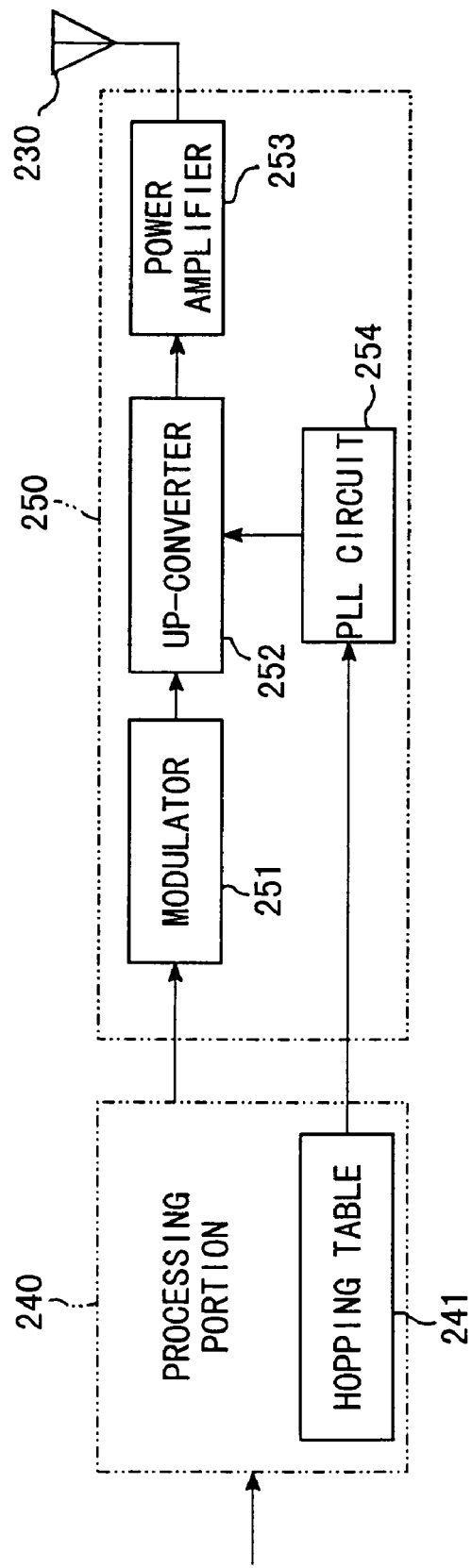
FIG. 3 is a block diagram showing a transmitting unit of the sending apparatus.

FIGS. 2 and 3 show a construction of the sending apparatus 200. As shown in FIG. 2, the sending apparatus 200 has a personal computer 210, a transmitting unit 220 and an antenna 230. The personal computer 210 generates the document information. The transmitting unit 220 is connected to the personal computer 210. The transmitting unit 220 receives the document information from the personal computer 210, and converts the received document information into transmission data D. Further, the transmitting unit 220 generates a spread signal by performing a modulating operation, a spreading operation and an amplifying operation on the transmission data D. The spread signal is transmitted to the viewer 300 via the antenna 230.

As shown in FIG. 2, the transmitting unit 220 has a processing portion 240 and a transmitting portion 250. As shown in FIG. 3, the processing portion 240 converts the document information into the transmission data D and feeds the transmission data D into the transmitting portion 250. At this time, the processing portion 240 can add data to be used for error detection and error correction, such as an error correction code, to the transmission data D. The transmission data D has a data format shown in FIG. 7, for example.

The processing portion 240 includes a memory (which is not depicted). A number of programs, such as a program for controlling the sending apparatus 200, a program for performing a transmitting process, a program for the performing a transmission order control process and other necessary programs, are stored in this memory.

The processing portion 240 further includes a hopping table 241. The output of the hopping table 241 is connected to a PLL (Phase Locked Loop) circuit 254. The hopping table 241 includes a predetermined spreading sequence.

As shown in FIG. 3, the transmitting portion 250 includes a modulator 251, an up-converter 252, a power amplifier 253 and the PLL circuit 254. The modulator 251 receives the transmission data D from the processing portion 240, and generates a modulated signal by modulating the transmission data D. The up-convert 252 generates the spread signal by spreading the modulated signal by using the frequency hopping method, in association with the PLL circuit 254 and the hopping table 241.

Figure 4:
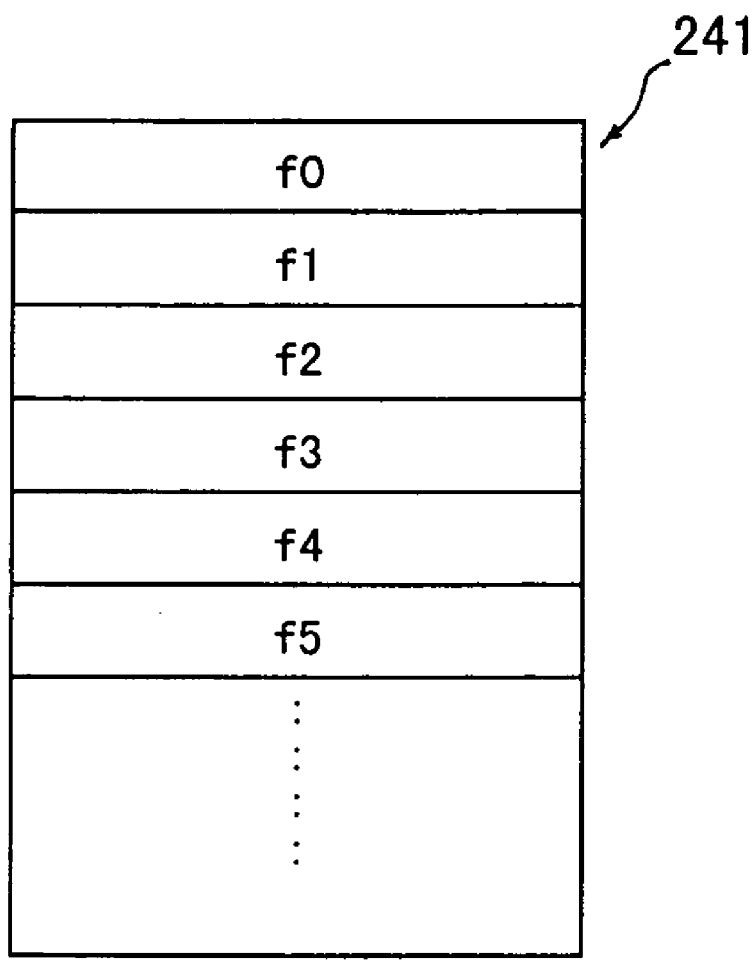
FIG. 4 is a diagram showing a hopping table of the sending apparatus.

More specifically, as shown in FIG. 4, the predetermined spreading sequence f0, f1, f2, . . . are arranged in the hopping table 241. The spreading sequence is used as a hopping pattern in the frequency hopping operation. For example, the spreading sequence is a pseudo-noise (PN) sequence, more concretely, a maximum length sequence. In addition, the spreading code is not limited to the maximum length sequence. Another sequence, for example, a Gold code, a Barker code or the like can be used.

The spreading sequence arranged in the hopping table 241 is fed into the PLL circuit 254 one after another. The PLL circuit 254 sets the frequency of its output signal on the basis of the spreading sequence, and feeds the output signal, whose frequency changes with the spreading sequence, into the up-converter 252.

The up-converter 252 controls so as to change (hop) the carrier frequency of the modulated signal, which is applied from the modulator 251, on the basis of the output signal applied from the PLL circuit 254, and generates the spread signal, whose carrier frequency changes with the frequency of the output signal. The power amplifier 253 amplifies the spread signal, and feeds the amplified spread signal to the antenna 230. Thus, the spread signal is transmitted to the viewer 300 via the antenna 230.

Figure 5:
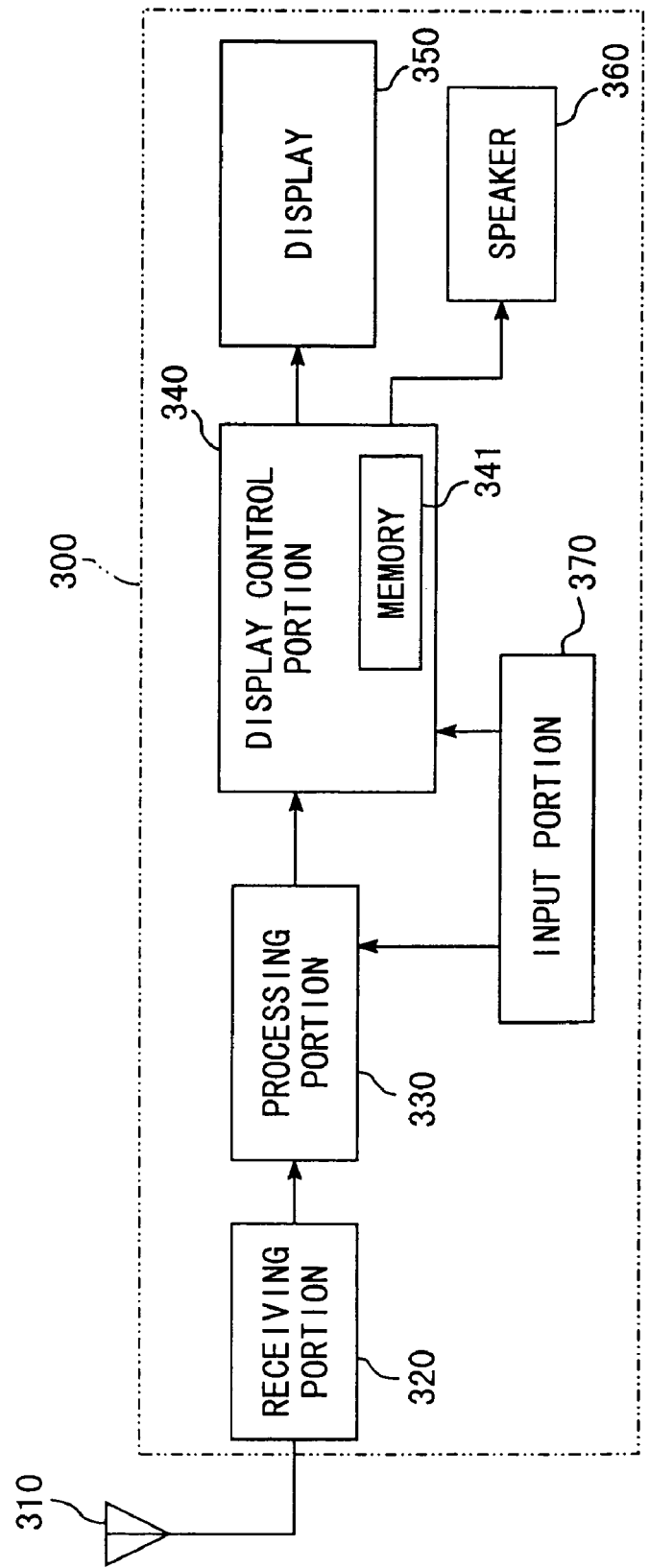
FIG. 5 is a block diagram showing a viewer of the viewer system.
Figure 6:
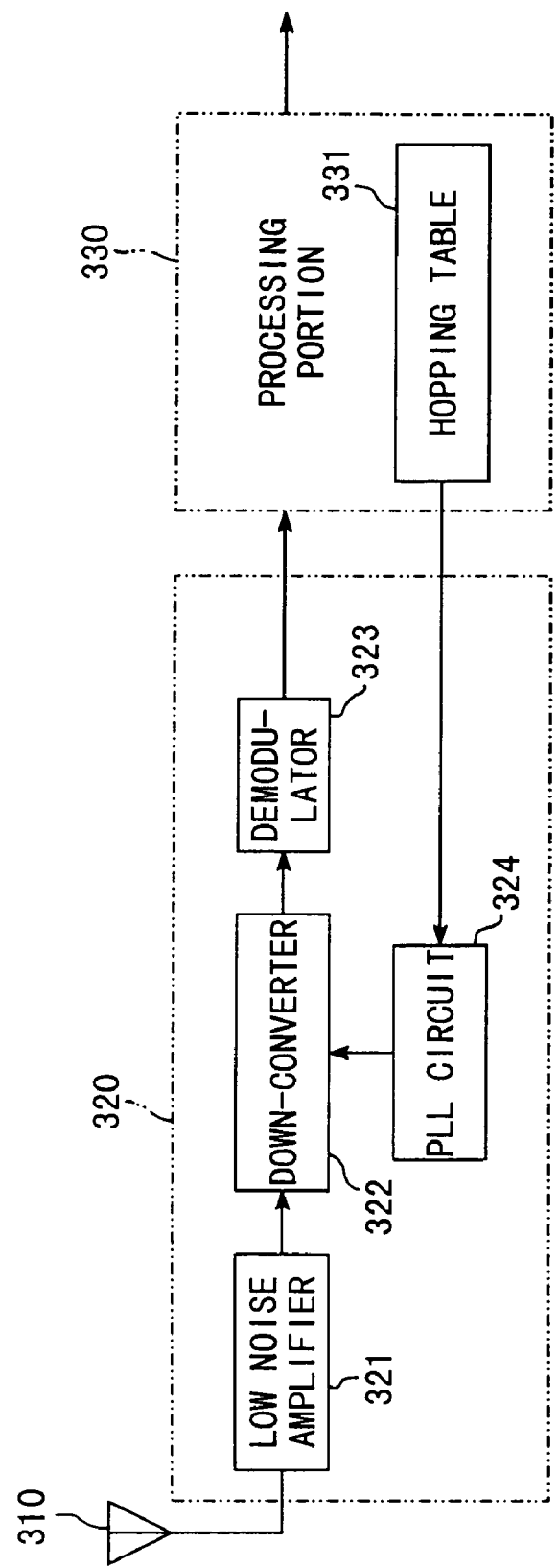
FIG. 6 is a block diagram showing a receiving portion and a processing portion of the viewer.

FIGS. 5 and 6 show a construction of the viewer 300. As shown in FIG. 5, the viewer 300 has an antenna 310, a receiving portion 320, a processing portion 330, a display control portion 340, a display 350, a speaker 360 and an input portion 370. The antenna 310 receives the spread signal transmitted from the sending apparatus 200. The receiving portion 320 restores the original transmission data D by despreading and demodulating the received spread signal. The processing portion 330 performs the signal processes, such as an error correction process, on the restored transmission data D. Further, the processing portion 330 extracts the document information from the restored transmission data D. The display control portion 340 controls the display 350. Further the display control portion 340 has a memory 341 to store the extracted document information. The display 350 has a display panel 351, and displays the document information on the display panel 351. For example, the display 350 is a liquid crystal display. The input portion 370 allows the user to input data and various instructions into the viewer 300.

Further, as shown in FIG. 6, the receiving portion 320 has a low noise amplifier 321, a down-converter 322, a demodulator 323 and a PLL circuit 324. The low noise amplifier 321 amplifies the received spread signal. The down-converter 322 generates a despread signal by despreading the amplified spread signal in association with the PLL circuit 324 and a hopping table 331.

More specifically, the hopping table 331 includes a spreading sequence. This spreading sequence is the same as the spreading sequence included in the hopping table 241 of the sending apparatus 200. The spreading sequence is fed into the PLL circuit 324 from the hopping table 331. The PLL circuit 324 sets the frequency of its output signal on the basis of the spreading sequence, and feeds the output signal, whose frequency changes with the spreading sequence, into the down-converter 322. The down-converter 322 despreads the spread signal, which is applied from the low noise amplifier 321, on the basis of the frequency change of the output signal applied from the PLL circuit 324. The resultant signal is fed into the demodulator 323 from the down-converter 322 as the despread signal. The demodulator 323 demodulates the despread signal. Thus, the original transmission data D is restored.

The processing portion 330 performs the error correcting process and other signal processes on the transmission data D, and extracts the document information from the transmission data D. The extracted document information is fed into the display control portion 340, and stored to the memory 341.

Further, the processing portion 330 has another memory (which is not depicted). A number of programs, such as a program for controlling the viewer 300, a program for performing a receiving process and other necessary programs, are stored in the memory. Furthermore, the processing portion 330 can perform a acquisition process.

As shown in FIG. 5, the display control portion 340 has the memory 341 to store the document information received from the processing portion 330. The memory 341 is a writable memory device, and functions as a video RAM (VRAM). When the document information is stored to the memory 341, this document information is directly displayed on the display 350.

The memory 341 has a minimum memory capacity enough to display the document information within the whole of the display panel 351 of the display 350 at a time. For example, if the area of the display panel 351 is A4 size, the memory 341 has a minimum memory capacity enough to store only one page of the document information of A4 size and a small amount of additional information necessary to display this document information within the display panel 351. Therefore, the memory capacity of the memory 341 is small, so that it is possible to reduce manufacturing cost of the viewer 300.

As shown in FIG. 1, the display panel 351 of the display 350 has an area which enables the whole of the document information of one page to be displayed therein at a time in normal scale (normal display form). For example, the display panel 351 has the area of the most standard paper size, such as A4 size (ISO A4: 210 mm× 297 mm), standard letter size or the like. In addition, the size of the display panel 351 is not limited to A4 size or the standard letter size. A display panel having a larger size, for example A0 to A3 size, or a display panel having a smaller size, for example A5 to A6 size, can be used as the display panel 351 of the viewer 300. Moreover, the size of the display panel 351 is not limited to A series formats. B or C series formats can be used.

The input portion 370 has a plurality of buttons. As shown in FIG. 1, the buttons are arranged on the body 301 of the viewer 300. When the user presses any of the buttons, the signal corresponding to the pressed button is fed into either of the processing portion 360 and the display control portion 340.

In addition, in the aforementioned viewer system 100, the document information is transmitted from the sending apparatus 200 to the viewer 300 in the frequency hopping method. However, the communication method is not limited to the frequency hopping method. Another spread spectrum method, for example, direct sequence (DS) can be used. Furthermore, the communication medium is not limited to wireless. The document information can be sent to the viewer 300 by wire communication. For example, coaxial cables, optical fiber cables or the like can be used as the communication lines.

Document Information and Transmission Data

The document information and the transmission data D will be described with reference to FIGS. 7, 12, 13 and 15.

As mentioned above, the document information includes characters, an image, a combination thereof and so on. As shown in FIG. 12, the document information are divided into pages. The document information is generated by an application software, such as a word processor software, a drawing software or the like, installed in the personal computer 210.

There are two types of the document information. One is the document information formed by a textual format, and the other is the document information formed by a bitmap format. If the document information includes only characters, the document information is formed by a textual format, such as ASCII (American Standard Code for Information Interchange) code, JIS (Japanese Industrial Standard) code, EBCDIC (Extended Binary Coded Decimal Interchange Code) code or the like. If the document information includes only images or a combination of characters and images, the document information is formed by a bitmap format. In addition, if the document information includes only characters, the document information may be formed by the bitmap format. For example, the application software installed in the personal computer 210 decides whether the document information is formed by the textual format or the bitmap format.

Figure 15:
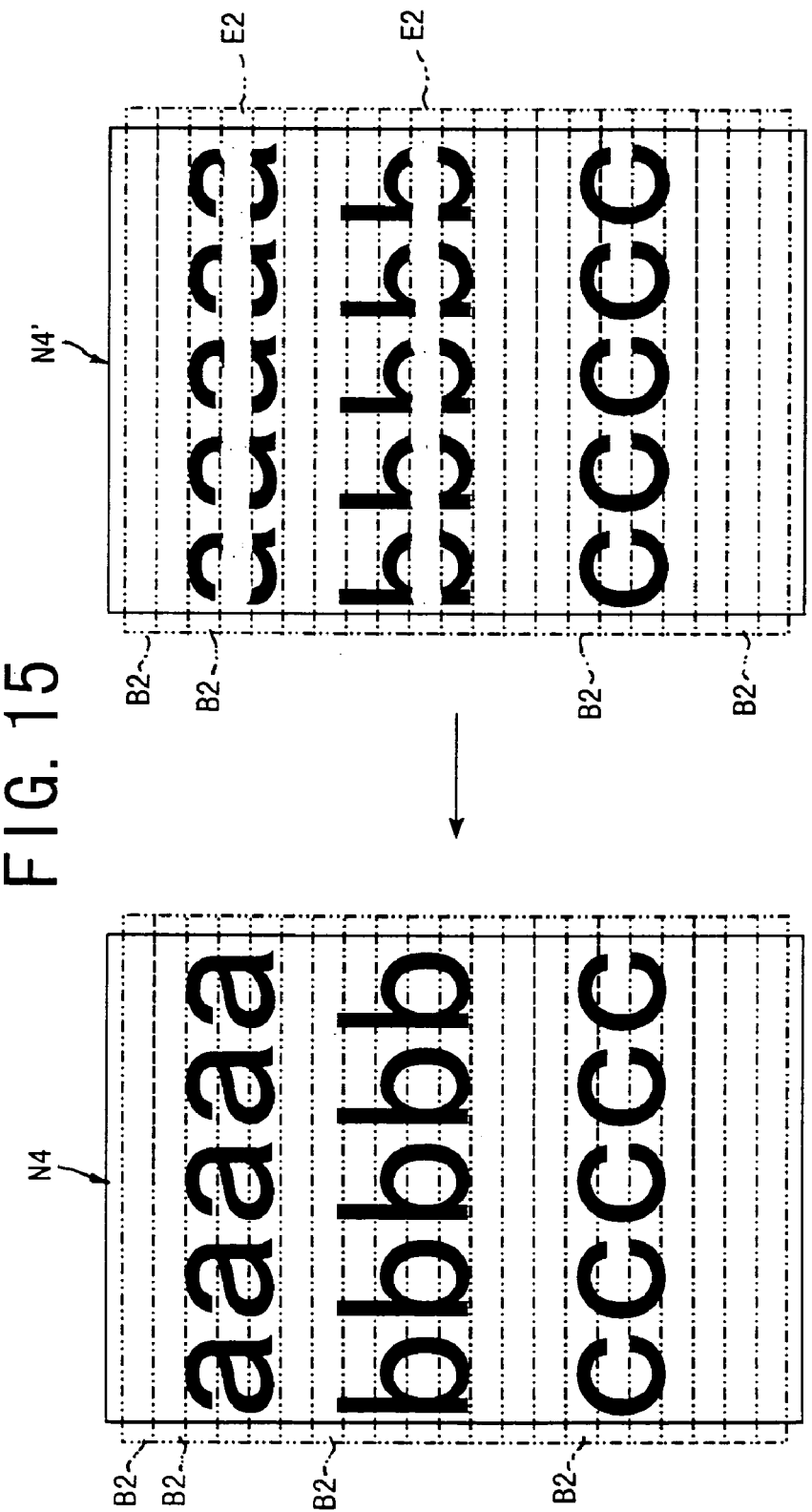
FIG. 15 is a diagram showing document information of a bitmap format according to an embodiment of the present invention.

As shown in FIGS. 13 and 15, when the document information is transmitted from the sending apparatus 200 to the viewer 300, the document information of each page is further divided into a plurality of blocks, and transmitted for each block.

FIG. 13 shows the document information of the textual format. As shown in FIG. 13, the document information of the textual format is divided into the blocks B1 each including the predetermined number of characters. The number of characters included in each block B1 is not more than the number of characters included in one line of a page of the document information.

FIG. 15 shows the document information of the bitmap format. As shown in FIG. 15, the document information of the bitmap format is divided into the blocks B2 each including data having the predetermined amount. The amount of data included in each block B2 is integral number times (e.g., several-times) as much as the amount of data included in one line element of a page of the document information. For example, the total number of bits of data included in each block B2 is several times as many as the total number of bits of data included in one line element of a page of the document information. Alternatively, the document information of bitmap format may be divided into the blocks each including data whose amount is not more than the amount of data included in one line element of a page of the document information. In addition, the "line element" means a row of pixels serially extending from one end to the other in a page.

Figure 7:
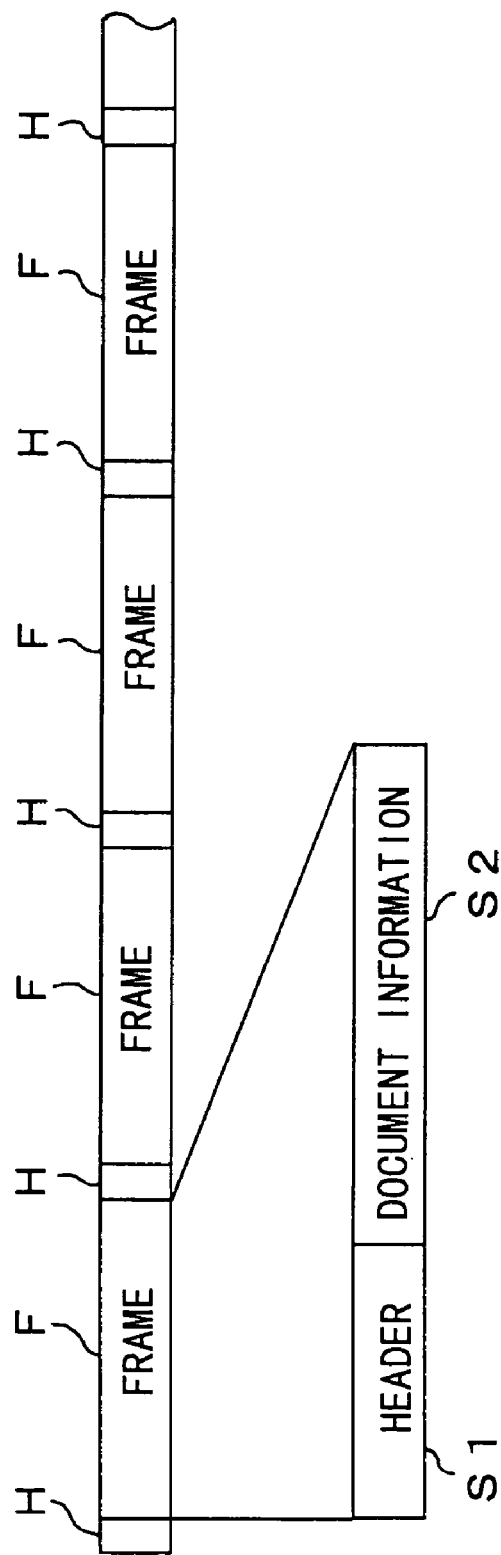
FIG. 7 is a diagram showing a data format of transmission data according to an embodiment of the present invention.

FIG. 7 shows a construction of the transmission data D. As shown in FIG. 7, the transmission data D has a plurality of frames F and a plurality of hopping slots H. The frames F and the hopping slots H are alternately arranged. Further, each frame F has a header S1 and a document information area S2. When the document information is sent from the sending apparatus 200 to the viewer 300, the document information is divided into the blocks, and then, the divided document information is converted into the transmission data D. At this time, the document information is further divided into the frames F, and each of the divided document information is placed into the document information area S2. Further, an ID code of the viewer 300, a synchronous signal, page information, block information and control information are placed into the header S1. The ID code indicates the viewer 300 to which the document information should be transmitted. The synchronous signal is used for the acquisition process for the communication between the sending apparatus 200 and the viewer 300. The page information indicates the page in which the frame itself is included. The block information indicates the block in which the frame itself is included. Further, the control information includes a variety of information to be used in the receiving process. For example, the control information includes: information for indicating the transmission modes; information for indicating whether the document information has been changed or not; information for indicating a display form; information for indicating the data format of the document information; and other necessary information.

The hopping slot H serves to make a time for frequency hopping (frequency shift). Namely, as mentioned above, the document information is converted into the transmission data D, and next, the transmission data D is modulated by the modulator 251, and next, the modulated transmission data D (modulated signal) is spread by the up-converter 252 in association with the PLL circuit 254 and the hopping table 241. At this time, the up-converter 252 spreads the modulated transmission data D by changing (hopping) the carrier frequency of the modulated transmission data D for each frame. In such a frequency hopping operation, the hopping slot H serves to make a time interval for the frequency shift between adjacent frames.

Transmitting Process and Receiving Process I

In the description set forth hereinafter, three embodiments of the transmitting process and four embodiments of the receiving process are described.

First, a first embodiment of the transmitting process (Hereinafter, it is referred to as a first transmitting process.) will be described with reference to FIG. 8. The first transmitting process is a process to transmit the document information from the sending apparatus 200 to the viewer 300, and it is carried out by the processing portion 240 of the sending apparatus 200.

When the user sends the document information from the sending apparatus 200 to the viewer 300, the user manipulates the personal computer 210 so as to send the document information. In response to this, the personal computer 210 begins to send the document information into the processing portion 240. At this time, the processing portion 240 executes the program for performing the first transmitting process. Thus, the first transmitting process starts.

Figure 8:
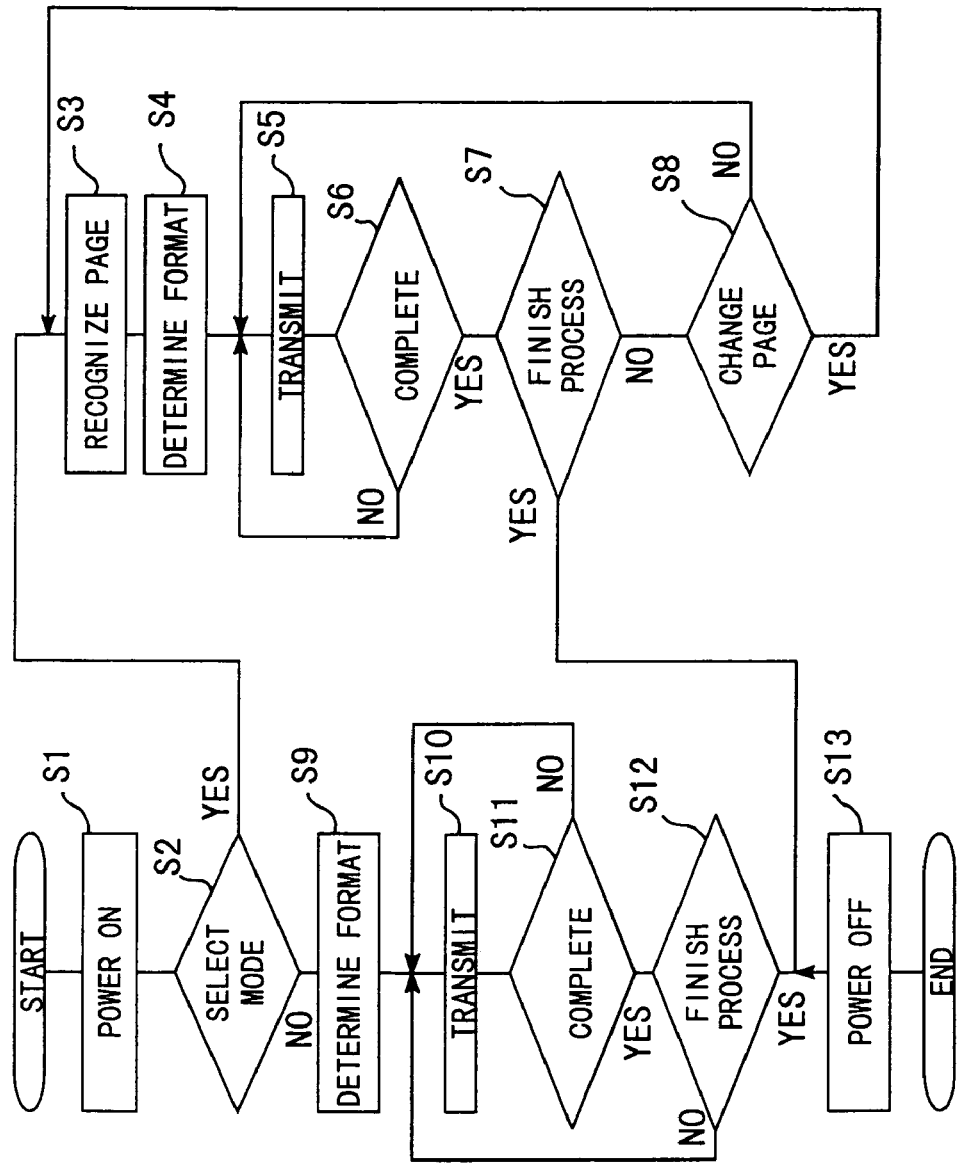
FIG. 8 is a flowchart showing a first transmitting process according to an embodiment of the present invention.

At step 1 in FIG. 8, the power is supplied to the transmitting portion 250 to thereby activate the transmitting portion 250. In addition, the transmitting potion 250 has been placed in a power off state or a suspended power state in order to conserve energy before the first transmitting process is started.

At step 2, the processing portion 240 determines whether the document information is transmitted in the specific page mode or the all page mode. In the first transmitting process, there are two types of transmission modes: the specific page mode and the all page mode. In the specific page mode, the sending apparatus 200 sends the document information of one specific page. In the all page mode, the sending apparatus 200 sends the document information of all pages. When the user sends the document information from the sending apparatus 200 to the viewer 300, the user selects either one of the specific page mode and the all page mode by manipulating the personal computer 210.

If the user selects the specific page mode, the user further inputs a page number into the personal computer 210. In response to this, the personal computer 210 sends information indicating that the specific page mode has been selected and information indicating the input page number to the processing portion 240, together with the document information. At step 2, the processing portion 240 receives these information, and then recognizes that the specific page mode has been selected. At step 3, the processing portion 240 further recognizes the input page number as a specific page number.

When the specific page mode has been selected, the personal computer 210 further sends information indicating the data format of the document information of the specific page. At step 4, the processing portion 240 receives this information, and determines whether the data format of the document information of the specific page is the textual format or the bitmap format.

Next, at step 5, the processing portion 240 operates in the following manner in order to transmit the document information of the specific page to the viewer 300. First, the processing portion 240 receives the document information of the specific page from the personal computer 210. Next, if the data format of the received document information is the textual format, the processing portion 240 divides this document information into the blocks B1, as shown in FIG. 13. On the other hand, if the data format of the received document information is the bitmap format, the processing portion 240 divides this document information into the blocks B2, as shown in FIG. 15. Next, the processing portion 240 converts the divided document information into the transmission data D, as shown in FIG. 7. At this time, the document information are further divided into a plurality of frames F, and then placed into the document information areas S2. Further, at this time, the aforementioned ID code of the viewer 300, the synchronous signal, the page information, the block information and the control information are placed into the headers S1. As mentioned above, the control information includes: information for indicating the selected transmission mode (the specific page mode or the all page mode); information for indicating whether the document information has been changed or not; information for indicating the data format of the document information (the textual format or the bitmap format); and other necessary information. The control information can be obtained from the personal computer 210. Next, the transmission data D is modulated and spread by the transmitting portion 250. And, the spread transmission data D, i.e., the spread signal is transmitted to the viewer 300 via the antenna 230.

Next, at step 6, the processing portion 240 determines whether or not the transmission of the document information of the specific page has been completed. If so, the process proceeds to the next step 7. If not, steps 5 and 6 are repeated.

At step 7, the processing portion 240 determines whether or not an instruction to finish the first transmitting process has been issued. For example, when the user wishes to suspend or turn off the viewer system 100, or when all the viewers 300 have been placed in a holding state (which is described later), the user manipulates the personal computer 210, and inputs the instruction to finish the first transmitting process. The input instruction is sent from the personal computer 210 to the processing portion 240. If the processing portion 240 receives and recognizes this instruction, the process proceeds to step 13. At step 13, the transmitting potion 250 is powered off or suspended, and the first transmitting process ends. On the other hand, if the processing portion 240 does not receive this instruction, then the process proceeds to the next step 8.

At step 8, the processing portion 240 determines whether or not the document information of the specific page has been changed. Namely, when the user changes the page number by manipulating the personal computer 210, information indicating the new page number is sent from personal computer 210 to the processing portion 240. If the processing portion 240 receives this information, the process returns to step 3. Therefore, the document information of the new page is transmitted to the viewer 300. On the other hand, if there is no change of the page number, the process returns to step 5, and the current document information is continuously transmitted to the viewer 300.

Thus, the document information of the specific page is repeatedly transmitted from sending apparatus 200 to the viewer 300 many times, regardless of the receiving condition in the viewer 300. Even if the whole document information from the top of the specific page to the end of the specific page has been received by the viewer 300, the transmission of the document information is still continued unless the instruction to finish the first transmitting process is issued. Further, unless the document information is rewritten, or unless the page number is changed, the same document information is repeatedly transmitted.

On the other hand, if the user selects the all page mode, the personal computer 210 sends information indicating that the all page mode has been selected to the processing portion 240, together with the document information. If the processing portion 240 receives this information at step 2, the process proceeds from step 2 to step 9.

When the all page mode has been selected, the personal computer 210 further sends information indicating the data format of the document information. At step 9, the processing portion 240 receives this information, and determines whether the data format of the document information is the textual format or the bitmap format.

At step 10, the processing portion 240 operates in the following manner in order to transmit all pages of the document information. First, the processing portion 240 receives the document information from the personal computer 210. Next, if the data format of the received document information is the textual format, the processing portion 240 divides this document information into the blocks B1, as shown in FIG. 13. On the other hand, if the data format of the received document information is the bitmap format, the processing portion 240 divides this document information into the blocks B2, as shown in FIG. 15. Next, the processing portion 240 converts the divided document information into the transmission data D in the same process as the aforementioned step 5. Further, the transmission data D is modulated and spread by the transmitting portion 250, and then, the spread transmission data D, i.e., the spread signal is transmitted to the viewer 300 via the antenna 230.

Next, at step 11, the processing portion 240 determines whether or not the transmission of all pages of the document information has been completed. If so, the process proceeds to the next step 12. If not, steps 10 and 11 are repeated.

At step 12, the processing portion 240 further determines whether or not the instruction to finish the first transmitting process has been issued from the personal computer 210. If so, the transmitting portion 250 is powered off or suspended (step 11), and the first transmitting process ends. If not, the process returns to step 10.

Thus, the document information of all pages is repeatedly transmitted from the sending apparatus 200 to the viewer 300 many times, regardless of the receiving condition in the viewer 300. Even if the whole document information from the top of the first page to the end of the last page has been received in the viewer 300, the transmission of the document information of all pages is still continued unless the instruction to finish the first transmitting process is issued.

In addition, as mentioned above, the transmitting process is carried out by the processing portion 240. However, the present invention is not limited to this. The transmitting process may be carried out by the personal computer 210. In this case, the program for performing the transmitting process is executed in the personal computer 210.

Next, a first embodiment of the receiving process (Hereinafter, it is referred to as a first receiving process.) will be described with reference to FIGS. 9 to 11. The first receiving process is a process to receive and display the document information transmitted from the sending apparatus 200, and it is carried out by the processing portion 330 of the viewer 300.

When the viewer 300 is turned on, the processing portion 330 executes the program for performing the first receiving process, and therefore, the first receiving process starts.

Figure 9:
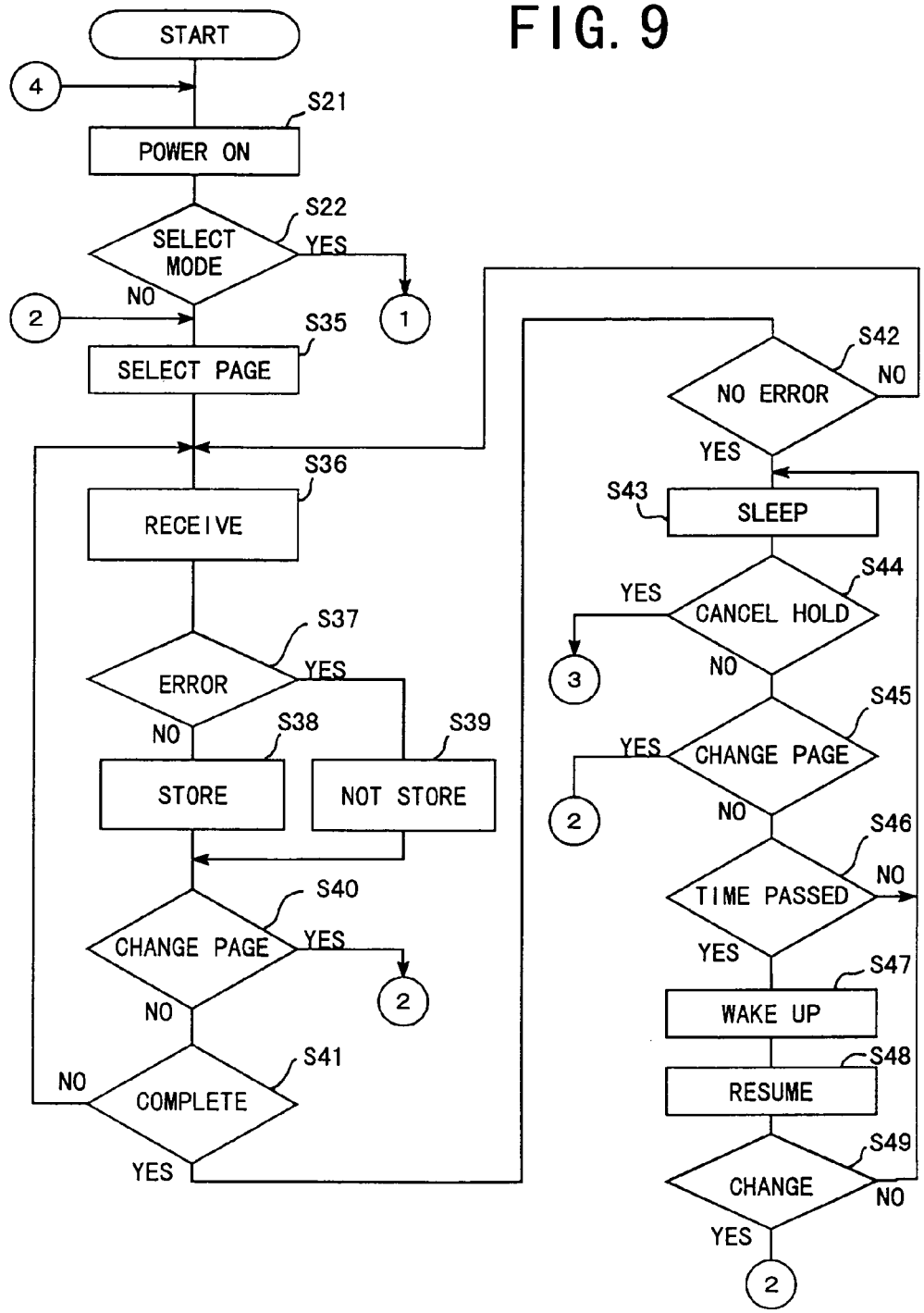
FIGS. 9 to 11 are flowcharts showing a first receiving process according to an embodiment of the present invention.

At step 21 in FIG. 9, the power is supplied to the receiving portion 320 to thereby activate the receiving portion 320. When the spread signal is transmitted from the sending apparatus 200 by the first transmitting process, the receiving portion 320 receives this spread signal, and performs the acquisition process on the basis of the synchronous signal included in the received spread signal. After the sending apparatus 200 and the viewer 300 have been synchronized with each other, the receiving portion 320 despreads and demodulates the received spread signal, and restores the original transmission data D. Further, the receiving portion 320 feeds the restored transmission data D into the processing portion 330.

Next, at step 22, the processing portion 330 reads the control information included in the header S1 of the transmission data D, and determines whether the document information is transmitted in the specific page mode or the all page mode. If the document information is transmitted in the specific page mode, then the process proceeds to step 23 in FIG. 10.

At step 23, the processing portion 330 operates in the following manner in order to receive the document information of the specific page from sending apparatus 200. Namely, the processing portion 320 receives the spread signal from the sending apparatus 200, and then obtains the transmission data D from the received spread signal, and next feeds this transmission data D into the processing portion 330. The processing portion 330 extracts the document information from the document information areas S2 of one block of this transmission data.

Next, at step 24, the processing portion 330 determines whether or not there is an error in the document information extracted from the block. If there is no error, then the processing portion 330 feeds this document information into the display control portion 340 in order to store this document information into the memory 341 (step 25). As a result, the document information corresponding to the block is stored into the memory 341, and the document information corresponding to the block is displayed on the display panel 351 of the display 350.

On the other hand, if there is an error or some errors in the document information extracted from the block, then the processing portion 330 throws this document information away. Namely, the processing portion 330 does not feed this document information to the display control portion 340 (step 26). As a result, an empty area corresponding to the block is formed in the memory 341, and a blank space is formed at the place corresponding to this block in the display panel 351.

While steps 23 to 26 are repeatedly carried out, the processing portion 330 extracts the document information from the transmission data D one after another for each block, and continuously feeds the extracted document information into the display control portion 340 for each block, except for a block including an error or some errors. As a result, the document information is stored into the memory 341 one after another for each block. Consequently, the document information is displayed on the display panel 351 block by block.

Figure 14:
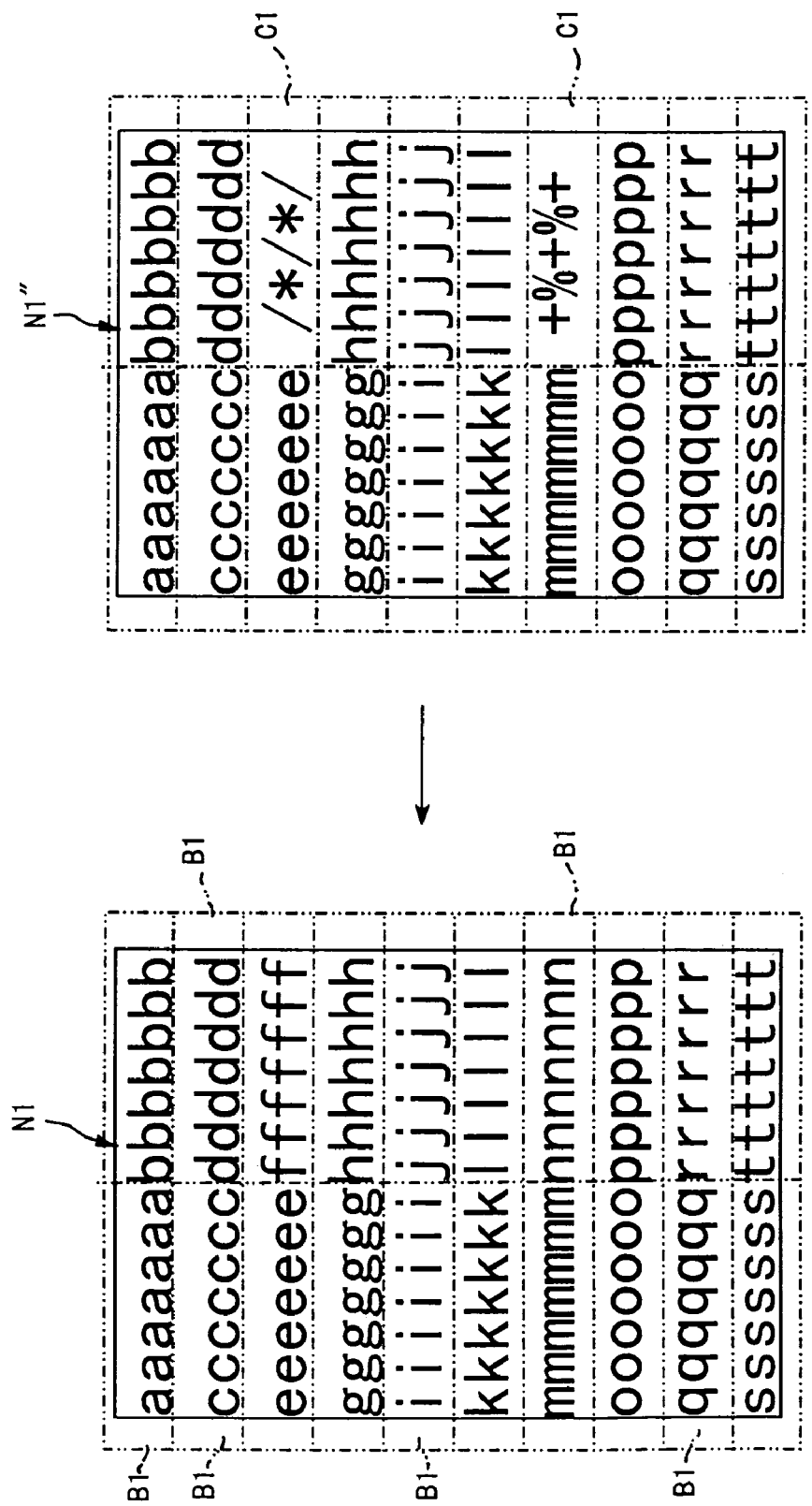

Referring to FIGS. 13 to 15, the aforementioned displaying operation will be further described. The left side of FIG. 13 shows a page N1 of the document information of the textual format including no error. The right side of FIG. 13 shows the same page N1' of the document information including some errors. The left side of FIG. 14 shows the same page N1 of the document information of the textual format including no error. The right side of FIG. 14 shows the same page N1" of the document information including some errors. The left side of FIG. 15 shows another page N4 of the document information of the bitmap format including no error. The right side of FIG. 15 shows the same page N4' of the document information including some errors.

As mentioned above, if there is an error or some errors in the document information extracted from one block, this document information is not display on the display panel

351. As a result, in case of the textual format, the blank space E1 is formed at the place corresponding to this block on the display panel 351, as shown in FIG. 13. However, as mentioned above, the number of characters included in each block B1 is not more than the number of characters arranged in one line of the page of the document information. Therefore, as shown in FIG. 13, the blank space E1 is very small, and the number of lost characters are very small. Consequently, the user can understand the contents of the displayed document information from the whole of the displayed document information, even if some blank spaces E1 has been formed in the display panel 351 due to occurrence of some errors.

Furthermore, if another document information has been previously stored in the memory 341 when the current document information is stored into the memory 341, the previous document information is replaced by the current document information. At this time, if there is an error or some errors in the current document information, a block including the errors is not stored into the memory 341, as mentioned above. As a result, as shown in FIG. 14, a part of the previous document information C1 remains at the place corresponding to the block. In addition, in order to inform the user about the occurrence of the error, the part of the previous document information C1 may be colored with a different color from other part, or the part of the previous document information Cl may be underlined.

On the other hand, in case of the bitmap format, as shown in FIG. 15, if there is an error or some errors in the document information extracted from one block, the blank space E2 is formed at the place corresponding to this block in the display panel 351. However, as mentioned above, the amount of data included in each block B2 is integral number times (e.g., several times) as much as the amount of data included in one line element of the page of the document information. Therefore, the blank space E2 is very small, and only some very thin lines are formed. Consequently, the user can understand the contents of the displayed document information from the whole of the displayed document information, even if some blank spaces E2 has been formed in the display panel 351 due to occurrence of some errors.

Figure 16:
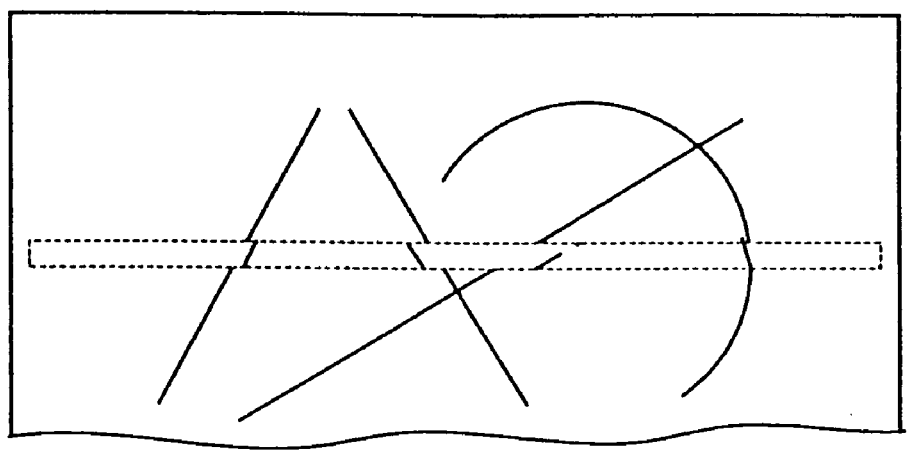
FIG. 16 is a diagram showing another document information of a bitmap format according to an embodiment of the present invention.

In addition, if the document information corresponding to one block cannot be displayed on the display panel 351 due to occurrence of an error, the document information corresponding to this one block may be complemented by using the document information corresponding to another blocks, as shown in FIG. 16.

Furthermore, there are two types of document information: document information of the textual format and the document information of the bitmap format. Therefore, the processing portion 240 actually performs two different kinds of data processing operation depending on whether the data format of the document information is the textual format or the bitmap format, in order to display both the document information of the textual format and the document information of the bitmap format.

Figure 10:
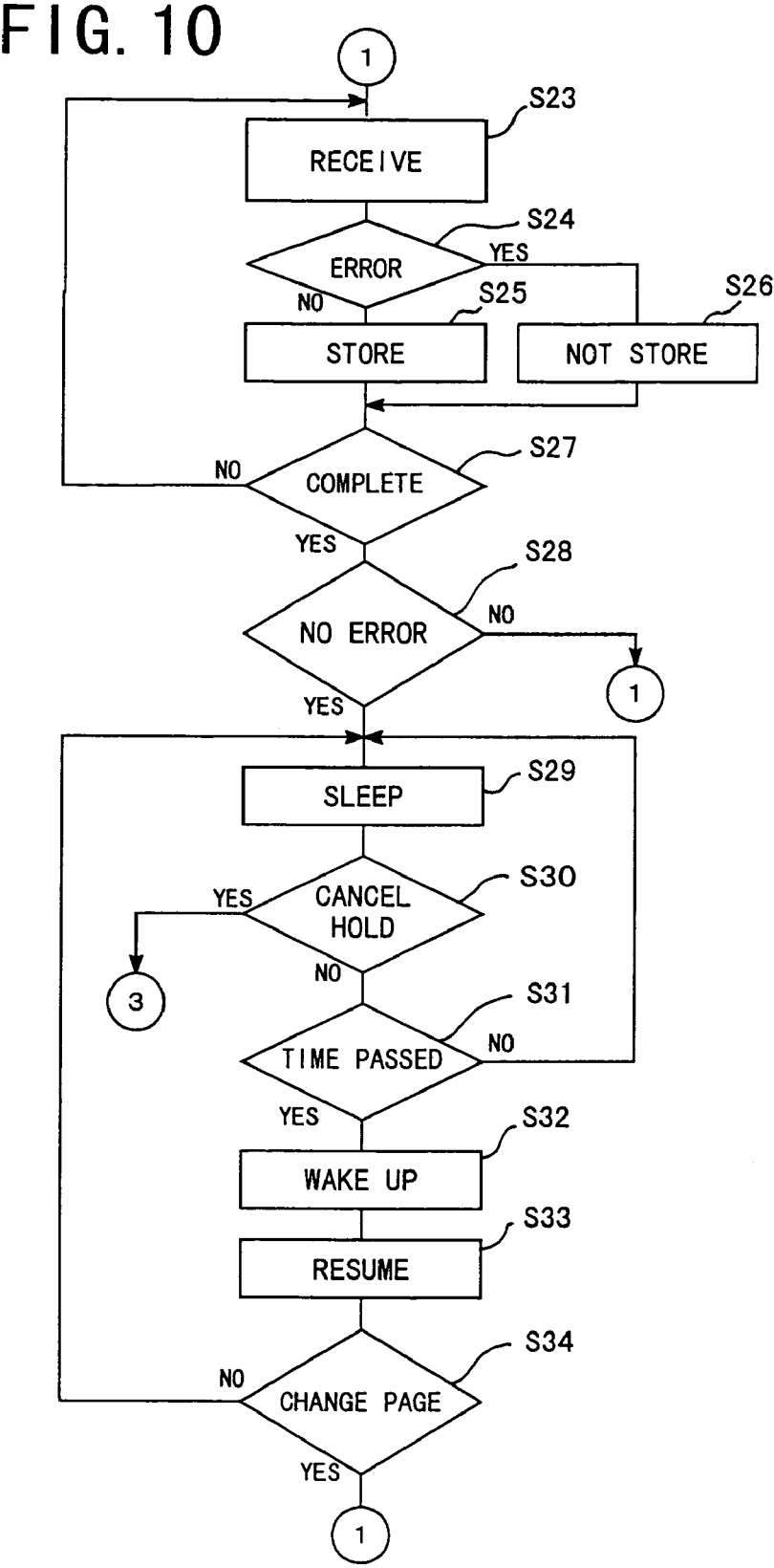

Next, as shown in FIG. 10, the first receiving process proceeds to step 27. At step 27, the processing portion 330 determines whether or not the reception of the document information of the specific page has been completed. If so, the process proceeds to the next step 28. If not, the process returns to step 23, and steps 23 to 27 are repeated until the reception of the document information of the specific page is completed.

Next, at step 28, the processing portion 330 determines whether or not the whole document information of the specific page has been stored completely into the memory 341 without any errors. If there is no error during the communication between the sending apparatus 200 and the viewer 300, the document information of the specific page is completely stored into the memory 341. However, if an error or some errors occur during the communication, one or some empty areas are formed in the memory 341. The processing portion 330 checks the memory 341. If one or some empty areas are found in the memory 341, then the processing portion 330 determines that one or some errors occurred during the communication, and the process returns to step 23.

As mentioned above, the sending apparatus 200 repeatedly transmits the document information of the specific page unless the user inputs the instruction to finish the first transmitting process to the sending apparatus 200. Therefore, the viewer 300 can receive the document information of the specific page many times. By receiving the document information of the specific page many times, such as twice or three times, the document information including no error can be obtained, and the complete document information can be stored into the memory 341. Consequently, the perfect document information including no blank space can be displayed on the display panel 351. When the document information of the specific page has been completely received and stored, the process proceeds from step 28 to step 29.

At step 29, the low noise amplifier 321, the up-converter 322 and the demodulator 323 are placed into the power off state or the suspend state, and therefore, the viewer 300 is placed into the so called "sleeping state". Therefore, it is possible to reduce the power consumption. In addition, during the sleeping state, the PLL circuit 324 is in operation. Therefore, it is possible to increase stability of the oscillating frequency, and make the acquisition process easy when communication is started again. Further, during the sleeping state, the minimum power is supplied to at least the memory 341 and display 350, so that the document information remains on the display 350 in the visible state. As a result, the user can view the document information during the sleeping state. Thus, according to the viewer 300 of the embodiment, it is possible to reduce power consumption, while keeping the document information on the display in the visible state.

Next, at step 30, the processing portion 330 determines whether or not an instruction to place the viewer 300 into a holding state, which is described later, has been issued, and whether or not an instruction to finish the first receiving process has been issued. Namely, when the user inputs the instruction to place the viewer 300 into the holding state or the instruction to finish the first receiving process to the viewer 300 by manipulating the input portion 360, the input instruction is fed into the processing portion 330. If so, the process proceeds to step 50 shown in FIG. 11. On the other hand, if neither of instructions is input, the process proceeds to the next step 31.

At step 31, the processing portion 330 determines whether or not a predetermined time has passed since the viewer 300 was placed into the sleeping state. If the predetermined time has not passed, then the process returns to step 29. Therefore, the sleeping state is continued. If the predetermined time has passed, then the process proceeds to step 32, and the processing portion 330 awakes the low noise amplifier 321, the down-converter 322 and the demodulator 323. Therefore, the viewer 300 resumes (step 33).

Next, at step 34, the processing portion 330 determines whether or not the document information transmitted from the sending apparatus 200 has been rewritten in the sending apparatus 200 and whether or not the page number of the document information transmitted from the sending apparatus 200 has been changed in the sending apparatus 200. If the document information has been rewritten, or if the page number has been changed, then the process returns to step 23 in order to receive and display the new document information. If the document information has not been rewritten, and if the page number has not been changed, then the process returns to step 29, and therefore, the viewer 300 is placed into the sleeping state, again. In addition, the information indicating that the document information has been rewritten and the information indicating the page number of the document information are included in the header S1.

Thus, in steps 29 to 34, the viewer 300 wakes at predetermined time intervals to renew the document information. Except for this case, the viewer 300 is mainly in the sleeping state.

On the other hand, at step 22 in FIG. 9, if the processing portion 330 determines that the document information is transmitted from the sending apparatus 200 in the all page mode, then the process proceeds to step 22 to step 35.

In case of the all page mode, the viewer 300 selects one page from among the transmitted document information. Actually, the user inputs a page number into the processing portion 330 by manipulating the input portion 370, and then, at step 35, the processing portion 330 recognizes the input page number as a "selected page".

Next, at step 36, the processing portion 330 operates in the following manner in order to receive the document information of the selected page. As mentioned above, the sending apparatus 200 repeatedly transmits the spread signal corresponding to the document information of all pages to the viewer 300. The processing portion 320 receives this spread signal, and then obtains the transmission data D from the received spread signal, and next feeds this transmission data D into the processing portion 330. Next, the processing portion 330 checks one block of this transmission data D, and recognizes the page number by referring to the header S1 included in the block. Further, the processing portion 330 compares the recognized page number with the selected page number. If the recognized page number is different from the selected page number, the processing portion 330 ignores the block. If the recognized page number is equal to the selected page number, the processing portion 330 extracts the document information from the block.

Next, at step 37, the processing portion 330 determines whether or not there is an error or some errors in the document information extracted from the block. If there is no error, then the processing portion 330 feeds this document information into the display control portion 340 in order to store this document information into the memory 340 (step 38). As a result, the document information corresponding to the block is stored into the memory 341, and then, the document information corresponding to the block is displayed on the display panel 351 of the display 350. On the other hand, if there is an error or some errors in the document information extracted from the block, then the processing portion 330 does not feed this document information to the display control portion 340 (step 39). As a result, an empty area corresponding to the block is formed in the memory 341. Hence, as shown in FIG. 13 or 15, a blank space E1 or E2 is formed at the place corresponding to this block in the display panel 351, or the part of the previous document information C1 remains, as shown in FIG. 14.

Next, at step 40, the processing portion 330 determines whether or not the selected page has been changed. If the user inputs a different page number by manipulating the input portion 370, the selected page is changed. If so, the process returns to step 35. On the other hand, if there is no change of the selected page, then the process proceeds to the next step 41.

At step 41, the processing portion 330 determines whether or not the reception of the document information of the selected page has been completed. If so, the process proceeds to the next step 42. If not, the process returns to step 36, and steps 36 to 41 are repeated.

At step 42, like step 28, the processing portion 330 determines whether or not the whole document information of the selected page has been completely stored into the memory 341 without any errors. If not, it can be expected that one or some errors occurred during the communication between the sending apparatus 200 to the viewer 300, and therefore, the process returns to step 36. As mentioned above, the sending apparatus 200 repeatedly transmitted the document information of all pages to the viewer 300. Therefore, the viewer 300 can receive the document information of the selected page many times until the whole document information of the selected page is completely stored into memory 341.

If the whole document information of the selected page has been stored into the memory 341 completely, the process proceeds to the next step 43. At this stage, the whole document information of the selected page is displayed on the display panel 351 completely.

Like step 29, the processing portion 330 places the viewer 300 into the sleeping state at step 43. Next, like step 30, the processor portion 330 determines whether or not the instruction to place the viewer 300 into the holding state has been issued, and whether or not the instruction to finish the first receiving process has been issued (step 44).

Next, at step 45, the processing portion 330 determines whether or not the selected page has been changed. If the user inputs a different page number by manipulating the input portion 370, the selected page is changed. In this case, the processing portion 330 determines that the selected page has been changed, and then, the process returns to step 35. If there is no change of the selected page, then the process proceeds to the next step 46.

At step 46, the processing portion 330 determines whether or not a predetermined time has passed since the viewer 300 was placed into the sleeping state. If so, the process proceeds to the next step 47. At step 47, the processing portion 330 awakes the viewer 300, and the viewer 300 resumes (step 48). If not, the process returns from step 46 to step 43, and the sleep state is continued.

Next, at step 49, the processing portion 330 determines whether or not the document information transmitted from the sending apparatus 200 has been changed in the sending apparatus 200. If so, the process returns to step 35 in order to receive and display the document information that has been changed. If not, the process returns to step 43, and the viewer 300 is placed into the sleeping state, again.

Thus, in steps 43 to 49, the viewer 300 wakes at predetermined time intervals to renew the document information. Except for this case, the viewer 300 is mainly in the sleeping state.

Figure 11:
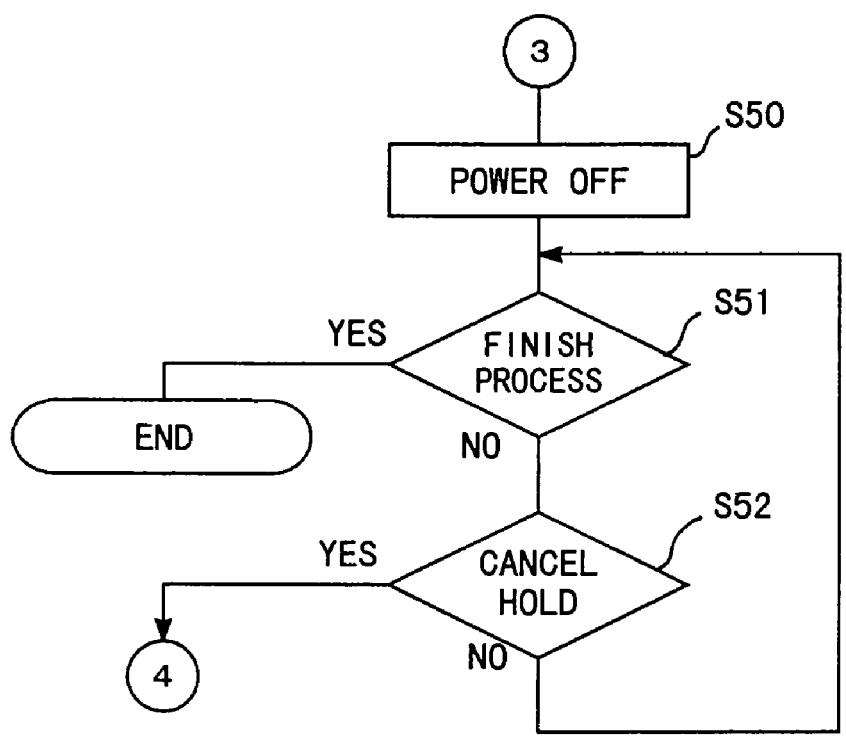

On the other hand, at step 30 or 44, if the processing portion 330 determines that either of an instruction to place the viewer 300 into the holding state and an instruction to finish the first receiving process has been issued, then the process proceeds to step 50 in FIG. 11.

At step 50, the processing portion 330 places the viewer 300 into the holding state. In the holding state, the receiving portion 320 (the low noise amplifier 321, the down-converter 322, the demodulator 323 and the PLL circuit 324) and the processing portion 330 are placed into the power off state or the suspended state. Further, like the sleeping state, the minimum power is supplied to at least the memory 341 and display 350 during the holding state, so that the document information remains on the display panel 351 in the visible state during the holding state. Furthermore, unlike the sleeping state, the receiving operation is completely suspended during the holding state. Therefore, the viewer 300 cannot receive the document information during the holding state, so that the document information on the display panel 351 can be held until the user inputs an instruction to cancel the hold state (step 52). Consequently, the document information can be displayed for a long time while restricting power consumption.

On the other hand, if the instruction to finish the first receiving process has been issued, the first receiving process ends (step 51=YES).

According to the viewer system 100 of the embodiment, the document information can be sent from the sending apparatus 200 to the viewer 300 for each page, and the whole of the document information of one page can be easily displayed on the display 350 at a time. Therefore, the viewer 300 can appropriately used instead of paper documents, for example, in a meeting or a conference. If the viewer system 100 is used, paper documents become useless.

Further, according to the viewer system 100 of the embodiment, the sending apparatus 200 repeatedly transmits the document information many times regardless of a receiving condition of the viewer 300. Therefore, if an error or some errors occur while the viewer 300 is receiving the document information, the viewer 300 can receive the complete document information soon by receiving the document information again.

In addition, since the document information is transmitted from the sending apparatus 200 to the viewer 300 by using the frequency hopping method, the carrier frequency of the document information (spread signal) is changed in random during the communication. Therefore, the carrier frequency pattern of the first transmission of the document information is different from that of the second transmission. As a result, if an error occurs during the first reception of the document information because a part of the frequency band is in bad condition, the error can be removed during the second reception because the carrier frequency in the second reception is different from that in the first reception due to random frequency change.

Furthermore, if the document information includes only characters (text data), the sending apparatus transmits the document information in the textual format. Therefore, it is possible to transmit the document information including only characters quickly, and increase efficiency of transmission of the document information.

Further, as shown in FIG. 1, the viewer 300 has: the body 301 shaped like a flat thin board; the most standard size display 350 (for example, A4 size or standard letter size); the minimum capacity memory 341 enough to store the document information of only one page and small size additional information; and the other aforementioned minimum control means. Thus, the construction of the viewer 300 is very simple, and manufacturing cost of the viewer 300 is inexpensive. Therefore, the viewer system 100 can be built at small expense.

Transmitting Process and Receiving Process II

Next, a second embodiment of the transmitting process (Hereinafter, it is referred to as a second transmitting process.) will be described with reference to FIG. 17. The second transmitting process is an improved transmitting process based upon the aforementioned first transmitting process, and therefore, the basic part of the second transmitting process is similar to the first transmitting process. Like the first transmitting process, the second transmitting process is a process to transmit the document information from the sending apparatus 200 to the viewer 300, and it is carried out by the processing portion 240 of the sending apparatus 200. Unlike the first transmitting process, the document information can be transmitted in various display forms in the second transmitting process.

Figure 17:
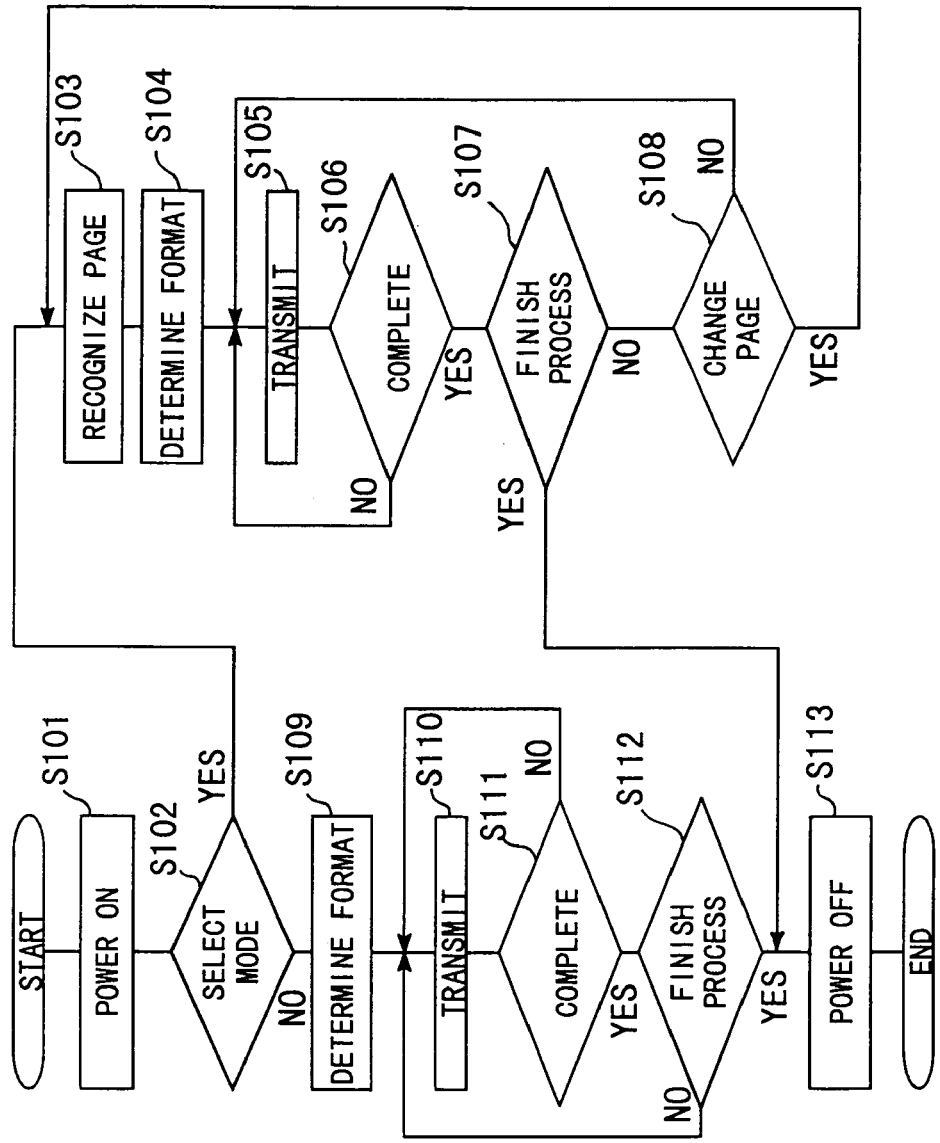
FIG. 17 is a flowchart showing a second transmitting process according to an embodiment of the present invention.

As shown in FIG. 17, at step 101, the power is supplied to the transmitting portion 250 to thereby activate the transmitting portion 250. Next, at step 102, the processing portion 240 determines whether the document information is transmitted in the specific page mode or the all page mode. In the second transmitting process, the document information can be transmitted from the sending apparatus 200 to the viewer 300 in two transmission modes: a page specific mode and an all page mode. In the specific page mode, the sending apparatus 200 sends the document information of one specific page in one specific display form. In the all page mode, the sending apparatus 200 sends the document information of all pages in various display forms.

The display form means a form of the document information to be displayed on the display 350 of the viewer 300, such as a scale of characters and images, a direction of lines (a direction of an arrangement of characters in a page), density of characters, a page size, etc.

Figure 25:
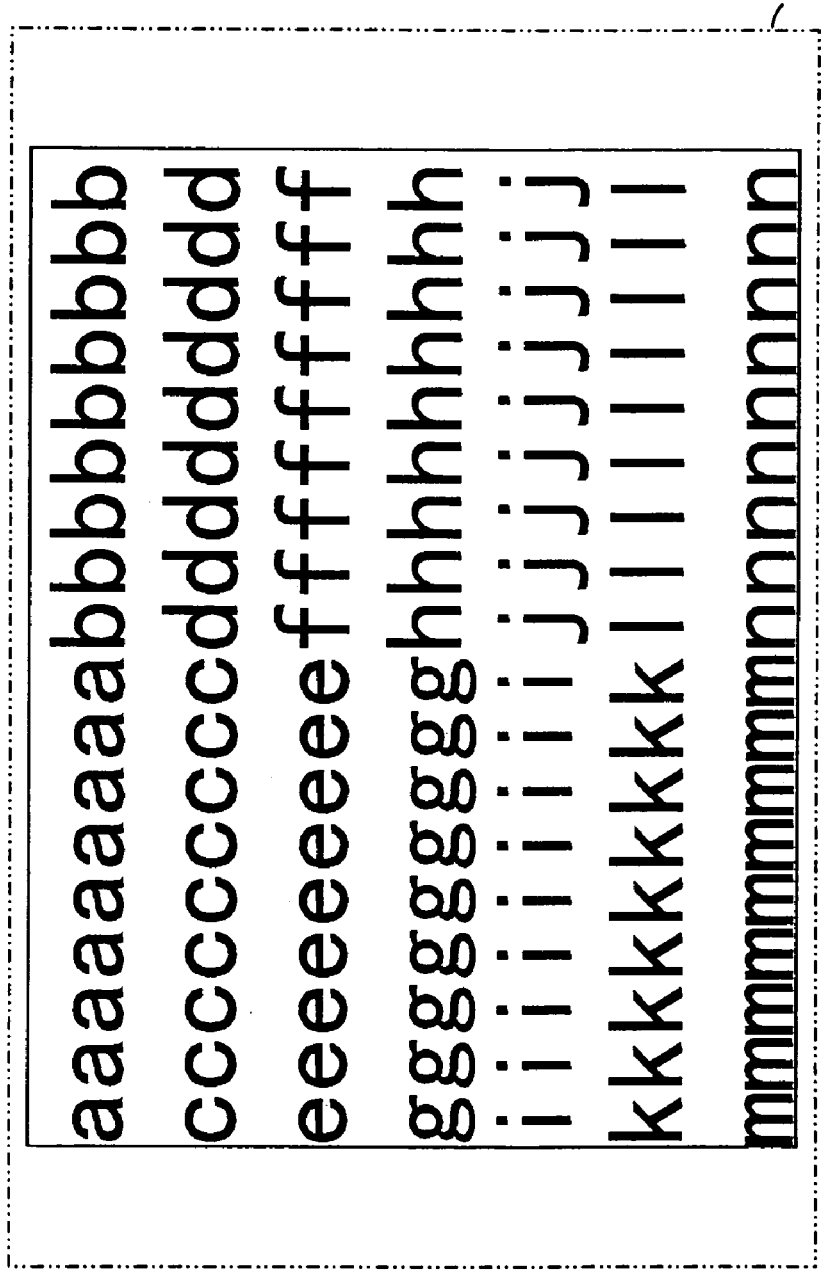
Figure 26:
Figure 28:

FIGS. 21 to 28 show display forms of the document information. FIG. 21 shows a first display form, which is the normal display form. In the first display form, the page size is a standard size, which is the same size as the display panel 351 of the viewer 300, for example, A4 size or standard letter size. FIG. 22 shows a second display form, in which the characters are arranged in the different direction from the normal display form. This display form is suitable for the Japanese language. FIG. 23 shows a third display form, in which density of characters is relatively low and the space between adjacent characters is relatively large. FIG. 24 shows a fourth display form, in which density of characters is relatively high and the space between adjacent characters is relatively small. FIG. 25 shows a fifth display form, which is different from the normal display form in page size. In the fifth display form, the page size corresponds to the display panel size of standard computer monitors. FIG. 26 shows a sixth display form, in which characters and images are displayed in large scale. FIG. 27 shows a seventh display form, in which characters and images are displayed in small scale. In the seventh display form, one page is placed in a quarter area of the whole display panel 351. FIG. 28 shows a eighth display form, in which characters and images are displayed in a half area of display panel 351. Such display forms are available in the viewer system 100 in the embodiment. In addition, the display forms are not limited to the foregoing.

If the user selects the specific page mode by manipulating the personal computer 210, the user further inputs a page number and an instruction to select one display form from among aforementioned display forms into the personal computer 210. Then, information indicating that the specific page mode has been selected, information indicating the input page number, and information indicating the selected display form are sent from personal computer 210 to the processing portion 240, together with the document information. At step 102 in FIG. 17, the processing portion 240 receives these information, and recognizes that the specific page mode has been selected. Further, at step 103, the processing portion 240 recognizes the input page number and the selected display form as a specific page number and a specific display form, respectively.

When the specific page mode has been selected, the personal computer 210 further sends information indicating the data format of the document information of the specific page. At step 104, the processing portion 240 receives this information, and determines whether the data format of the document information of the specific page is the textual format or the bitmap format.

Next, at step 105, the processing portion 240 transmits the document information of the specific page in the specific display form to the viewer 300 in the following manner. First, the processing portion 240 receives the document information of the specific page from the personal computer 210, and converts the display form of the received document information from the initial display form (e.g., the first display form) to the specific display form. Next, if the data format of the received document information is the textual format, the processing portion 240 divides this document information into the blocks B1, shown in FIG. 13. On the other hand, if the data format of the received document information is the bitmap format, the processing portion 240 divides this document information into the blocks B2, shown in FIG. 15. Next, the processing portion 240 converts the divided document information into the transmission data D in the same process as the aforementioned step 5 in FIG. 8. Further, at this time, information indicating the specific display form is added into the header S1 as control information. Next, the transmission data D is modulated and spread by the transmitting portion 250, and then, the spread transmission data D, i.e., the spread signal is transmitted to the viewer 300 via the antenna 230.

Next, at step 106, the processing portion 240 determines whether or not the transmission of the document information of the specific page has been completed. If so, the process proceeds to the next step 106. If not, steps 105 and 106 are repeated.

At step 107, the processing portion 240 determines whether or not an instruction to finish the second transmitting process has been issued by the user. If so, the process proceeds to step 113, and the transmitting potion 250 is powered off or suspended, and then, the second transmitting process ends. If not, the process proceeds to the next step 108.

At step 108, the processing portion 240 determines whether or not the page number of the document information has been changed by the user and whether or not the display form has been changed by the user. If the page number has been changed, or if the display form has been changed, the process returns to step 103. Therefore, the document information of the new page is transmitted to the viewer 300, or the document information is transmitted to the viewer in the new display form. If neither the page number nor the display form has been changed, then the process returns to step 105, and therefore, the current document information is continuously transmitted to the viewer 300 in the current display form.

On the other hand, if the user selects the all page mode by manipulating the personal computer 210, then information indicating that the all page mode has been selected is sent from personal computer 210 to the processing portion 240. Then, at step 102, the processing portion 240 receives this information, and recognizes that the all page mode has been selected. As a result, the process proceeds from step 102 to step 109.

When the all page mode has been selected, the personal computer 210 further sends information indicating the data format of the document information. At step 109, the processing portion 240 receives this information, and determines whether the data format of the document information is the textual format or the bitmap format.

At step 110, the processing portion 240 transmits the document information of all pages to the viewer 300 in all of the display forms in the following manner. First, the processing portion 240 receives the document information from the personal computer 210, and converts the display form of the received document information. Next, if the data format of the received document information is the textual format, the processing portion 240 divides this document information into the blocks B1, as shown in FIG. 13. On the other hand, if the data format of the received document information is the bitmap format, the processing portion 240 divides this document information into the blocks B2, as shown in FIG. 15. Next, the processing portion 240 converts the divided document information into the transmission data D in the same process as the aforementioned step 5. Further, the transmission data D is modulated and spread by the transmitting portion 250, and then, the spread transmission data D, i.e., the spread signal is transmitted to the viewer 300 via the antenna 230.

Next, at step 111, the processing portion 240 determines whether or not the transmission of the document information of all pages in all of the display forms has been completed. If so, the process proceeds to the next step 112. If not, steps 110 and 111 are repeated.

Thus, the sending apparatus 200 transmits the document information of all pages, and, at this time, the sending apparatus 200 repeatedly transmits the document information of each page in all of the display forms by changing the display form one after another. For example, first, the sending apparatus 200 transmits the document information of the first page in the first display form, and next, transmits the document information of the same page in the second display form, and next, transmits the document information of the same page in the third display form. In this manner, the sending apparatus 200 repeatedly transmits the document information of the first page in all of the display forms by changing the display form one after another. Thereafter, the sending apparatus 200 repeatedly transmits the document information of the second page in all of the display forms by changing the display form one after another. In this manner, the sending apparatus 200 transmits the document information of all pages in all the display forms. In addition, order of the pages and order of the display forms are not limited to the foregoing example.

At step 112, the processing portion 240 further determines whether or not an instruction to finish the second transmitting process has been issued by the user. If so, the transmitting portion 250 is powered off or suspended (step 113), and the second transmitting process ends. If not, the process returns to step 110.

Next, a second embodiment of the receiving process (Hereinafter, it is referred to as a second receiving process.) will be described with reference to FIGS. 18 to 20. The second receiving process is an improved receiving process based upon the aforementioned first receiving process, and therefore, the basic part of the second receiving process is similar to the aforementioned first receiving process. The second receiving process is a process to receive the document information transmitted from the sending apparatus 200 by the second transmitting process, and it is carried out by the processing portion 330 of the viewer 300. In the second receiving process, the received document information can be displayed in various display forms.

Figure 18:
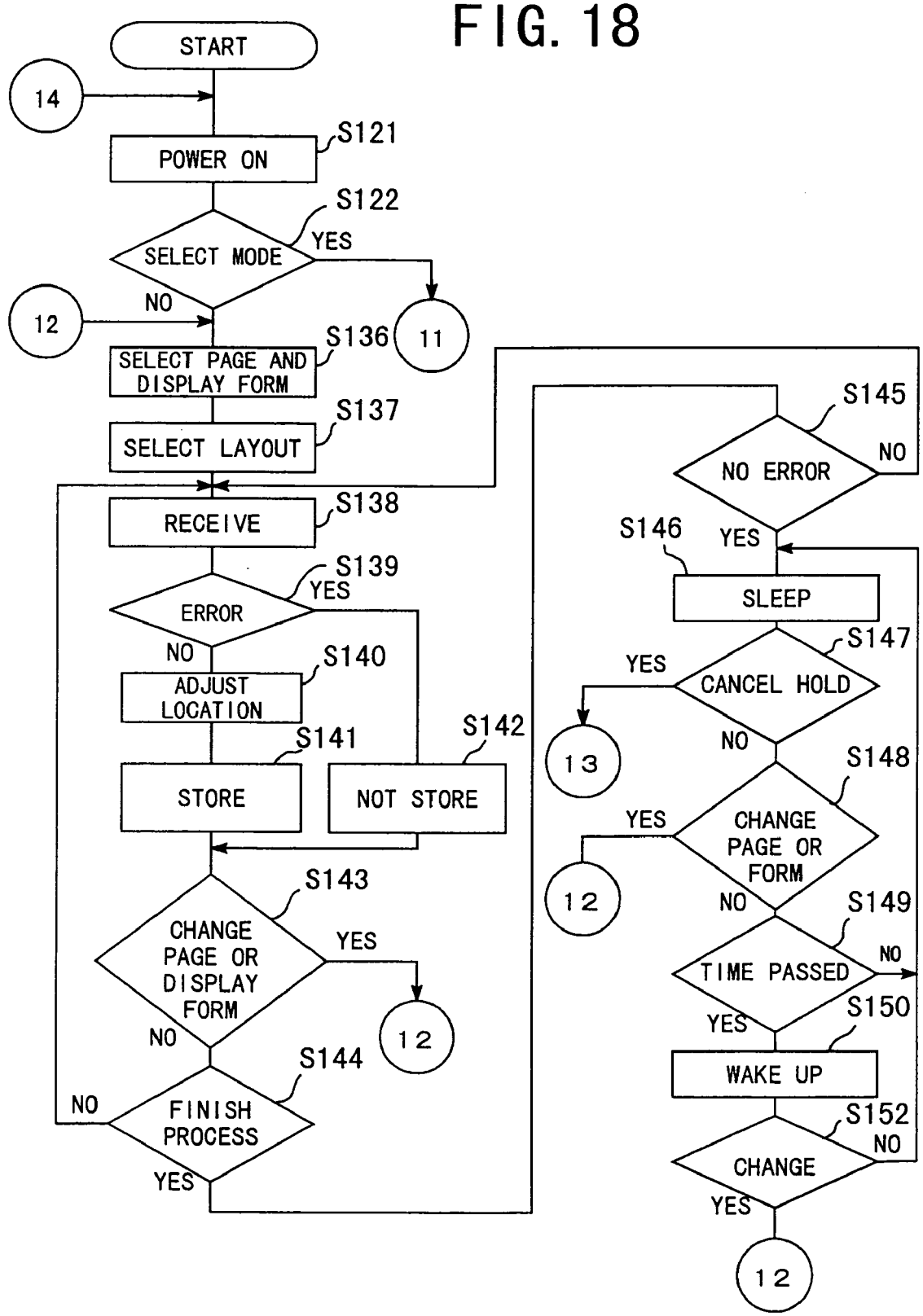
FIGS. 18 to 20 are flowcharts showing a second receiving process according to an embodiment of the present invention.

At step 121 in FIG. 18, the power is supplied to the receiving portion 320 to thereby activate the receiving portion 320, and the receiving portion 320 begins to receive the spread signal from the sending apparatus 200. First, the receiving portion 320 performs the acquisition process on the basis of the synchronous signal included in the received spread signal. Next, the receiving portion 320 despreads and demodulates the received spread signal, and restores the original transmission data D. Further, the receiving portion 320 feeds the restored transmission data D into the processing portion 330.

Next, at step 122, the processing portion 330 reads the control information included in the header S1 of the transmission data D, and determines whether the document information is transmitted in the specific page mode or the all page mode. If the document information is transmitted in the specific page mode, then the process proceeds to step 123 in FIG. 19.

At step 123, the processing portion 330 operates in the following manner in order to receive the document information of the specific page from the sending apparatus 200. Namely, the receiving portion 320 receives the spread signal corresponding to the document information of the specific page, and then obtains the transmission data D from the received spread signal, and next feeds this transmission data D into the processing portion 330. The processing portion 330 extracts the document information from the document information areas S2 of one block of this transmission data D.

Next, at step 124, the processing portion 330 determines whether or not there is an error or some errors in the document information extracted from the block. If there is no error, then the process proceeds to step 125.

If the page size of the received document information is different from the size of the display panel 351, the processing portion 330 adjusts a display location of the document information within the display panel 351. If, for example, the specific display form is the fifth display form, the processing portion 330 adjusts a display location of the document information so as to display it at the center of the display panel 351, as shown in FIG. 25. Further, if the specific display form is the eighth display form, the processing portion 330 adjusts a display location of the document information so as to display it on the left side of the display panel 351, as shown in FIG. 28. Actually, at step 125, the processing portion 330 calculates a memory address of the memory 341 in order to display the document information at a certain display location within the display panel 351.

Next, at step 126, the processing portion 330 feeds the document information corresponding to the block into the display control portion 340 in order to store this document information into in the memory 341. As a result, the document information corresponding to the block is stored into the memory 341, and the document information corresponding to the block is displayed on the display panel 351 of the display 350. At this time, the document information corresponding to the block is stored at the calculated memory address in the memory 341. Therefore, the document information corresponding to the block is located at the certain display location within the display panel 351. Furthermore, if the page size of the document information is smaller than the size of the display panel 351, a blank space is formed around the document information in the display panel 351 by storing blank data into the memory 341, as shown in FIGS. 25, 27 and 28.

On the other hand, at step 124, if there is an error or some errors in the document information extracted from the block, then the processing portion 330 does not feed this document information to the display control portion 340 (step 127). As a result, an empty area corresponding to the block is formed in the memory 341, and a blank space is formed at the place corresponding to this block in the display panel 351.

While steps 123 to 127 are repeatedly carried out, the document information is stored into the memory 341 one after another for each block, except for a block including an error or some errors. Consequently, the document information is displayed on the display panel 351 block by block.

Next, at step 128, the processing portion 330 determines whether or not the reception of the document information of the specific page has been completed. If so, the process proceeds to the next step 129. If not, the process returns to step 123, and steps 123 to 127 are repeated until the reception of the document information of the specific page is completed.

Next, at step 129, the processing portion 330 determines whether or not the whole document information of the specific page has been completely stored into the memory 341 without any errors. If so, the process proceeds to the next step 130. If not, the process returns to step 123, and steps 123 to 128 are repeated until the whole document information of the specific page is stored completely into the memory 341 without any errors. When the whole document information of the specific page is completely stored into the memory 341, the perfect document information is displayed in the display panel 351 in the specific display form.

Next, steps 130 to 134 are carried out. These steps are similar to the aforementioned steps 29 to 33 of the first receiving process shown in FIG. 10.

Next, at step 135, the processing portion 330 determines whether or not the document information transmitted from the sending apparatus 200 has been rewritten in the sending apparatus 200, whether or not the page number of the document information has been changed in the sending apparatus 200, and whether or not the display form of the document information has been changed in the sending apparatus 200. If the document information has been rewritten, if the page number has been changed, or if the display form has been changed, then the process returns to step 123 in order to receive and display the new document information. On the other hand, if the document information has not been rewritten, if the page number has not been changed, and if the display form has not been changed, then the process returns to step 130.

On the other hand, at step 122 in FIG. 18, if the processing portion 330 determines that the document information is transmitted from the sending apparatus 200 in the all page mode, then the process proceeds to step 122 to step 136.

At step 136, the viewer 300 selects one page number, and further selects one display form from among the aforementioned eight display forms, for example. Actually, the user inputs a page number and an instruction to select a display form into the processing portion 330 by manipulating the input portion 370, and then, the processing portion 330 recognizes the input page number and the input display form as a "selected page" and a "selected display form", respectively.

Figure 31:
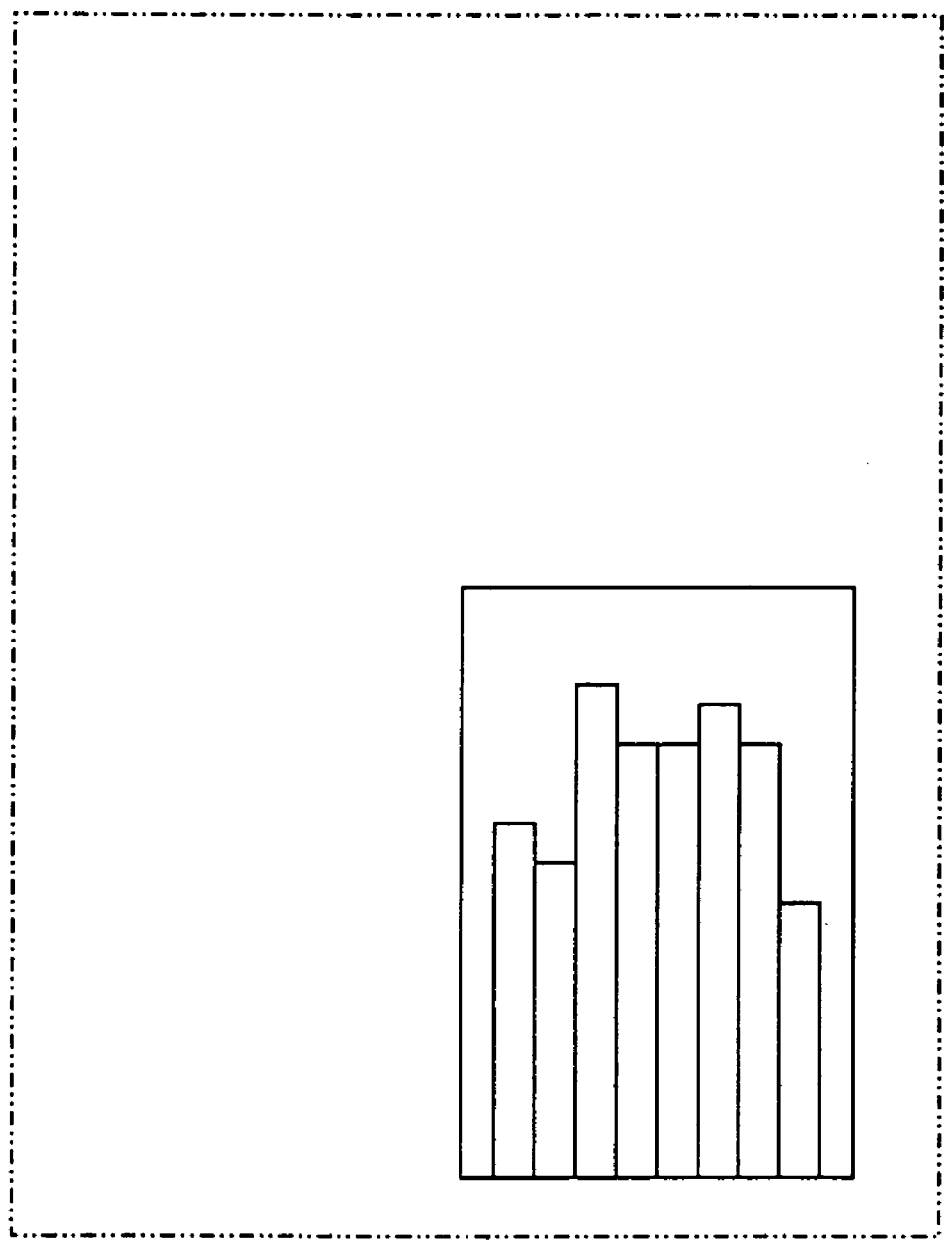
FIG. 31 is a diagram showing document information according to an embodiment of the present invention.
Figure 32:
FIG. 32 is a diagram showing another example of the display layout pattern according to an embodiment of the present invention.

Further, in case of the all page mode, the viewer 300 can simultaneously display a plurality of pages of the document information, as shown in FIGS. 29, 30 and 32. FIG. 29 shows a first display layout pattern, in which document information of four pages are arranged within the area corresponding to the display panel 351. FIG. 30 shows a second display layout pattern, in which document information of two pages are arranged within the area corresponding to the display panel 351. FIG. 32 shows a third layout pattern, in which one document information (e.g., the document information shown in FIG. 31) is placed on another document information (e.g., the document information shown in FIG. 21). These display layout patterns are prepared in advance in the viewer 300. In addition, display layout patterns are not limited to the foregoing examples. When a plurality of pages are simultaneously displayed, the user can selects a display layout pattern from among the prepared display layout patterns. Actually, the user can further input page numbers and an instruction to select a display layout pattern into the processing portion 330 by manipulating the input portion 370, and then, at step 137, the processing portion 330 recognizes the input page numbers and the input display layout pattern as "selected pages" and a "selected display layout pattern", respectively.

Next, at step 138, the processing portion 330 operates in the following manner in order to receive the document information of the selected page in the selected display form. As mentioned above, the sending apparatus 200 repeatedly transmits the document information of all pages to the viewer 300 in all of the display forms, namely, the spread signal corresponding to these document information. The receiving portion 320 receives this spread signal, and then obtains the transmission data D from the received spread signal, and next feeds this transmission data D into the processing portion 330. Next, the processing portion 330 checks one block of this transmission data D, and recognizes the page number and the display form of the document information included in the block by referring to the header S1. Further, the processing portion 330 compares the recognized page number and the recognized display form with the selected page number and the selected display form, respectively. If the recognized page number is different from the selected page number, or if the recognized display form is different from the selected display form, then the processing portion 330 ignores the block. If the recognized page number is equal to the selected page number and if the recognized display form is equal to the selected display form, then the processing portion 330 extracts the document information from the block.

Next, at step 139, the processing portion 330 determines whether or not there is an error or some errors in the document information extracted from the block. If there is no error, then the process proceeds to step 140.

If the page size of the received document information is different from the size of the display panel 351, then the processing portion 330 adjusts a display location of the document information within the display panel 351. The display location is decided by the memory address of the memory 341. Actually, at step 140, the processing portion 330 calculates a memory address of the memory 341 so as to display the document information at a certain display location within the display panel 351, for example, at the center of the display panel 351. This operation is similar to the aforementioned operation at step 125 in FIG. 19.

Further, if the document information of a plurality of pages are simultaneously displayed on the display panel 351, the processing portion 330 adjusts the display locations of the document information of each page in accordance with the display layout pattern selected by the user in the step 137. Actually, at step 140, the processing portion 240 calculates a memory address of the memory 341 in order to display the document information of each page in accordance with the selected display layout pattern.

Next, at step 141, the processing portion 330 feeds the document information corresponding to the block into the display control portion 340 in order to store this document information into the memory 341. As a result, the document information corresponding to the block is stored into the memory 341, and the document information corresponding to the block is displayed on the display panel 351 of the display 350. At this time, the document information corresponding to the block is placed on the calculated memory address in the memory 341. Therefore, the document information corresponding to the block is located at the certain display location within the display panel 351.

On the other hand, at step 139, if there is an error or some errors in the document information extracted from the block, then the processing portion 330 does not feed this document information to the display control portion 340 (step 142). As a result, an empty area corresponding to the block is formed in the memory 341, and a blank space is formed at the place corresponding to this block in the display panel 351.

While steps 138 to 142 are repeatedly carried out, the document information is stored into the memory 341 one after another for each block. Consequently, the document information is displayed on the display panel 351 block by block.

Next, at step 143, the processing portion 330 determines whether or not the selected page number has been changed and whether or not the selected display form has been changed. If the user inputs a different page number by manipulating the input portion 370, or if the user inputs an instruction to select a different display form, the process returns to step 136. If neither the selected page number nor the selected display form has been changed, the process proceeds to the next step 144. In addition, if the document information of a plurality of pages are simultaneously displayed on the display panel 351, the processing portion further determines whether or not the selected display layout pattern has been changed. If so, the process returns to step 137. If not, the process proceeds to the next step 144.

At step 144, the processing portion 330 determines whether or not the reception of the document information of the selected page has been completed. If so, the process proceeds to the next step 145. If not, the process returns to step 138, and steps 138 to 142 are repeated. In addition, if the document information of a plurality of pages are simultaneously displayed on the display panel 351, the processing portion 330 determines whether or not the reception of the document information of all of the plurality of pages has been completed. If so, the process proceeds to the next step 145. If not, the process returns to step 138, and steps 138 to 142 are repeated.

Figure 19:
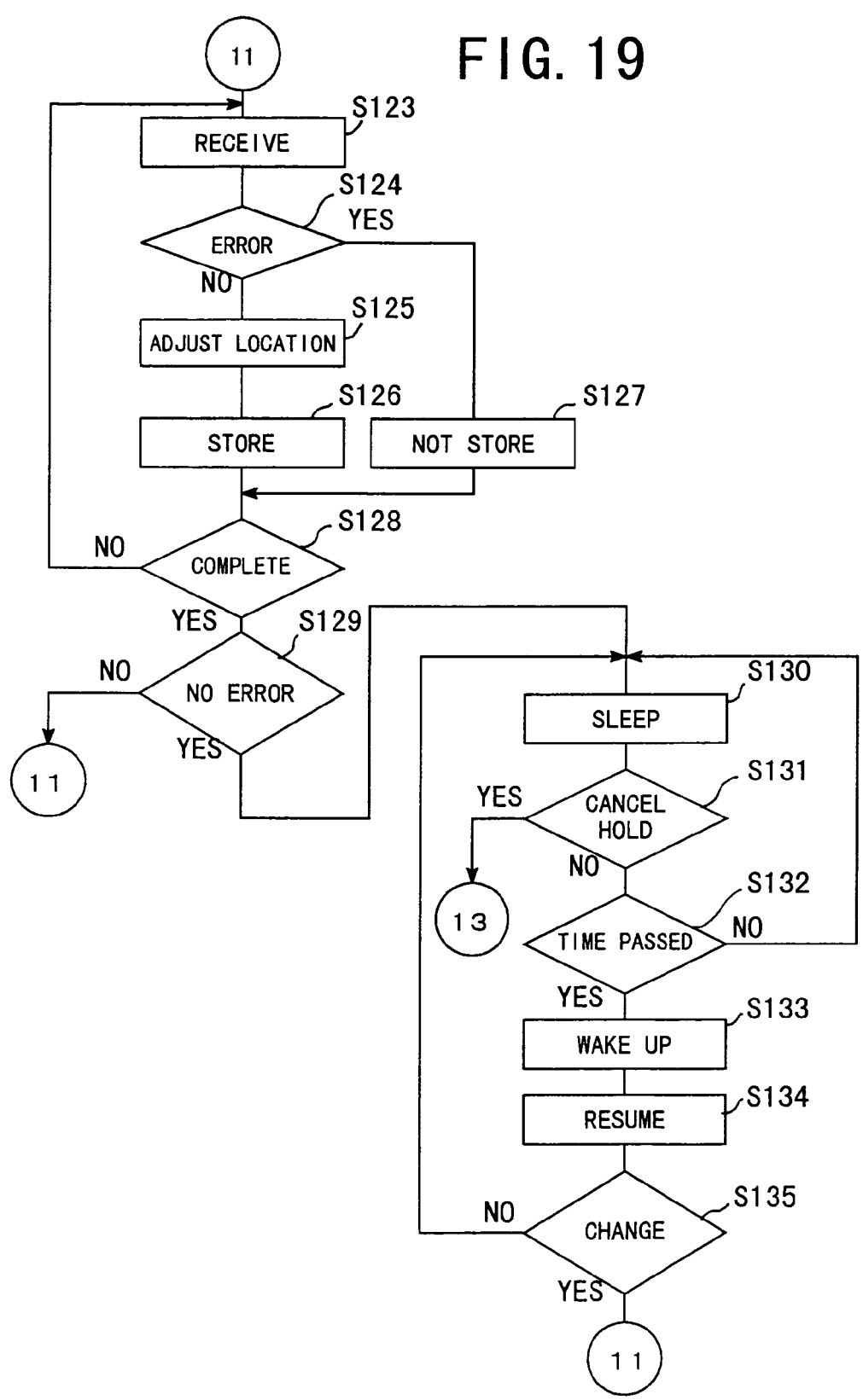

At step 145, like step 129 in FIG. 19, the processing portion 330 determines whether or not the whole document information of the selected page has been stored completely into the memory 341 without any errors. If not, it can be expected that one or some errors occurred during the communication between the sending apparatus 200 and the viewer 300, and therefore, the process returns to step 138 to receive the document information again. If the whole document information of the selected page has been stored into the memory 341 completely, the process proceeds to the next step 146. At this stage, the whole document information of the selected page is displayed on the display panel 351 completely. In addition, if the document information of a plurality of pages are simultaneously displayed on the display panel 351, the processing portion 330 determines whether or not the whole document information of all of the plurality of pages has been completely stored in the memory 341 without any errors. If not. then the process returns to step 138. If so, the process proceeds to the next step 146.

Next, steps 146 and 147 are carried out. These steps are similar to the aforementioned steps 43 and 44 of the first receiving process shown in FIG. 9.

Next, at step 148, the processing portion 330 determines whether or not the selected page has been changed and whether or not the selected display form has been changed. If the user inputs a different page number or an instruction to select a different display form by manipulating the input portion 370, the processing portion 330 determines that the selected page number or the selected display form has been changed, and then, the process returns to step 136. If neither the selected page number nor the selected display form has been changed, then the process proceeds to the next step 149. In addition, if the document information of a plurality of pages are simultaneously displayed on the display panel 351, the processing portion 330 further determines whether or not the selected display layout pattern has been changed. If so, the process returns to step 137. If not, the process proceeds to the next step 149.

Next, steps 149 to 151 are carried out. These steps are similar to the aforementioned steps 46 and 48 of the first receiving process shown in FIG. 9.

Next, at step 152, the processing portion 330 determines whether or not the document information transmitted from the sending apparatus 200 has been changed in the sending apparatus 200. If so, then the process returns to step 136 in order to receive and display the document information that has been changed. If not, the process returns to step 146.

Figure 20:
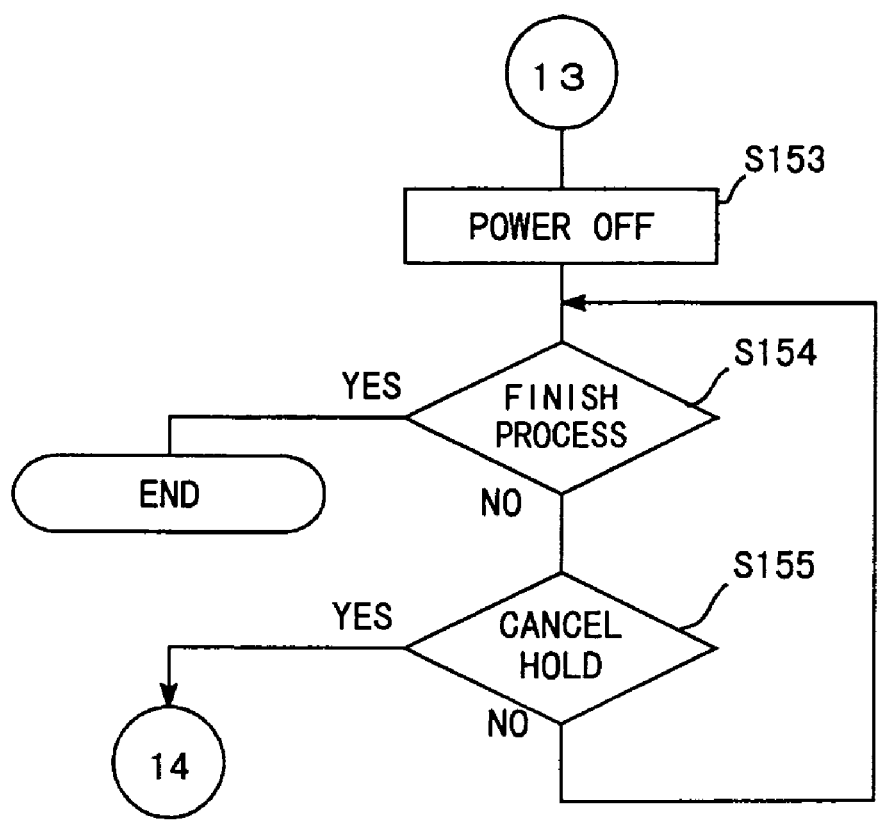

In addition, steps 153 to 155 in FIG. 20 is similar to the aforementioned steps 50 to 52 in FIG. 11. If the instruction to finish the second receiving process has been issued by the user (step 154= YES), the second receiving process ends.

As described above, the sending apparatus 200 repeatedly transmits the document information in various display forms by changing the display form one after another. The viewer 300 can display the document information in various display forms by only receiving the document information from the sending apparatus 200. Thus, the viewer 300 does not produce the display form, namely, the viewer 300 does not perform the conversion of the display form. The viewer 300 only selects one display form from among the various display forms transmitted from the sending apparatus 200. Therefore, it is possible to simplify the construction of the viewer 300, and reduce manufacturing cost of the viewer 300.

Transmitting Process and Receiving Process III

Next, a third embodiment of the transmitting process (Hereinafter, it is referred to as a third transmitting process.) will be described with reference to FIGS. 33 and 34. The third transmitting process is an improved transmitting process based upon the aforementioned first transmitting process, and therefore, the basic part of the third transmitting process is similar to the first transmitting process. Like the first transmitting process, the third transmitting process is a process to transmit the document information from the sending apparatus 200 to the viewer 300, and it is carried out by the processing portion 240 of the sending apparatus 200.

Unlike the first transmitting process, in the third transmitting process, the document information displayed on the display panel 351 of the viewer 300 and the document information stored in the memory 341 of the viewer 300 can be removed under the control of the sending apparatus 200.

Figure 33:
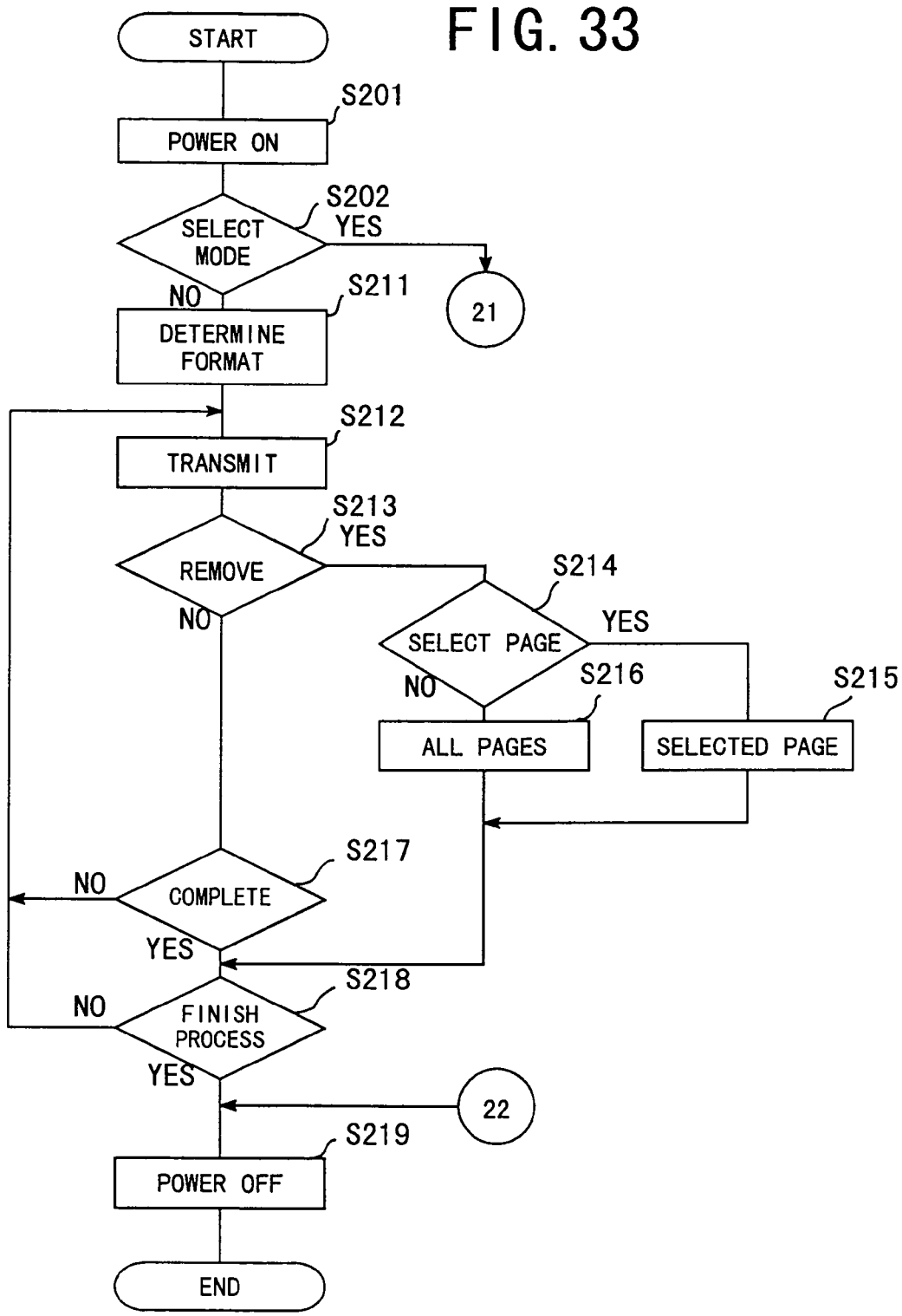
FIGS. 33 to 34 are flowcharts showing a third transmitting process according to an embodiment of the present invention.
Figure 34:
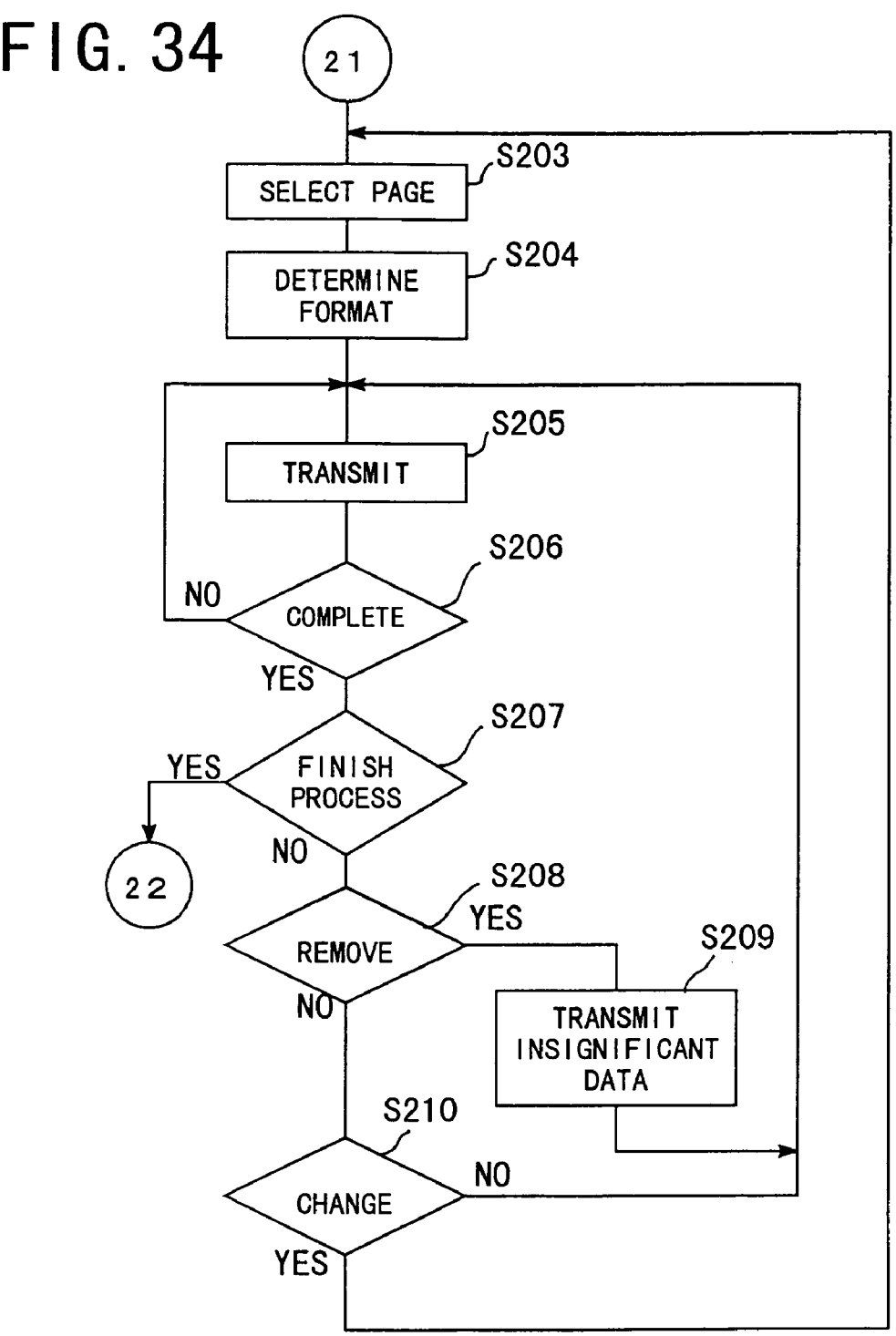

At step 201 in FIG. 33, the power is supplied to the transmitting portion 250 to thereby activate the transmitting portion 250. Next, at step 202, the processing portion 240 determines whether the document information is transmitted in the specific page mode or the all page mode. If user selects the specific page mode, and inputs a page number to the personal computer 210, the processing portion 240 recognizes that the specific page mode has been selected, and further recognizes the input page number as a "specific page" at step 203 in FIG. 34.

Next, at step 204, the processing portion 240 determines the data format of the document information, and then, at step 205, the processing portion 240 transmits the document information of the specific page to the viewer 300.

Next, at step 206, the processing portion 240 determines whether or not the transmission of the document information of the specific page has been completed. If so, the process proceeds to the next step 207. If not, the process returns to step 205. Next, at step 207, if an instruction to finish the third transmitting process has not been issued, the process further proceeds to the next step 208.

At step 208, the processing portion 240, if necessary, operates in the following manner in order to remove the document information that has been transmitted to the viewer 300. When the user inputs an instruction to remove the document information by manipulating the personal computer 210, this instruction is sent to the processing portion 240. In response to this instruction, the processing portion 240 transmits an insignificant data to the viewer 300. If the viewer 300 receives the insignificant data, the insignificant data is stored into the memory 341 of the viewer 300, and therefore, the memory 341 is filled with the insignificant data. As a result, the insignificant data is displayed on the display panel 351, and the display panel 351 is filled with the insignificant data. Thus, the previously received document information stored in the memory 341 and displayed on the display panel 351 is completely replaced by the insignificant data, and therefore, this previously received document information is completely removed from the memory 341 and the display panel 351.

There are two types of insignificant data. One is an insignificant data formed by the textual format. The other is an insignificant data formed by the bitmap format. The insignificant data of the textual format is used for removing the document information of the textual format. When the data format of the previously transmitted document information is the textual format, the processing portion 240 transmits the insignificant data of textual format to the viewer 300. The insignificant data of the bitmap format is used for removing the document information of the bitmap format. When the data format of the previously transmitted document information is the bitmap format, the processing portion 240 transmits the insignificant data of bitmap format to the viewer 300. Alternatively, both the insignificant data of the textual format and the insignificant data of the bitmap format may be sequentially transmitted to the viewer 300, regardless of the data format of the previously transmitted document information.

The insignificant data of the textual format is formed by a sequence of a large number of blank codes or blank character codes. The size of the whole insignificant data is equal to or more than that of the textual format document information of one page. Namely, the number of the blank codes included in the insignificant data is equal to or more than the maximum number of characters of one page. The insignificant data of the bitmap format is formed by a sequence of a large amount of blank pixel data (e.g., bit data in an off condition). The size of the whole insignificant data is equal to or more than that of the bitmap format document information of one page. Alternatively, the insignificant data may be formed by random characters, noise data, insignificant image or other data unrelated to the document information. Furthermore, the insignificant data may be formed by the data to paint the document information over.

In addition, when the insignificant data is transmitted, the insignificant data is converted into the transmission data D. In this case, the insignificant data is placed into the document information area S2 of the transmission data D.

Next, at step 210, the processing portion 240 determines whether or not the document information of the specific page has been changed. if so, the process returns to step 203, and therefore, the document information of the new page is transmitted to the viewer 300. If not, the process returns to step 205, and the current document information is continuously transmitted to the viewer 300.

On the other hand, if the user selects the all page mode, the processing portion 240 recognizes that the all page mode has been selected, and therefore, the process proceeds from step 202 to step 211.

Next, at step 211, the processing portion 240 determines the data format of the document information, and then, at step 212, the processing portion 240 transmits the document information of all pages to the viewer 300.

Next, at step 213, the processing portion 240, if necessary, operates in the following manner in order to remove the document information that has been transmitted to the viewer 300. First, the user inputs an instruction to remove the document information into the personal computer 210. If the user wish to remove all pages of the previously transmitted document information, the user further inputs an instruction to remove all pages into the personal computer 210. These input instructions are sent from the personal computer 210 to the processing portion 240, and then, the processing portion 240 recognizes these instruction at steps 213 and 214. If so, at step 216, the processing portion 240 transmits the insignificant data corresponding to all pages of the previously transmitted document information to the viewer 300. For example, if the document information of five pages has been transmitted just before, the insignificant data corresponding to five page is transmitted. Next, the process proceeds to step 218.

On the other hand, if the user wish to remove one specific page of the previously transmitted document information, the user inputs the page number into the personal computer 210. Therefore, the processing portion 240, at step 215, transmits the insignificant data corresponding to the specific page to the viewer 300. At this time, information indicating the specific page number is transmitted, together with the insignificant data. For example, when the insignificant data is converted into the transmission data D, this information is added to the header S1 of the transmission data D. Next, the process proceeds to step 218.

At step 217, the processing portion 240 determines whether or not the transmission of all pages of the document information has been completed. If so, the process proceeds to the next step 218. If not, the process returns to step 212.

Next, at step 218, the processing portion 240 further determines whether or not the instruction to finish the thrid transmitting process has been issued from the personal computer 210. If so, then the transmitting portion 250 is powered off or suspended (step 11), and the third transmitting process ends. If not, the process returns to step 212.

Thus, the user who sends to the document information (i.e., sender) can be free to remove the document information that has been transmitted. For example, if the sender has been transmitted the secret document information by mistake or accident, the sender can remove this secret document information. Hence, it is possible to prevent leakage of secret information. Further, since the document information can be removed by the insignificant data transmitted from the sending apparatus 200, the sender can remove the document information by only manipulating the personal computer 210. Therefore, the sender can easily manage the document information.

Next, a third embodiment of the receiving process (Hereinafter, it is referred to as a third receiving process.) will be described with reference to FIGS. 35 to 37. The third receiving process is an improved receiving process based upon the aforementioned first receiving process, and therefore, the basic part of the third receiving process is similar to the first receiving process. Like the first receiving process, the third receiving process is a process to receive the document information transmitted from the sending process 200 by the third transmitting process, and it is carried out by the viewer 300. Unlike the first receiving process, in the third receiving process, the document information displayed on the display panel 351 and the document information stored in the memory 341 can be removed, depending on the condition of synchronization between the sending apparatus 200 and the viewer 300.

Figure 35:
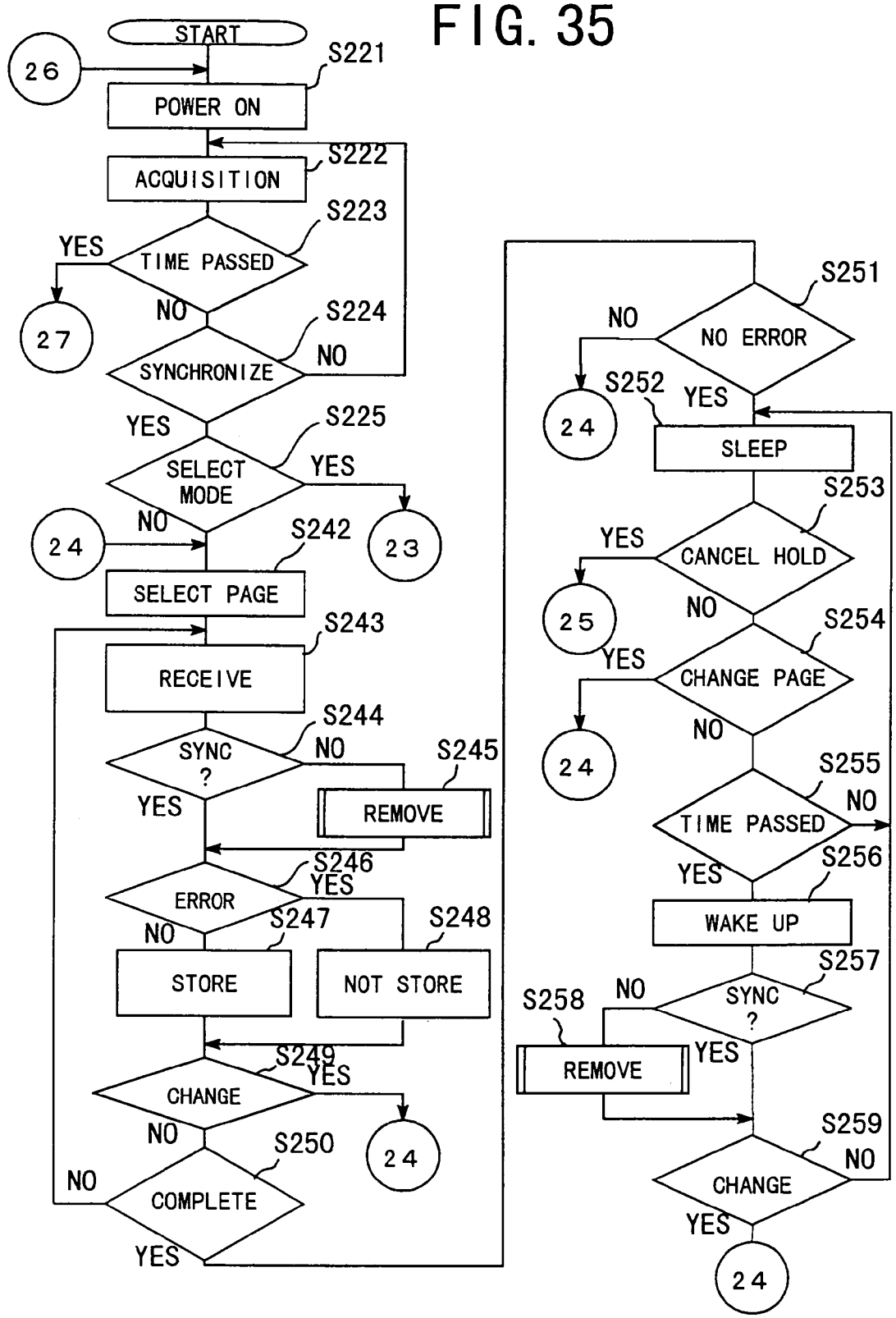
FIGS. 35 to 37 are flowcharts showing a third receiving process according to an embodiment of the present invention.
Figure 36:
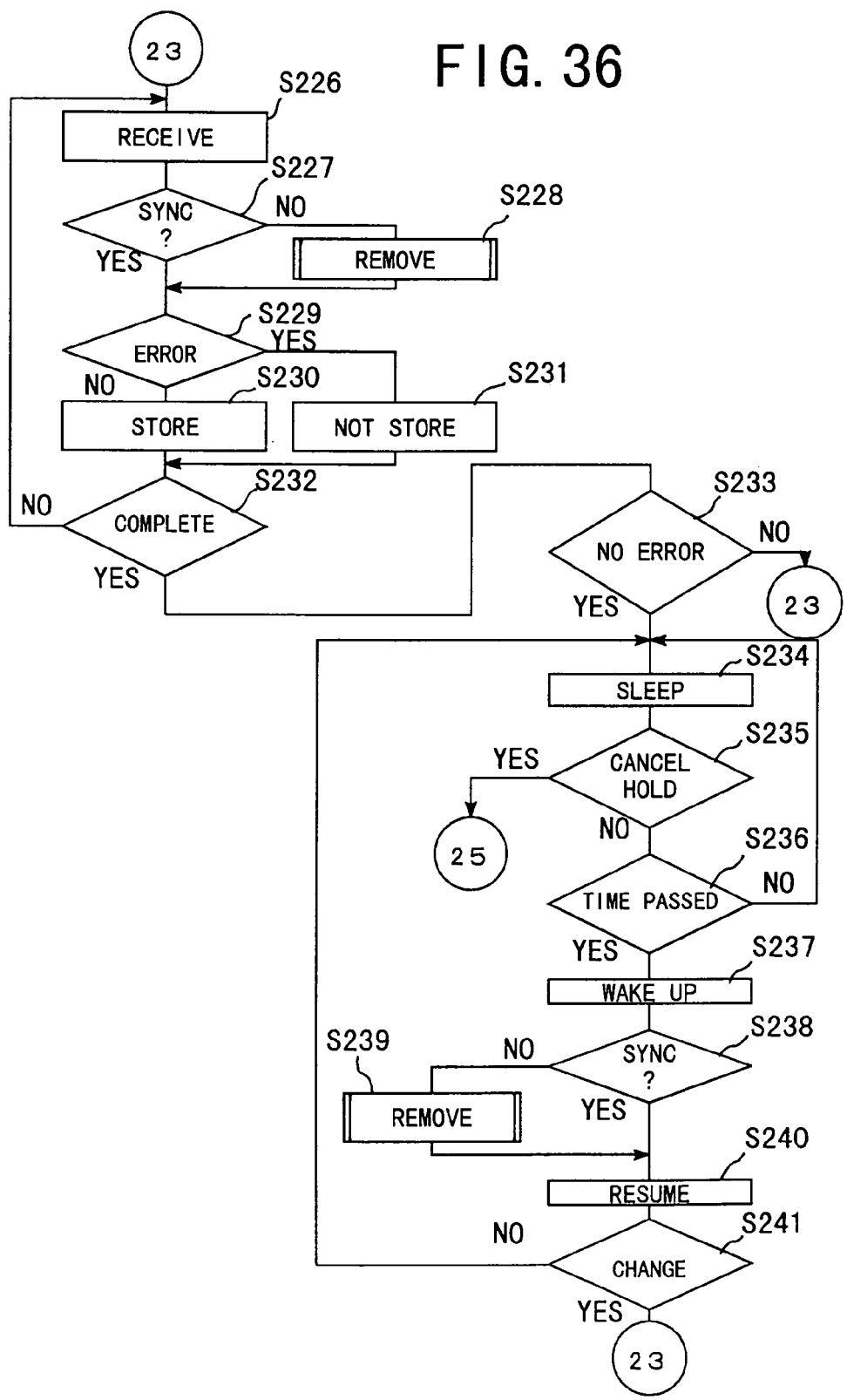

At step 221 in FIG. 35, the power is supplied to the receiving portion 320 to thereby activate the receiving portion 320. And, the receiving portion 320 receives the spread signal from the sending apparatus 200.

Next, in steps 222 to 224, the receiving portion 320 performs the acquisition process in order to synchronize the viewer 300 with the sending apparatus 200 on the basis of the synchronous signal included in the received spread signal. For example, the acquisition process is carried out as follows: first, the receiving portion 320 waits until the carrier frequency of the transmitted spread signal shifts (hops) to a specific frequency; when the carrier frequency shifts to a specific frequency, the receiving portion 320 begins the frequency hopping action; After this, the receiving portion 320 adjusts the frequency shift timing. Since both the hopping tables 241 and 331 have the same spreading sequence, the frequency hopping pattern in the receiving portion 320 corresponds with the frequency hopping pattern of the carrier frequency of the spread signal. Therefore, the synchronization is maintained. If the synchronization cannot be achieved within a predetermined time period, the third receiving process ends (step 223=YES). If the synchronization is achieved within the predetermined time period (step 224), the receiving portion 320 despreads and demodulates the received spread signal, and restores the original transmission data D. Further, the receiving portion 320 feeds the restored transmission data D into the processing portion 330. The process then proceeds to the next step 225.

At step 225, the processing portion 330 reads the control information included in the header S1 of the transmission data D, and determines whether the document information is transmitted in the specific page mode or the all page mode. If the document information is transmitted in the specific page mode, the process proceeds to step 226 in FIG. 36.

At step 226, the processing portion 330 operates in the following manner in order to receive the document information of the specific page from sending apparatus 200. Namely, the processing portion 320 receives the spread signal from the sending apparatus 200, and then obtains the transmission data D from the received spread signal, and next feeds this transmission data D into the processing portion 330. The processing portion 330 extracts the document information from the document information areas S2 of one block of this transmission data D.

Next, at step 227, the processing portion 330 determines whether or not intensity (e.g. amplitude or output level) of the spread signal is more than a predetermined intensity. If the intensity of the spread signal is zero, it is impossible to maintain the synchronization between the sending apparatus 200 and the viewer 300. If the intensity of the spread signal is weak, it is difficult to maintain the synchronization, or the synchronization becomes unstable. In consideration of these facts, if the intensity of the spread signal is not more than the predetermined intensity, the processing portion determines that it is impossible or difficult to maintain the synchronization, and performs a removing process shown in FIG. 38 (step 228). On the other hand, if the intensity of the spread signal is more than the predetermined intensity, the processing portion 330 determines that it is possible to maintain the synchronization, and therefore, the removing process is not carried out.

Next, at step 229, the processing portion 330 determines whether or not there is an error in the document information extracted from the block. If there is no error, the document information is stored into the memory 341 (step 230), and displayed on the display panel 351. If there is an error or some errors, the document information is not stored (step 231).

While steps 226 to 231 are repeatedly carried out, the document information is stored into the memory 341 one after another for each block. Consequently, the document information is displayed on the display panel 351 block by block.

Next, step 232, the processing portion 330 determines whether or not the reception of the document information of the specific page has been completed. If so, the process proceeds to the next step 233. If not, the process returns to step 226.

Next, at step 233, the processing portion 330 determines whether or not the whole document information of the specific page has been stored completely into the memory 341 without any errors. If so, the process proceeds to step 234. If no, the process returns to step 226.

Next, at step 234, the viewer 300 is placed into the sleeping state. Next, at step 235, the processing portion 330 determines whether or not an instruction to place the viewer 300 into the holding state has been issued, and whether or not an instruction to finish the third receiving process has been issued. If so, the process proceeds to step 260 shown in FIG. 37. If not, the process proceeds to the next step 236. At step 236, the processing portion 330 determines whether or not a predetermined time has passed since the viewer 300 was placed into the sleeping state. If the predetermined time has not passed, the process returns to step 234 to continue the sleeping state. If the predetermined time has passed, the process proceeds to step 237, and the processing portion 330 awakes the viewer 300.

Next, at step 238, the processing portion 330 determines whether or not intensity of the spread signal is more than the predetermined intensity. If the intensity of the spread signal is not more than the predetermined intensity, the processing portion 330 determines that it is impossible or difficult to maintain the synchronization between the sending apparatus 200 and the viewer 300, and performs the removing process shown in FIG. 38 (step 239). On the other hand, if the intensity of the spread signal is more than the predetermined intensity, the removing process is not performed, and the process proceeds to the step 240.

At step 240, the processing portion 330 receives the document information transmitted from the sending apparatus 200, and, at step 241, determines whether or not the document information has been rewritten in the sending apparatus 200 and whether or not the page number of the document information transmitted from the sending apparatus 200 has been changed in the sending apparatus 200. If the document information has been rewritten, or if the page number has been changed, then the process returns to step 226 in order to receive and display the new document information. If the document information has not been rewritten, and if the page number has not been changed, then the process returns to step 234, and therefore, the viewer 300 is placed into the sleeping state, again.

On the other hand, at step 225 in FIG. 35, if the processing portion 330 determines that the document information is transmitted from the sending apparatus 200 in the all page mode, then the process proceeds to step 225 to step 242.

At step 242, the processing portion 330 recognizes a page number input by the user as a "selected page". Next, at step 243, the processing portion 330 operates in the following manner in order to receive the document information of the selected page. As mentioned above, the sending apparatus 200 repeatedly transmits the spread signal corresponding to the document information of all pages to the viewer 300. The processing portion 320 receives this spread signal, and then obtains the transmission data D from the received spread signal, and next feeds this transmission data D into the processing portion 330. Next, the processing portion 330 extracts the document information of the selected page from one block of the transmission data D.

Next, at step 244, the processing portion 330 determines whether or not intensity of the spread signal is more than the predetermined intensity. If the intensity of the spread signal is not more than the predetermined intensity, the processing portion 330 determines that it is impossible or difficult to maintain the synchronization between the sending apparatus 200 and the viewer 300, and performs the removing process shown in FIG. 38 (step 245). On the other hand, if the intensity of the spread signal is more than the predetermined intensity, the removing process is not performed, and the process proceeds to the step 246.

Next, at step 246, the processing portion 330 determines whether or not there is an error or some errors in the document information extracted from the block. If there is no error, the document information is stored into the memory 341 (step 247), and displayed on the display panel 351. If there is an error or some errors in the document information extracted from the block, the document information is not stored into the memory 341 (step 248).

Next, at step 249, the processing portion 330 determines whether or not the selected page has been changed. If so, the process returns to step 242. If there is no change of the selected page, then the process proceeds to the next step 250.

At step 250, the processing portion 330 determines whether or not the reception of the document information of the selected page has been completed. If so, the process proceeds to the next step 251. If not, the process returns to step 243, and steps 243 to 250 are repeated.

At step 251, like step 233, the processing portion 330 determines whether or not the whole document information of the selected page has been completely stored into the memory 341 without any errors. If not, it can be expected that one or some errors occurred during the communication between the sending apparatus 200 to the viewer 300, and therefore, the process returns to step 242. If the whole document information of the selected page has been stored into the memory 341 completely, the process proceeds to the next step 252.

Like step 234, the viewer 300 is placed into the sleeping state at step 252. Next, like step 235, the processor portion 330 determines whether or not the instruction to place the viewer 300 into the holding state has been issued, and whether or not the instruction to finish the first receiving process has been issued (step 253). Next, at step 254, the processing portion 330 determines whether or not the selected page number has been changed. If so, the process returns to step 242. If not, the process proceeds to the next step 255.

At step 255, the processing portion 330 determines whether or not a predetermined time has passed since the viewer 300 was placed into the sleeping state. If so, the process proceeds to the next step 256. At step 256, the processing portion 330 awakes the viewer 300. If not, the process returns to step 252, and the sleep state is continued.

Next, at step 257, the processing portion 330 determines whether or not intensity of the spread signal is more than the predetermined intensity. If the intensity of the spread signal is not more than the predetermined intensity, the processing portion 330 determines that it is impossible or difficult to maintain the synchronization between the sending apparatus 200 and the viewer 300, and performs the removing process shown in FIG. 38 (step 258). On the other hand, if the intensity of the spread signal is more than the predetermined intensity, the removing process is not performed, and the process proceeds to the step 259.

Next, at step 259, the processing portion 330 determines whether or not the document information transmitted from the sending apparatus 200 has been changed in the sending apparatus 200. If so, the process returns to step 242 in order to receive and display the document information that has been changed. If not, the process returns to step 252, and the viewer 300 is placed into the sleeping state, again.

Figure 37:
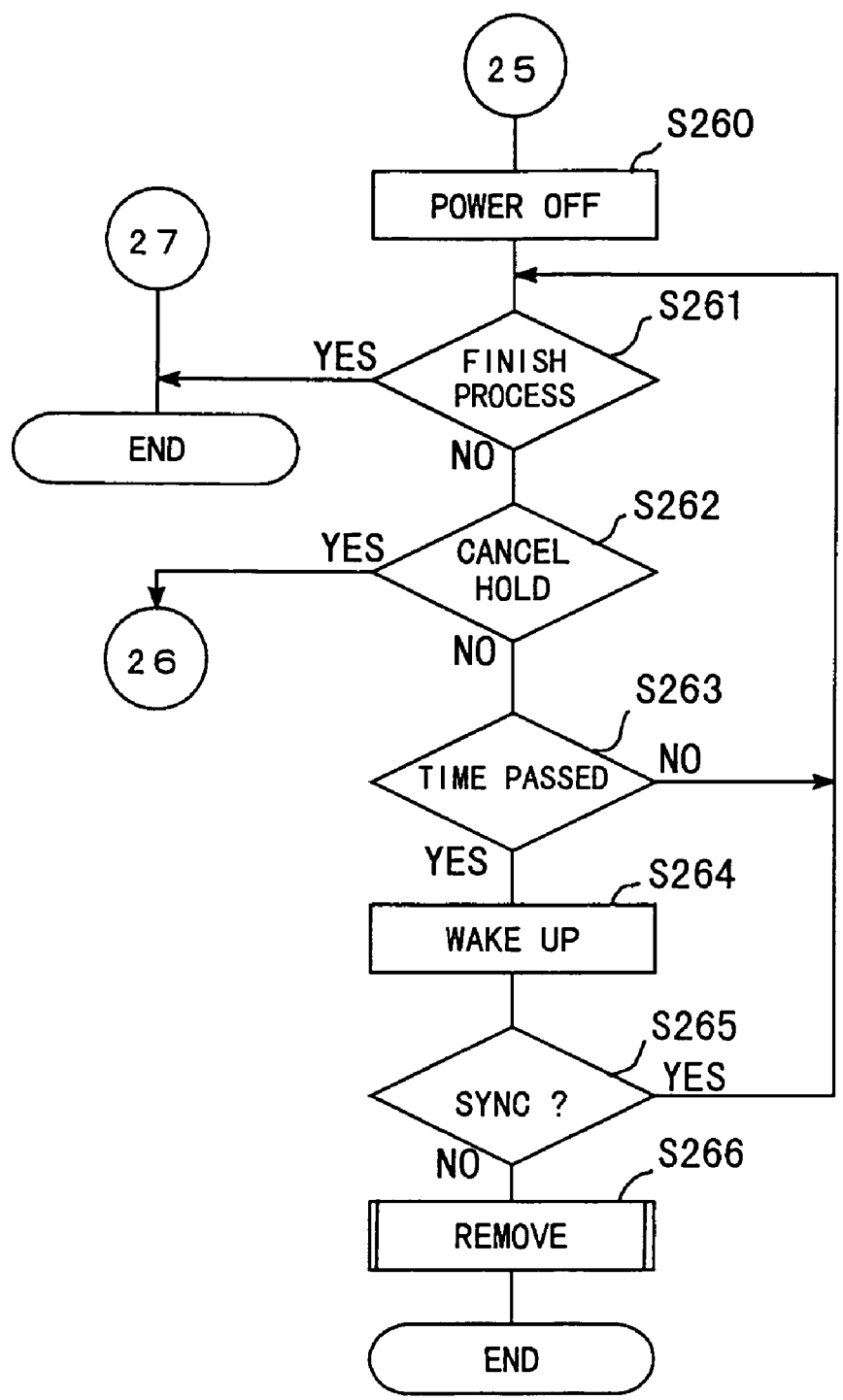

On the other hand, at step 235 or 253, if the processing portion 330 determines that either of an instruction to place the viewer 300 into the holding state and an instruction to finish the first receiving process has been issued, then the process proceeds to step 260 in FIG. 37.

At step 260, the viewer 300 is placed into the holding state. If the user inputs an instruction to finish the third receiving process into the viewer 300, the third receiving process ends (step 261= YES). If the user inputs an instruction to cancel the holding state into the viewer 300, the process returns from step 262 to step 221, so that the viewer 300 resumes receiving the document information. If there is no instruction during the holding state, the process proceeds to step 263.

At step 263, it is determined whether or not a predetermined time has passed since the viewer 300 was placed into the holding state. If the predetermined time has passed, the viewer 300 wakes up (step 264), and then, at step 265, it is determined whether or not the synchronization between the sending apparatus 200 and the viewer 300 can be maintained in the same manner as step 227. If the synchronization can be maintained, the process returns to step 261, and the holding state is continued. If it is impossible or difficult to maintain the synchronization, the process proceeds to step 266. Next, at step 266, the removing process shown in FIG. 38 is carried out, and then, the third receiving process ends.

Next, the removing process will be described with reference to FIG. 38.

As mentioned above, in the third receiving process, if it is determined that maintenance of the synchronization between the sending apparatus 200 and the viewer 300 is impossible or difficult, the removing process is carried out by the processing portion 330.

Figure 38:
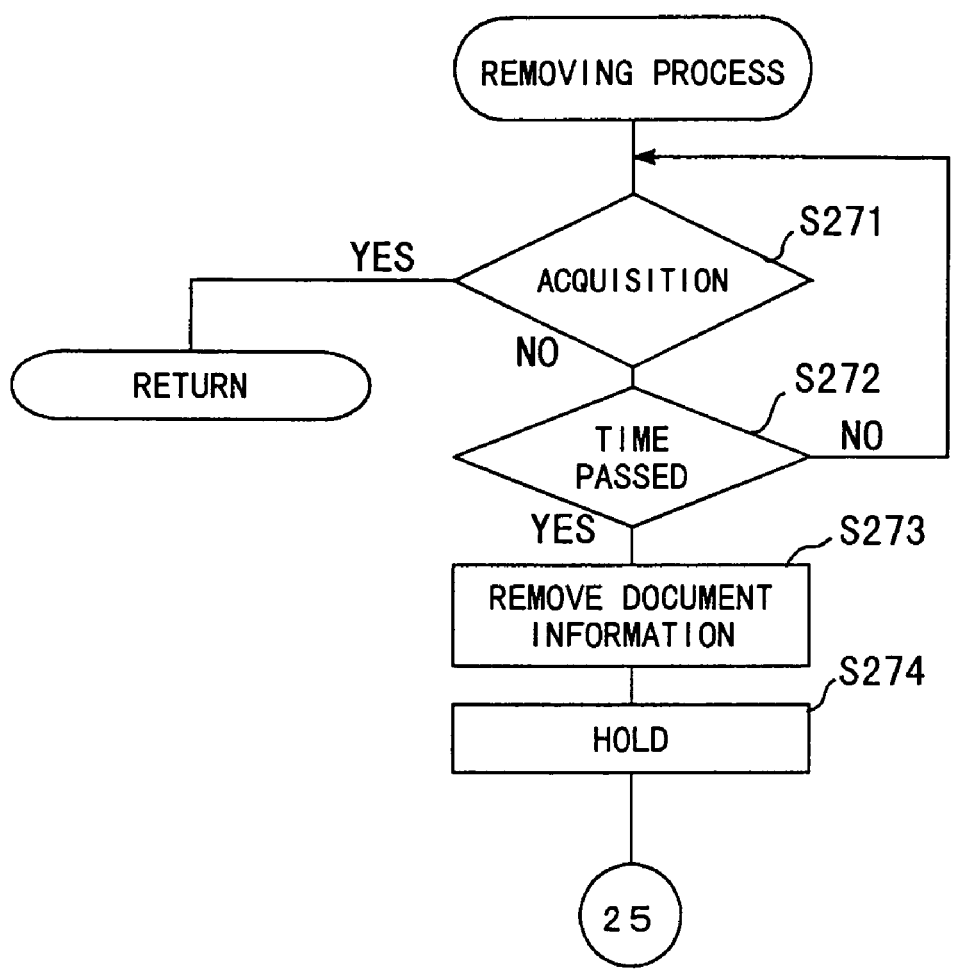
FIG. 38 is a flowchart showing a removing process according to an embodiment of the present invention.

As shown in FIG. 38, in steps 271 and 272, the processing portion 330 repeatedly detect the intensity of the spread signal, and determines whether or not the intensity of the spread signal becomes greater than the predetermined intensity within a predetermined time period. On the other hand, if the synchronization between the sending apparatus 200 and the viewer 300 has been lost, the processing portion 330 attempts to synchronize the viewer 330 with the sending apparatus 200 again within a predetermined time.

If the viewer 300 can be synchronized with the sending apparatus 200 within the predetermined time period, and if the intensity of the spread signal becomes greater than the predetermined intensity within the predetermined time period, the process returns to the third receiving process. On the other hand, if the viewer 300 cannot be synchronized with the sending apparatus 200 within the predetermined time period, or if the intensity of the spread signal does not becomes greater than the predetermined intensity within the predetermined time period, the process proceeds to the next step 273.

At step 273, the document information stored in the memory 341 is completely removed, and the document information displayed in the display panel 351 is completely removed.

Next, step 274, the viewer 300 is placed into the holding state, and then, the process goes to step 260 in FIG. 37. Therefore, the condition that there is no document information on the display panel 351 is fixed as long as the holding state is continued.

According to the third receiving process and the removing process, when it is impossible or difficult to maintain the synchronization between the sending apparatus 200 and the viewer 300, the document information that has been received by the viewer 300 can be removed. As mentioned above, the removing process is carried out while the viewer 300 is receiving the document information (step 228, 244). Therefore, if it is impossible or difficult to maintain the synchronization while the viewer 300 is receiving the document information, the reception of the document information can be stopped, and the received document information can be removed. Further, the removing process is carried out while the viewer 300 is placed in the sleeping state (step 238 or 258). Therefore, if it is impossible or difficult to maintain the synchronization while the viewer 300 is placed in the sleeping state, the received document information can be removed. Furthermore, the removing process is carried out while the viewer 300 is placed in the holding state (step 266). Therefore, if it is impossible or difficult to maintain the synchronization while the viewer 300 is placed in the sleeping state, the received document information can be removed. In the removing process, since the document information that has been stored in the memory 341 the document information that has been displayed on the display panel 351, both of which are the same document information, are removed, the document information that exists in the viewer 300 is completely removed. Accordingly, it is possible to restrict leakage of the contents of the document information, and improve security.

For example, if the viewer 300 is taken away by an unrelated person from a meeting room to another place, it becomes possible or difficult to maintain the synchronization between the sending apparatus 200 because the intensity of the spread signal becomes weak. In this case, the document information stored and displayed in the viewer 300 is automatically removed by the removing process. Therefore, the unrelated person cannot see the document information.

Furthermore, in the removing process, after the predetermined time period has passed, the document information is removed. Therefore, it is possible to prevent that the document information is removed due to a momentary communication error or the like. In addition, according to the third receiving process, when the intensity of the spread signal becomes zero, the removing process is carried out. Therefore, if the transmission of the spread signal (i.e., the document information) is stopped, the document information is automatically removed by the removing process.

Receiving Process IV

Next, a fourth embodiment of the receiving process (Hereinafter, it is referred to as a fourth receiving process.) will be described with reference to FIGS. 39 to 41. The fourth receiving process is an improved receiving process based upon the aforementioned first receiving process, and therefore, the basic part of the fourth receiving process is similar to the first receiving process. Like the first receiving process, the fourth receiving process is a process to receive the document information transmitted from the sending apparatus by the aforementioned first transmitting process, and it is carried out by the processing portion 330 of the viewer 300. Unlike the first receiving process, in the fourth receiving process, the data format of the received document information is converted from the textual format to the bitmap format if the viewer 300 receives the document information of the textual format.

Figure 39:
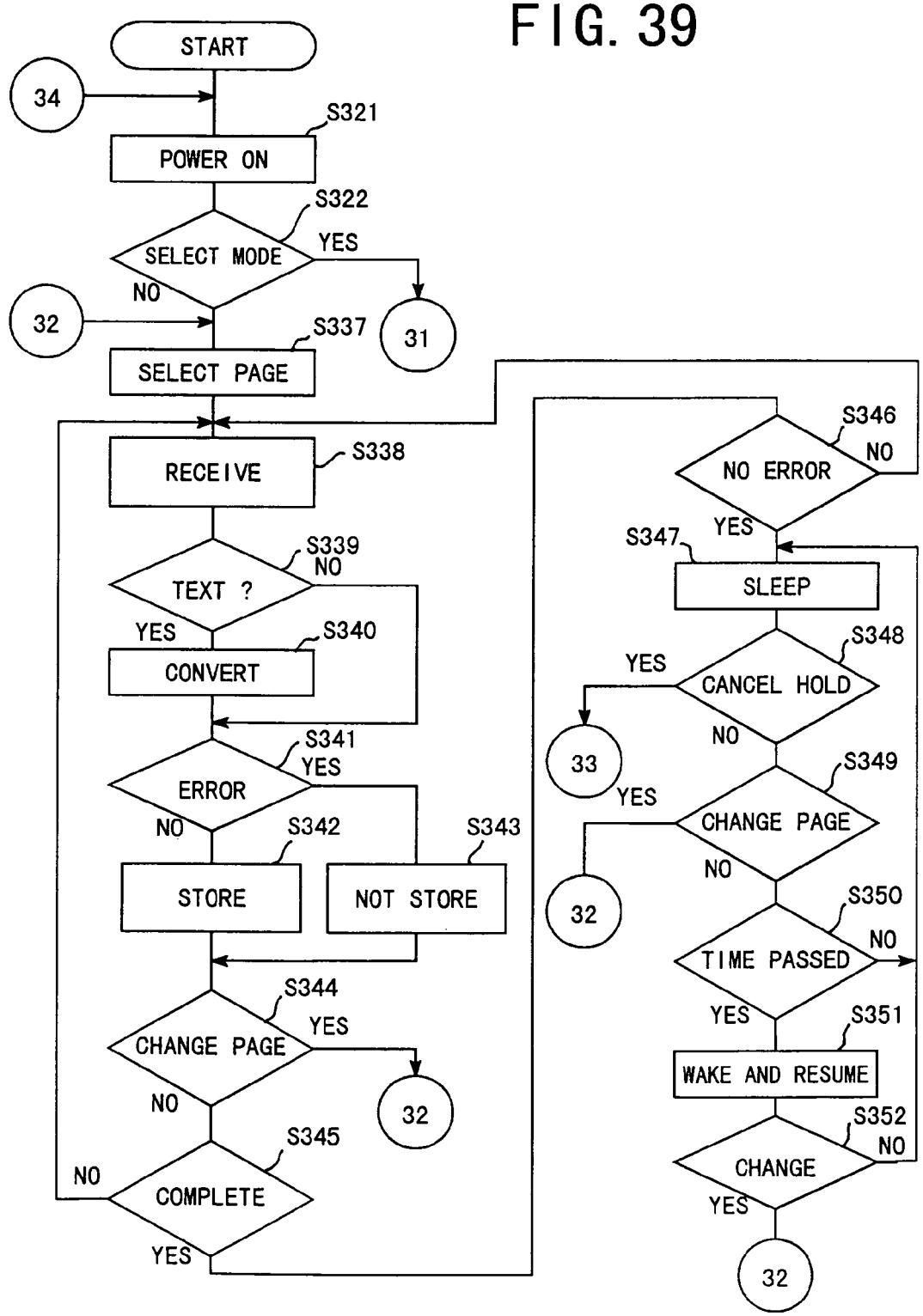
FIGS. 39 to 41 are flowcharts showing a fourth receiving process according to the embodiment of the present invention.

At step 321 in FIG. 39, the power is supplied to the receiving portion 320 to thereby activate the receiving portion 320. And, the receiving portion 320 receives the spread signal from the sending apparatus 200, and then performs the acquisition process, and next despreads and demodulates the received spread signal, thereby restoring the original transmission data D. The restored transmission data D is fed into the processing portion 330.

Figure 40:
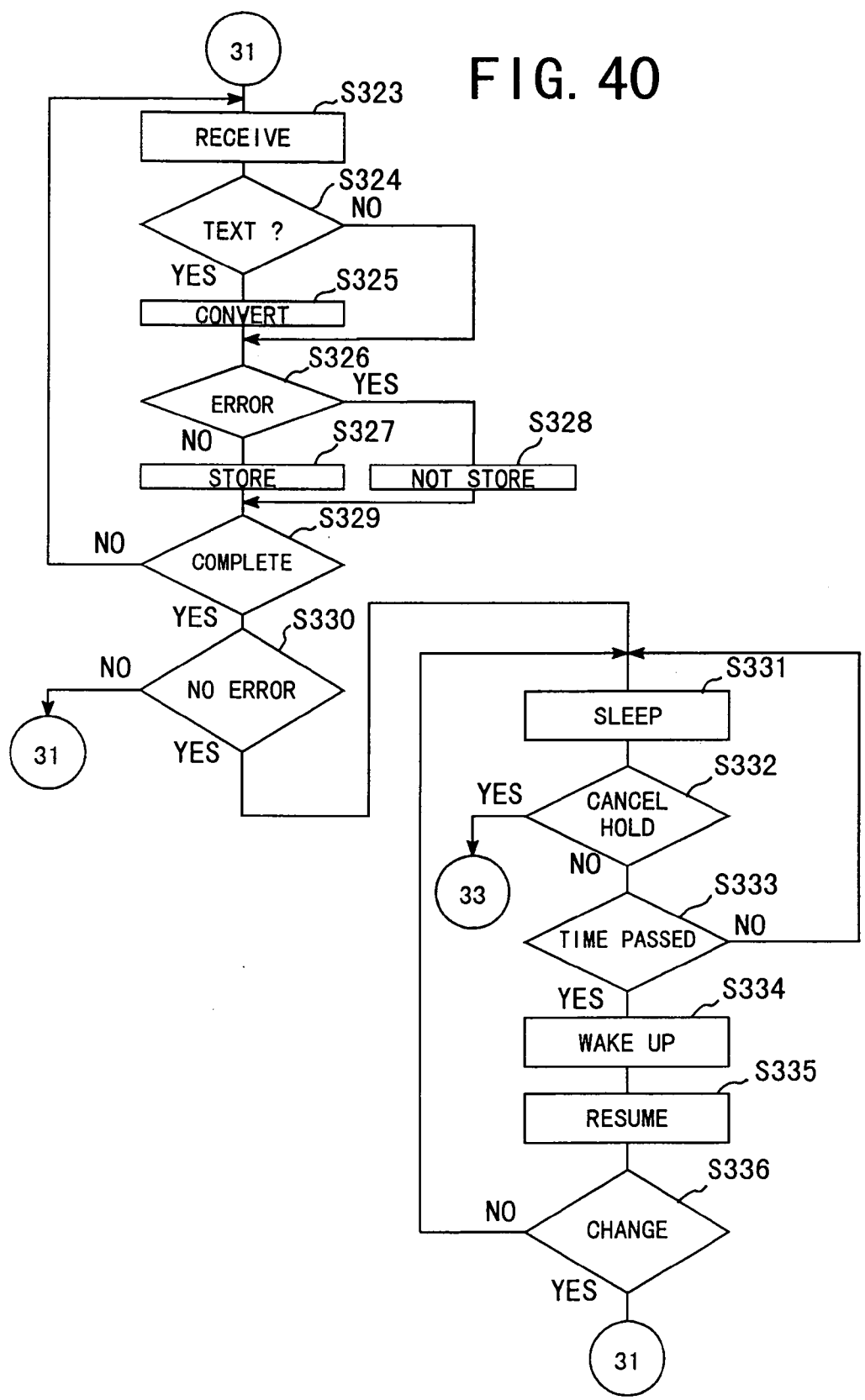

Next, if, at step 332, the processing portion 330 determines that the document information is transmitted in the specific page mode, the process proceeds to step 323 in FIG. 40. Next, at step 323, the processing portion 330 operates in the following manner in order to receive the document information of the specific page. Namely, the receiving portion 320 receives the spread signal corresponding to the document information of the specific page, and then obtains the transmission data D from the received spread signal, and next feeds this transmission data D into the processing portion 330. Next, the processing portion 330 extracts the document information from the document information area S2 of one block of this transmission data D.

Next, at step 324, the processing portion 330 reads the information indicating the data format of the document information from the header S1 included in the block, and determines whether the data format of the extracted document information is the textual format or the bitmap format. If the data format of the document information is the textual format, the processing portion 330 converts the data format of the document information from the textual format to the bitmap format at step 325.

Next, steps 326 to 336 are carried out, as shown in FIG. 40. These steps are similar to the aforementioned steps 24 to 34 of the first receiving process shown in FIG. 10.

On the other hand, at step 322 in FIG. 39, if the processing portion 330 determines that the document information is transmitted from the sending apparatus 200 in the all page mode, then the process proceeds to step 322 to step 337.

Next, at step 337, the processing portion 330 recognizes a page number input by the user as a "selected page". Next, at step 338, the processing portion 330 operates in the following manner in order to receive the document information of the selected page. Namely, the receiving portion 320 receives the spread signal corresponding to the document information of all pages, and then obtains the transmission data D from the received spread signal, and next feeds this transmission data D into the processing portion 330. Next, the processing portion 330 selects the block of the transmission data D which includes the document information of the selected page, and then extracts the document information from the selected block.

Next, at step 339, the processing portion 330 reads the information indicating the data format of the document information from the header S1 included in the block, and determines whether the data format of the extracted document information is the textual format or the bitmap format. If the data format of the document information is the textual format, the processing portion 330 converts the data format of the document information from the textual format to the bitmap format at step 340.

Figure 41:
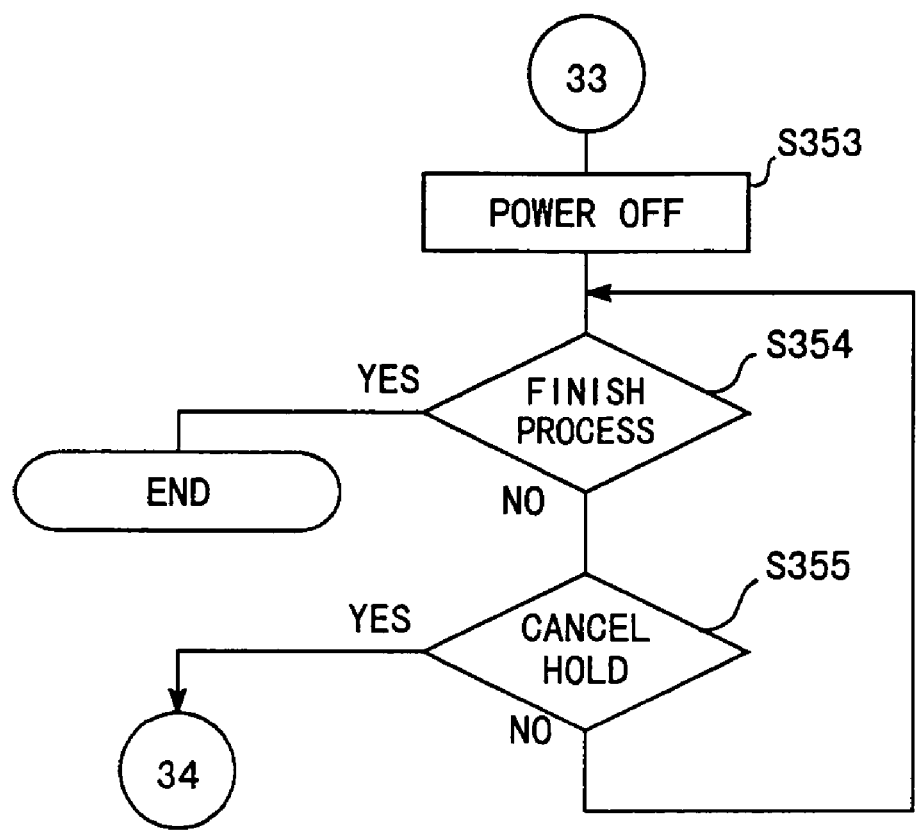

Next, steps 341 to 355 are carried out, as shown in FIGS. 39 and 41. These steps are similar to the aforementioned steps 37 to 52 of the first receiving process shown in FIGS. 9 and 11.

Thus, in the fourth receiving process, if the data format of the received document information is the textual format, the processing portion 330 converts the data format of the received document information from the textual format into the bitmap format. Therefore, all of the received document information are stored in the memory 341 in the bitmap format, and displayed on the display panel 351 in the bitmap format. The processing portion 240 can display the document information by performing only one kind of data processing operation. As a result, means for displaying the document information of the textual format is not needed. Consequently, it is possible to simplify the construction of the viewer 300.

Transmission Order Control Process I

Next, a first embodiment of a transmission order control process (Hereinafter, it is referred to as a first transmission order control process.) will be described with reference to FIGS. 42 and 43.

In the aforementioned transmitting process, when transmitting the document information of all pages to the viewer 300 in the all page mode, the sending apparatus 200 transmits the document information for each block. At this time, the processing portion 240 of the sending apparatus 200 may perform the first transmission order control process to control order of the transmission of the blocks. In the first transmission order control process, three types of transmission order can be selected.

Figure 42:
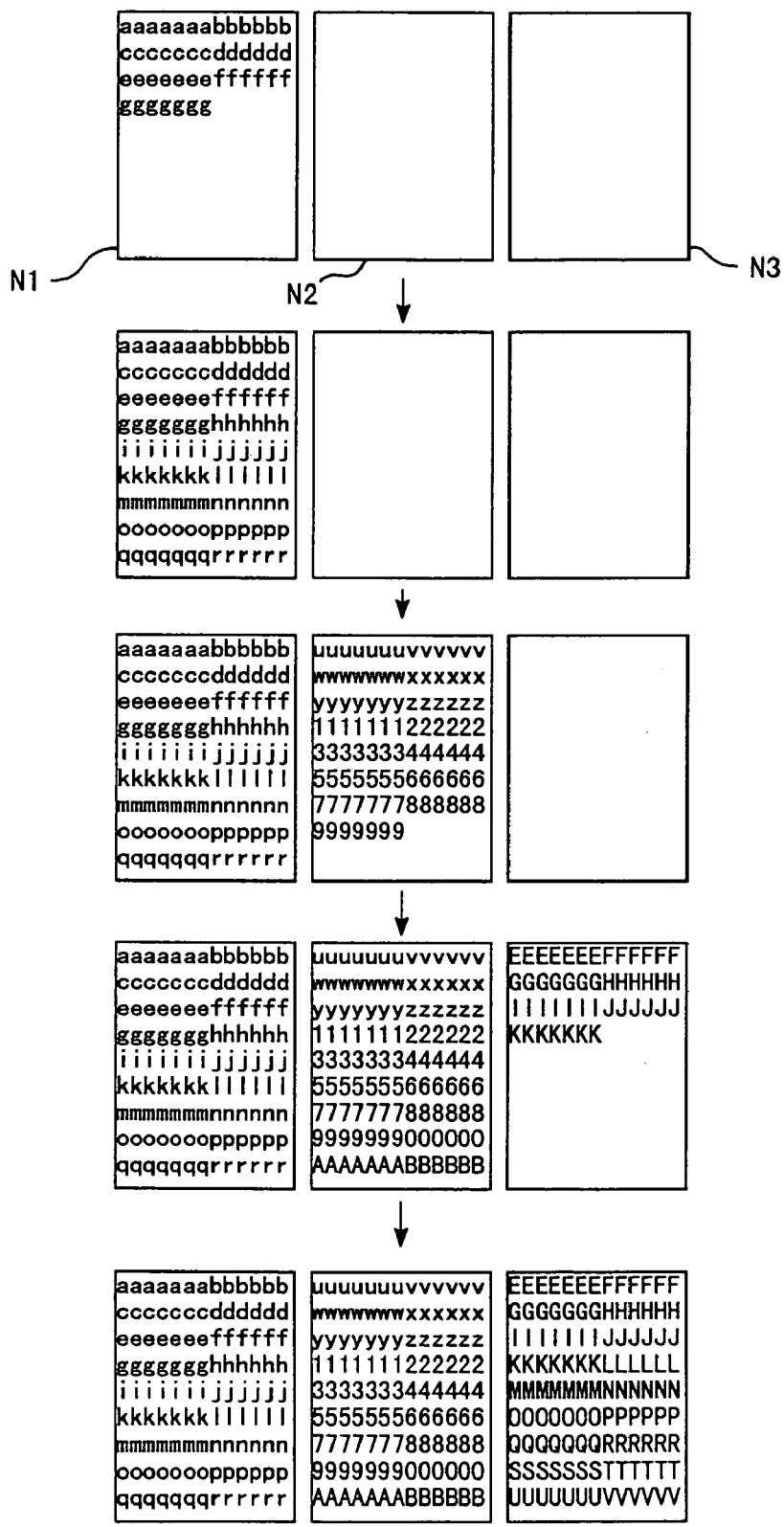
FIG. 42 is a diagram showing a first transmission order in a first transmission order control process according to the embodiment of the present invention.

As shown in FIG. 42, when the first transmission order is selected, the blocks are transmitted as follows: first, the blocks located from the top of the first page N1 to the end of the first page N1 are transmitted in this order; second, the blocks located from the top of the second page N2 to the end of the second page N2 are transmitted in this order; and third, the block located from the top of the third page N3 to the end of the third page N3 are transmitted in this order.

Figure 43:
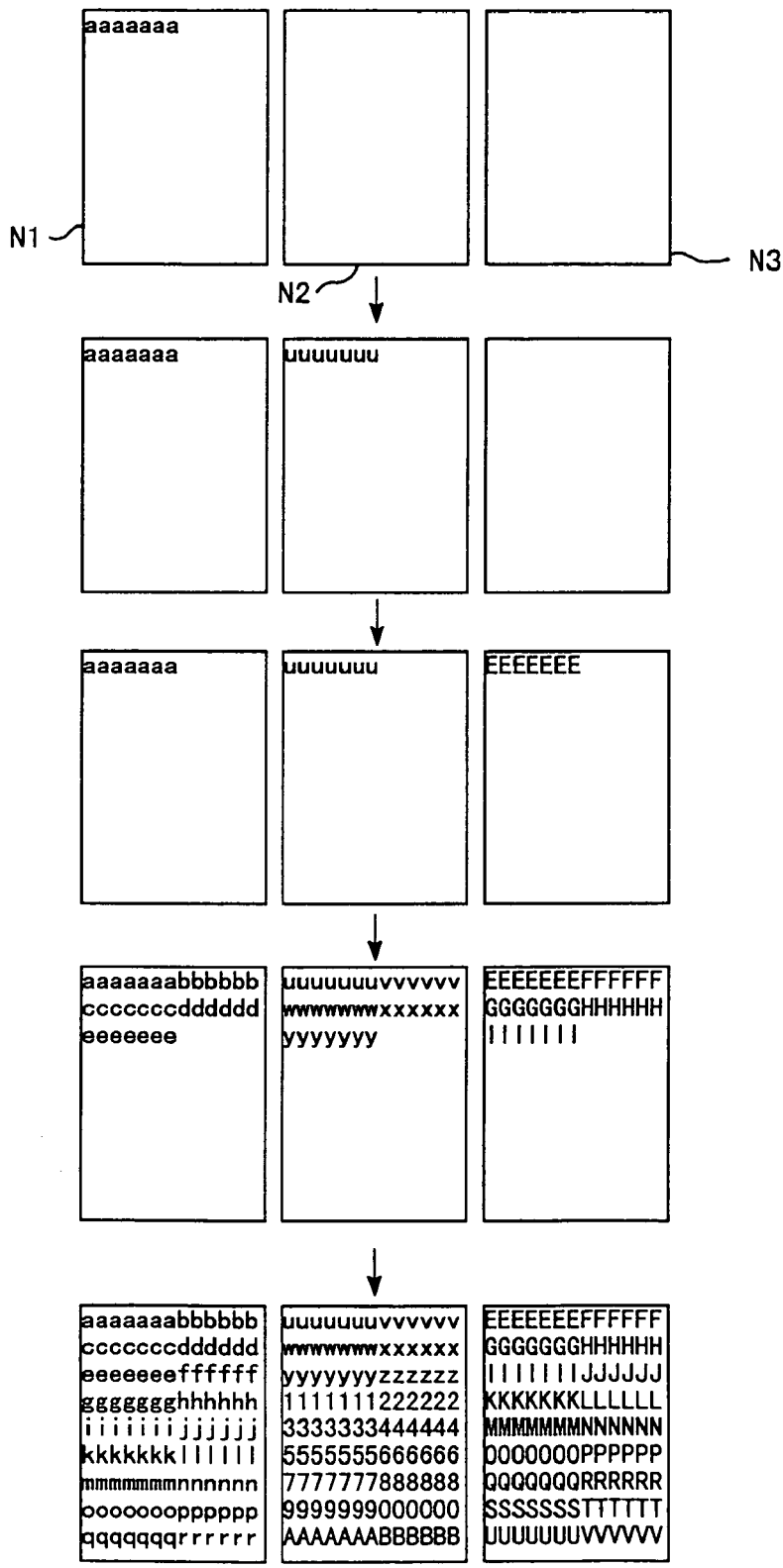
FIG. 43 is a diagram showing a second transmission order in the first transmission order control process.

As shown in FIG. 43, when the second transmission order is selected, the blocks are transmitted as follows: first, one block located at the top of the first page N1 is transmitted; second, one block located at the top of the second page N2 is transmitted; third, one block located at the top of the third page N3 is transmitted; forth, one block adjacent to the block located at the top of the first page N1 is transmitted. In this manner, in the second transmission order, a page of a transmitted block is different from the page of the block transmitted immediately before. Namely, a different block included in a specific page is repeatedly transmitted, while the specific page is switched each time one block is sent. Consequently, the document information included in the respective pages are transmitted in parallel to each other, and substantially, all of the pages of the document information are transmitted at the same time. According to the second transmission order, it is possible to receive the document information of the selected page in short time, even if the selected page is the last page of the document information. Namely, the viewer 300 can receive the last page of the document information as well as the first page in short time.

When the third transmission order is selected, the blocks are transmitted as follows: first, the blocks are transmitted in the aforementioned first transmission order until a predetermined time period has passed since the transmission was started; next, when the predetermined has passed, the rest of blocks are transmitted in the aforementioned second transmission order.

In addition, the user can select any one of the aforementioned three transmission order types by manipulating the personal computer 210 of the sending apparatus 200. Furthermore, FIGS. 42 and 43 show examples of the first transmission order control process embodied in the transmission of the document information of the textual format. Similarly, the first transmission order control process can be adapted for the transmission of the document information of the bitmap format.

Transmission Order Control Process II

Figure 44:
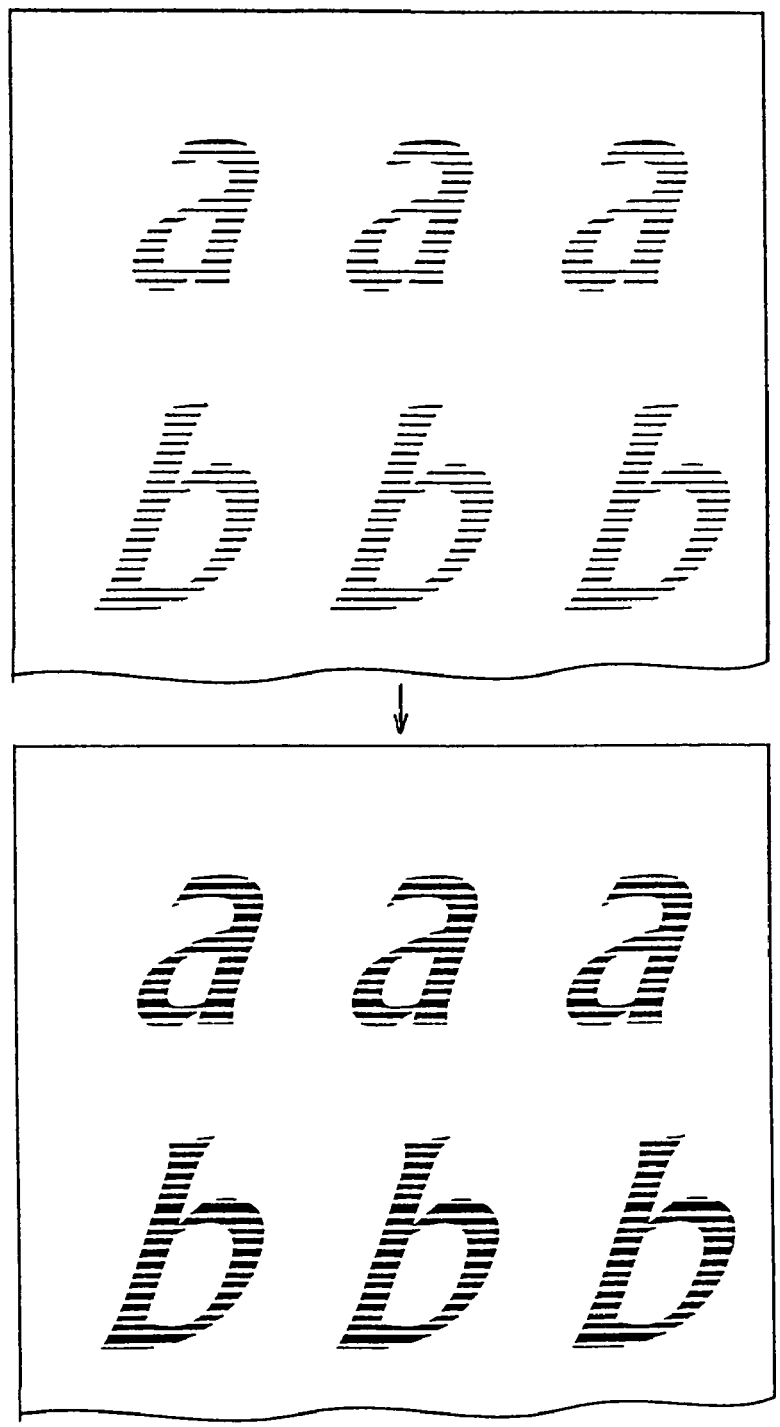
FIG. 44 is a diagram showing an irregular transmission order in a second transmission order control process.

Next, a second embodiment of the transmission order control process (Hereinafter, it is referred to as a second transmission order control process.) will be described with reference to FIG. 44.

In the aforementioned transmitting process, when transmitting the document information to the viewer 300 in either the specific page mode or the all page mode, the sending apparatus 200 transmits the document information for each block. At this time, the processing portion 240 of the sending apparatus 200 may perform the second transmission order control process to control order of the transmission of the blocks. In the second transmission order control process, the two types of transmission orders, i.e. a regular transmission order and an irregular transmission order, can be selected.

When the regular transmission order is selected, the blocks located from the top of a page to the end of the page are transmitted in this order.

When the irregular transmission order is selected, the blocks are transmitted in irregular and discontinuous order. When the document information of the bitmap format is transmitted in this irregular transmission order, the document information appears on the display panel of the viewer, as shown in FIG. 44. Namely, when the transmission of the document information is started, the outline of the document information (images) appears on the display panel 351 at first, shown on the upper side of FIG. 44. And then, the document information gradually becomes clear, shown on the lower side of FIG. 44. Therefore, the user can roughly understand the contents of the document information at the stage that the transmission of the document information is started.

In addition, the user can select either one of the regular transmission order and the irregular transmission order by manipulating the personal computer 210 of the sending apparatus 200.

Transmission Order Control Process III

Figure 45:
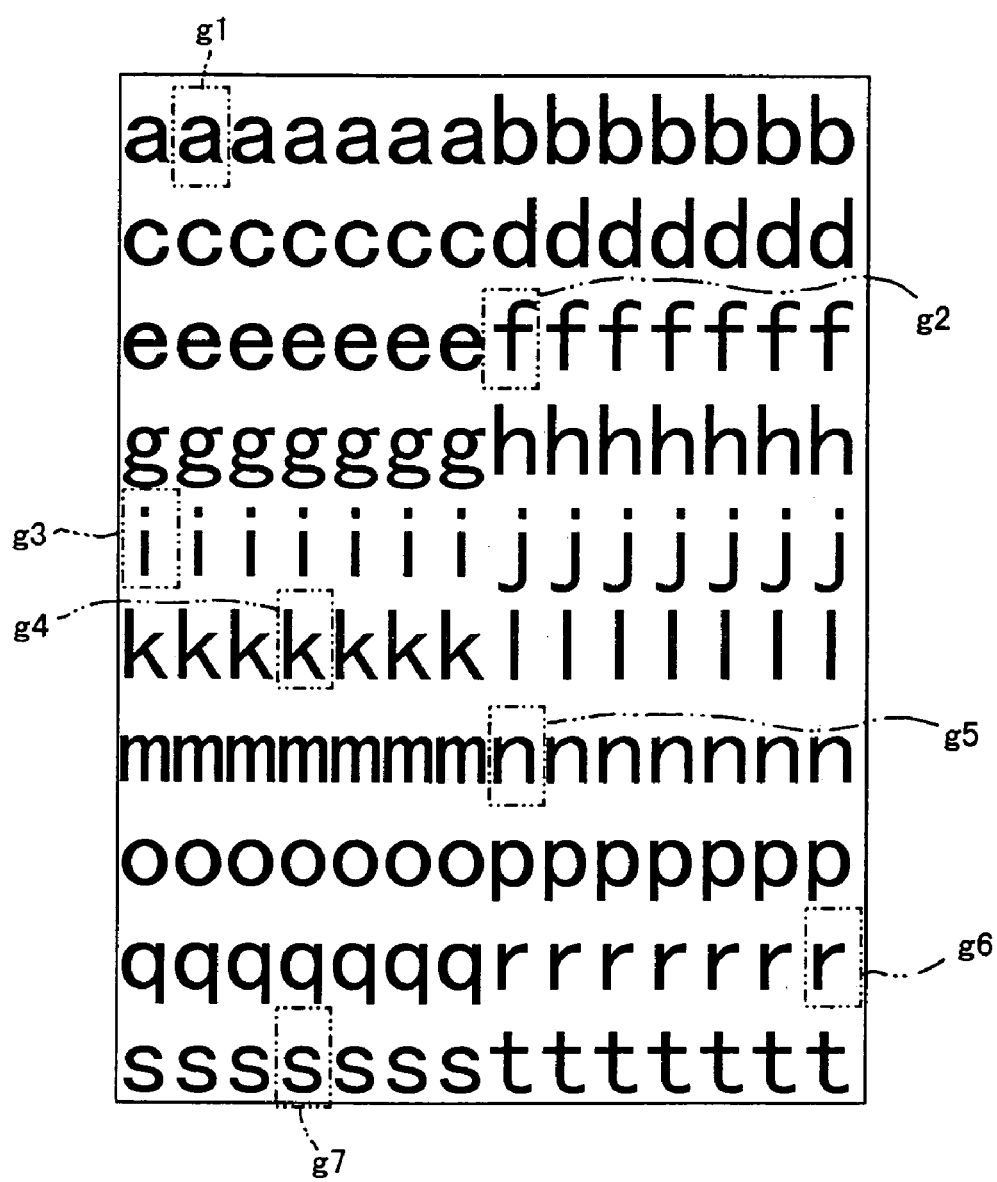
FIGS. 45 and 46 are diagrams showing an irregular transmission order in a third transmission order control process of the embodiment of the present invention.
Figure 46:

Next, a third embodiment of the transmission order control process (Hereinafter, it is referred to as a third transmission order control process.) will be described with reference to FIGS. 13, 45 and 46.

In the aforementioned transmitting process, when transmitting the document information to the viewer 300 in either the specific page mode or the all page mode, the sending apparatus 200 transmits the document information for each block. At this time, the processing portion 240 operates as follows: first, the processing portion 240 receives the document information from the personal computer 210; next, if the data format of the received document information is the textual format, the processing portion 240 divides this document information into the blocks; next, the processing portion 240 converts the divided document information into the transmission data D. In such a transmitting operation, when dividing the document information into the blocks, the processing portion 240 may perform the third transmission order control process. In the third transmission order control process, the two types of transmission order, i.e. a regular transmission order and an irregular transmission order, can be selected. In addition, the third transmission order control process is appropriate for the transmission of the document information of the textual format.

If the regular transmission order is selected, the order of characters arranged in one page is not changed when the document information is divided into the blocks, as shown on the left side of FIG. 13. Therefore, these characters are sent to the viewer 300 in that order.

If the irregular transmission order is selected, the order of characters arranged in one page is changed when the document information is divided into the blocks. Namely, each block is produced by extracting the characters from one page in an irregular and discontinuous order, for example, at random. For instance, as shown in FIG. 45, a block is produced by extracting characters g1 through g7 from one page. Therefore, the characters are sent to the viewer 300 in irregular order. Hence, if an error or some errors have occurred during the communication between the sending apparatus 200 and the viewer 300, a plurality of small blank spaces E3 are formed on the display panel 351, as shown in FIG. 46. As each blank space E3 corresponds to any one of characters, the area of the blank space is very small. Further, the blank spaces E3 are sprinkled. Consequently, the user can understand the contents of the displayed document information from the whole of the displayed document information, even if an error or some errors have occurred during the communication.

In addition, the user can select either one of the regular transmission order and the irregular transmission order by manipulating the personal computer 210 of the sending apparatus 200.

Another Embodiment of Viewer

Next, another embodiment of the viewer will be described with reference to FIGS. 47 and 48. In addition, in FIG. 47, the same constructional elements as those in FIG. 6 carry the same reference numbers and descriptions with respect to these elements are omitted.

Figure 47:
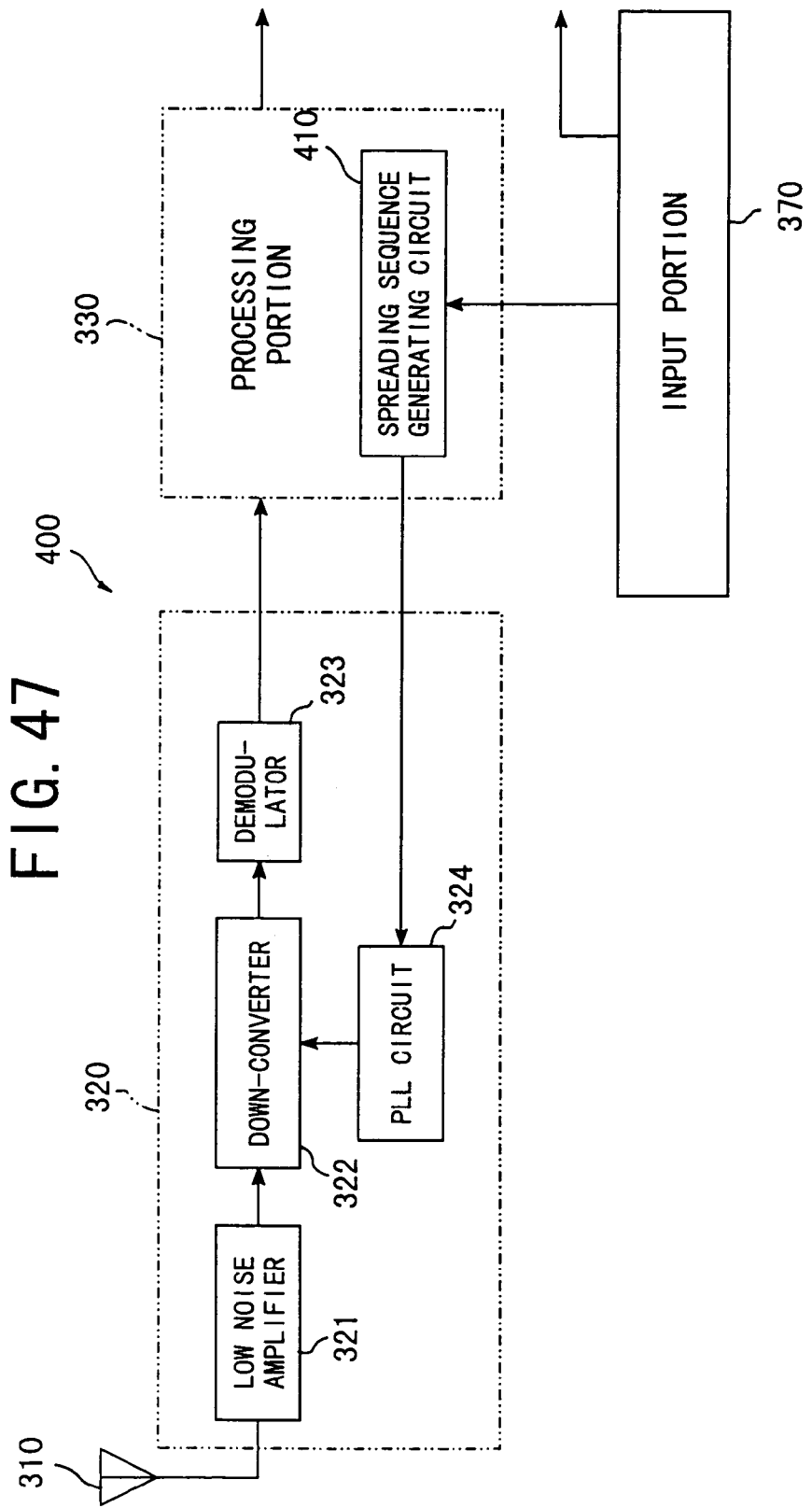
FIG. 47 is a block diagram showing a receiving portion, a processing portion and an input portion of a viewer of another embodiment of the present invention.

FIG. 47 shows an antenna 310, a receiving portion 320, a processing portion 330 and an input portion 370 of a viewer 400 of another embodiment of the present invention. Compared with the aforementioned viewer 300 shown in FIG. 6, the viewer 400 is similar to the viewer 300 except for a spreading sequence generating circuit 410.

As shown in FIG. 6, the aforementioned viewer 300 has the hopping table 331 including the predetermined spreading sequence. That is to say, in the aforementioned viewer 300, the spreading sequence is set in advance and fixed.

In contrast, the viewer 400 has the spreading sequence generating circuit 410. The spreading sequence generating circuit 410 generates the spreading sequence by using an input password.

Figure 48:
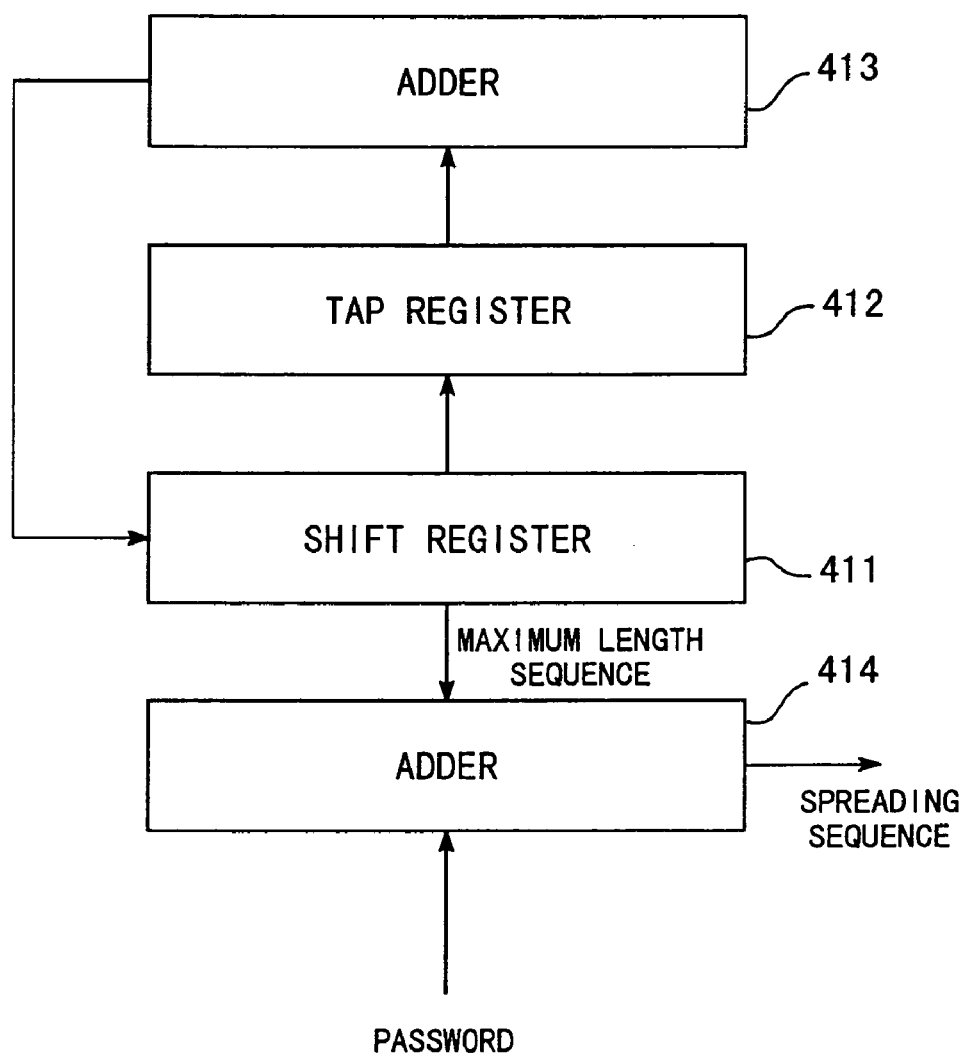
FIG. 48 is a block diagram showing a spreading sequence generating circuit according to the embodiment of the present invention.

FIG. 48 shows a construction of the spreading sequence generating circuit 410. As shown in FIG. 48, the spreading sequence generating circuit 410 has: a shift register 411 for generating a maximum length sequence; a tap register 412 for setting a feedback tap; a first adder 413 for adding the maximum length sequence fed from the shift register 411 through the tap register 412; and a second adder 414 for generating a random sequence by adding an input password to the generated maximum length sequence.

The input of the second adder 414 is connected to the input portion 370. When the user inputs a password by manipulating the input portion 370, the input password is fed into the second adder 414. The output of the second adder 414 is connected to the PLL circuit 324. The random sequence generated by the second adder 414 is sent to the PLL circuit 324, and then, this random sequence is used as the spreading sequence.

Each of the shift register 411 and the tap register 412 is a seven bits register, for example. Therefore, the maximum length sequence generated by these registers is a sequence formed by seven bits codes. If a specific seven bits code is used as the password, the random sequence formed by seven bits codes is simply generated by adding the specific seven bits code to the maximum length sequence.

In addition, if the specific seven bits code is directly used as the password, the number of digits of the password is too small, namely, two or three digits (0~127). In consideration of this, a specific code of more than several digits (e.g., eight or nine digits) is used as the password. In this case, the password of more than several digits is input by the user, this password is converted into the specific code of seven bits, and then, this specific code is fed into the second adder 414. For example, the password of eight or nine digits can convert the specific code of seven bits by adding the numerical values of the respective digits of the password one another. Alternatively, the alphabets may be used for the password. In this case, the specific code of seven bits may be assigned to this alphabets.

Next, a receiving operation of the viewer 400 will be described. When the sending apparatus 200 transmits the spread signal to the viewer 400, the spread signal is received by the antenna 310. Next, the received spread signal is amplified by the low noise amplifier 321, and then fed into the down-converter 322.

At this time, the user inputs the password by manipulating the input portion 370, and then, the input password is fed into the second adder 414 of the spreading sequence generating circuit 410. The spreading sequence generating circuit 410 generates the spreading sequence. If the input password is correct, the spreading sequence generated by the spreading sequence generating circuit 410 is the same as the spreading sequence that used in the sending apparatus 200, namely, the spreading sequence included in the hopping table 241. On the other hand, if the input password is incorrect, the spreading sequence generated by the spreading sequence generating circuit 410 is different from the spreading sequence that used in the sending apparatus 200.

Next, the generated spreading sequence is fed into the PLL circuit 324, and then, the amplified spread signal is despread by the down-converter 322 in association with the PLL circuit 324. Next, the resultant signal is demodulated in the demodulator 232. If the input password is correct, the original transmission data D is restored at this stage. Next, the document information is extracted from the restored transmission data D, and then, the extracted document information is displayed on the display in the same manner as the aforementioned viewer 300.

According to the viewer 400, when the correct password is input to the viewer 400, the document information transmitted from the sending apparatus 200 can be displayed. That is to say, unless the correct password is input, the document information cannot be displayed. Thus, the only person who knows the correct password can see the document information. Consequently, it is possible to improve security.

Further, if the aforementioned spreading sequence generating circuit is also installed in the sending apparatus, the document information can be spread by using a different spreading sequence, and therefore, the document information can be transmitted to the viewer 400 in a different frequency hopping pattern. Specifically, when sending specific document information from the sending apparatus to the viewer 400, the user (i.e. sender) inputs a specific password into the spreading sequence generating circuit installed in the sending apparatus. In order to receive and display this specific document information by the viewer 400, the user (i.e. receiver) has to input the same specific password. The sender can change the password. Therefore, the sender can select the receiver by changing the password for each document information. Thus, the sender can send a specific document information to only specific receivers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Applications No. 09236302, No. 09236299, No. 09236300, No. 09236301, No. 09236303 filed on Sep. 1, 1997, and No. 09230810 filed on Aug. 27, 1997 including the specification, claims, drawings and summary is incorporated herein by reference in their entirety.

What is claimed is:

1. A document information communicating system comprising: a sending apparatus for sending document information which is divided into a plurality of pages; and a receiving apparatus for receiving said document information and displaying said received document information, said sending apparatus comprising:
  a dividing device for dividing each page of said document information into a plurality of blocks;
  a converting device for converting said plurality of blocks into transmission data by adding header information to each of said blocks, said header information includes page information;
  a sending device for sending said transmission data; and
  a sending control device for controlling said sending device so as to repeatedly send transmission data corresponding to a different block included in a specific page, changing said specific page each time one unit of transmission data corresponding to one block is sent,
  said receiving apparatus comprising:
  a referring device for referring to page information corresponding to the document information by checking page information in header information of transmission data of said received document information each time said receiving apparatus receives document information;
  a selecting device, when the referring device recognizes that at least one page of the document information should be received, for selecting the page from said plurality of pages of the document information;
  a receiving device for receiving said selected page of said document information;
  a display device having a display panel which allows a whole of one page of said document information to be displayed thereon at a time; and
  a display control device for displaying said document information received by said receiving device on said display panel.

2. A document information communicating system according to claim 1, wherein said sending apparatus sends said document information formed by a plurality of characters, and said sending apparatus comprises:
  a dividing device for dividing each page of said document information into a plurality of blocks, the number of said characters included in each block being not more than the number of said characters included in one line of each page of said document information; and
  a sending device for sending said plurality of blocks.

3. A document information communicating system according to claim 1, wherein said sending apparatus sends said document information formed by bitmap data, and said sending apparatus comprises:
  a dividing device for dividing each page of said document information into a plurality of blocks, the amount of said bitmap data included in each block being integral number times as much as the amount of said bitmap data included in one line element of each page of said document information; and
  a sending device for sending said plurality of blocks.

4. A document information communicating system according to claim 1, wherein said sending apparatus comprises:
  a dividing device for dividing each page of said document information into a plurality of blocks; and
  a sending device for sending said plurality of blocks in discontinuous order.

5. A document information communicating system according to claim 1, wherein, if said document information is formed by a plurality of characters, said sending apparatus sends said plurality of characters in discontinuous order.

6. A document information communicating system according to claim 1, wherein said display control device comprises a memory device having a minimum memory capacity enough to store one page of said document information and additional information necessary for displaying said document information on said display panel.

7. A document information communicating system according to claim 1, wherein a size of said display panel corresponds to a size of one page of said document information.

8. A document information communicating system according to claim 1, wherein said receiving apparatus further comprises:
  an error determining device for determining whether or not said document information received by said receiving device includes an error; and
  a reception control device for controlling said receiving device so as to repeatedly receive said selected page of said document information, if said error determining device determines that said document information received by said receiving device includes an error.

9. A document information communicating system according to claim 1, wherein said receiving apparatus further comprises a converting device for converting said document information formed by a plurality of characters into said document information formed by bitmap data.

10. A document information communicating system according to claim 1, wherein said receiving apparatus further comprises a power control device for powering down said receiving device after reception of said document information, and periodically powering up said receiving device to check whether or not said document information sent from said sending apparatus is changed.

11. A document information communicating system according to claim 1, wherein said sending apparatus further comprises a document information removing device for sending insignificant data to said receiving apparatus in order to remove said document information that was previously sent to said receiving apparatus.

12. A document information communicating system according to claim 11, wherein said insignificant data is a group of blank data.

13. A document information communicating system according to claim 1, wherein said receiving apparatus further comprises:
  a communication determining device for determining whether or not maintaining communication between said sending apparatus and said receiving apparatus is possible; and
  a removing device for removing said document information that was previously received from said sending apparatus, unless said communication determining device determines that maintaining said communication is possible.

14. A document information communicating system according to claim 13, wherein said communication determining device determines whether or not intensity of a communication signal which carries said document information from said sending apparatus to said receiving apparatus is more than a predetermined intensity.

15. The document information communicating system according to claim 1, said sending apparatus further comprising:
  a dividing device for dividing each page of said document information into a plurality of blocks; and
  a sending device for sending said plurality of blocks, wherein
  each block includes a header block and a document information area block; and said referring device refers to page information included in the header block, and recognizes whether the page of the document information should be received.

16. A document information communicating system comprising: a sending apparatus for sending document information which is divided into a plurality of pages; and a receiving apparatus for receiving said document information and displaying said received document information, said sending apparatus comprising a sending device for repeatedly sending said plurality of pages of said document information, said receiving apparatus comprising:

a selecting device for selecting at least one page from said plurality of pages of the document information;

a receiving device for receiving said selected page of said document information;

a display device having a display panel which allows a whole of one page of said document information to be displayed thereon at a time; and a display control device for displaying said document information received by said receiving device on said display panel, wherein said sending device comprises:

a communication signal generating device for generating a communication signal including said document information;

a spreading device for spreading said communication signal by using a spreading sequence; and a communication signal sending device for sending said spread communication signal, and said receiving device comprises:

a communication signal receiving device for receiving said spread communication signal;

an inputting device for inputting a password;

a spreading sequence generating device for generating said spreading sequence by using said input password;

a despreading device for despreading said received communication signal by using said spreading sequence generated by said spreading sequence generating device; and an extracting device for extracting said document information from said despread communication signal.

17. A document information sending apparatus for sending document information which is divided into a plurality of pages, said document information sending apparatus comprising:

a dividing device for dividing each page of said document information into a plurality of blocks;

a converting device for converting said plurality of blocks into transmission data by adding header information to each of said blocks, said header information includes page information;

a sending device for sending said transmission data; and a sending control device for controlling said sending device so as to repeatedly send transmission data corresponding to a different block included in a specific page, changing said specific page each time one unit of transmission data corresponding to one block is sent.

* * * * *